United States Patent
Tzoganakis et al.

(10) Patent No.: US 9,982,099 B2
(45) Date of Patent: May 29, 2018

(54) METHOD FOR MODIFYING POLYOLEFIN TO INCREASE LONG CHAIN BRANCHING

(71) Applicants: Costas Tzoganakis, Waterloo (CA); Alexander Penlidis, Waterloo (CA); Yasaman Amintowlieh, Kingston (CA)

(72) Inventors: Costas Tzoganakis, Waterloo (CA); Alexander Penlidis, Waterloo (CA); Yasaman Amintowlieh, Kingston (CA)

( * ) Notice: Subject to any disclaimer, the term of this patent is extended or adjusted under 35 U.S.C. 154(b) by 0 days. days.

(21) Appl. No.: 14/684,261

(22) Filed: Apr. 10, 2015

(65) Prior Publication Data

US 2016/0039980 A1    Feb. 11, 2016

Related U.S. Application Data

(60) Provisional application No. 61/995,627, filed on Apr. 16, 2014.

(51) Int. Cl.

| | |
|---|---|
| *C08F 2/50* | (2006.01) |
| *C08G 61/04* | (2006.01) |
| *C08J 3/28* | (2006.01) |
| *C08J 9/00* | (2006.01) |
| *B29C 49/00* | (2006.01) |
| *B29C 51/00* | (2006.01) |
| *B29B 11/10* | (2006.01) |
| *B29B 11/14* | (2006.01) |
| *B29K 23/00* | (2006.01) |
| *B29C 47/00* | (2006.01) |
| *B29C 49/02* | (2006.01) |
| *B29C 51/02* | (2006.01) |
| *B29K 105/04* | (2006.01) |

(52) U.S. Cl.
CPC ............ *C08J 3/28* (2013.01); *B29B 11/10* (2013.01); *B29B 11/14* (2013.01); *B29C 49/0005* (2013.01); *B29C 51/002* (2013.01); *C08J 9/00* (2013.01); *B29C 47/0009* (2013.01); *B29C 47/0054* (2013.01); *B29C 49/02* (2013.01); *B29C 51/02* (2013.01); *B29K 2023/12* (2013.01); *B29K 2105/04* (2013.01); *C08J 2323/06* (2013.01); *C08J 2323/12* (2013.01)

(58) Field of Classification Search
CPC ..... C08J 3/28; C08J 9/00; B29B 11/10; B29B 11/14; B29C 44/00; B29C 49/005; B29C 51/002
USPC .................................................. 522/1; 520/1
See application file for complete search history.

(56) References Cited

U.S. PATENT DOCUMENTS

| | | |
|---|---|---|
| 2,948,666 A | 8/1960 | Lawton |
| 4,916,198 A | 4/1990 | Scheve et al. |
| 4,962,262 A | 10/1990 | Winter et al. |
| 5,047,485 A | 9/1991 | DeNicola, Jr. |
| 5,414,027 A | 5/1995 | DeNicola, Jr. et al. |
| 5,416,169 A | 5/1995 | Saito et al. |
| 5,541,236 A | 7/1996 | DeNicola, Jr. et al. |
| 5,591,785 A | 1/1997 | Scheve et al. |
| 5,731,362 A | 3/1998 | Scheve et al. |
| 5,883,151 A | 3/1999 | Raetzsch et al. |
| 6,774,156 B2 | 8/2004 | Debras et al. |
| 7,019,044 B2 | 3/2006 | Debras et al. |
| 7,169,827 B2 | 1/2007 | Debras et al. |
| 8,703,836 B2 * | 4/2014 | Kukaleva ................. C08F 2/50 520/1 |
| 2008/0045619 A1 * | 2/2008 | Jackson ................... C08J 3/243 522/32 |
| 2012/0149845 A1 | 6/2012 | Han et al. |

FOREIGN PATENT DOCUMENTS

WO     2009090126     7/2009

OTHER PUBLICATIONS

Borsig et al, Long Chain branching on linear polypropylene by solid state reactions, Oct. 22, 2007, European Polymer Journal, 44, 200-212.*
He et al, A UV-Initiated reactive extrusion process for production of controlled-rheology polypropylene, 2011, Polymer Engineering and Scirnce, vol. 51, issue 1, 151-157.*
Amintowlieh et al, Effects of processing variables on polypropylene degradation and long chain branching with UV irradiation, Mar. 26, 2014, Polymer Degradation and Stability, 104, 1-10.*
Aminotwolieh et al, The effect of depth and durataion of UV radiation on polypropylene modification via photoinitiation, Jun. 9, 2014, J. Appl. Polym. Sci, 41021, 1-11.*
Amintowlieh et al, Preparation and characterization of long chain branched polypropylene through UV irradiation and coagent use, Feb. 23, 2015, Polymer-Plastics Technology and Engineering, 54, 1425-1438.*
Tzoganakis et al., "A. production of controlled-rheology polypropylene resins by peroxide promoted degradation during extrusion," Polymer Engineering & Science; 28(3):170-180 (1988).
Mohring et al., "Homogeneous group 4 Metallocene Ziegler-Natta catalysts: the influence of cyclopentadienyl-ring substituents," Journal of Organometallic Chemistry; 479(1-2):1-29 (1994).
Gotsis et al., "The effect of long chain branching on the processability of polypropylene in thermoforming," Polymer Engineering & Science; 44 (5):973-982 (2004).
Graebling, "Synthesis of branched polypropylene by a reactive extrusion process," Macromolecules; 35(12):4602-4610 (2002).
Parent et. al., "Structure-rheology relationships of long-chain branched polypropylene: Comparative analysis of acrylic and allylic," Coagent Chemistry. Polymer;50(1):85-94 (2009).
Wong et al., "Melt rheology of graft modified polypropylene," Polymer; 38(11):2781-2789 (1997).
Krause et al., "Characterization of electron beam irradiated polypropylene: Influence of irradiation temperature on molecular and rheological properties," J Appl Polym Sci; 100(4):2770-2780 (2006).

(Continued)

*Primary Examiner* — Jessica Whiteley
(74) *Attorney, Agent, or Firm* — Snell & Wilmer L.L.P.

(57) ABSTRACT

A method of modifying polyolefin to have long chain branching comprising mixing polyolefin and a photoinitiator and irradiating the mixture with UV radiation. The modified polyolefin of the method and the use of said modified polyolefin.

29 Claims, 50 Drawing Sheets

(56) References Cited

OTHER PUBLICATIONS

Rätzsch et al., "Radical reactions on polypropylene in the solid state," Progress in Polymer Science ; 27(7):1195-1282 (2002).
Langston et al,. "Synthesis and characterization of long chain branched isotactic polypropylene via metallocene catalyst and T-reagent," Macromolecules; 40(8):2712-2720 (2007).
Tullo, "Metallocene rise again," Chem Eng News; 88(42):10-16 (2010).
Yu et al., "Peroxide crosslinking of isotactic and syndiotactic polypropylene," Polymer; 40(11):2961-2968 (1999).
Su et al., "Supercritical carbon dioxide-assisted reactive extrusion for preparation long-chain branching polypropylene and its rheology," The Journal of Supercritical Fluids; 56(1):114-116 (2010).
Auhl et al., "Long-chain branched polypropylenes by electron beam irradiation and their rheological properties," Macromolecules; 37(25):9465-9472 (2004).
Krause et al., "Determination of low amounts of long-chain branches in polypropylene using a combination of chromatographic and rheological methods," Journal of Chromatography; 1056(1-2):217-222 (2004).
Abbas et al., "Comparison of rheological behavior of branched polypropylene prepared by chemical modification and electron beam irradiation under air and N2," Radiat Phys Chem; 79(10):1088-1094.
Lugao et al., "Review on the production process and uses of controlled rheology polypropylene—Gamma radiation versus electron beam processing," Radiat Phys Chem; 76(11-12):1688-1690 (2007).
Lugão et al., "Reaction mechanism and rheologyical properties of polypropylene irradiated under various atmospheres," Radiat Phys Chem; 57(3-6):389-392 (2000).
He et al., "UV-initiated reactive extrusion process for production of controlled-rheology polypropylene," Polymer Engineering and Science; 51(1):151-157 (2011).
UV-Vis Luminescence Spectroscopy theoretical principal, Home page of: http://teaching.shu.ac.uk/hwb/chemistry/tutorials/molspec/lumin1.htm; webpage. (2011).
Mita, et al., "Photoinitiated thermal degradation of polymers. I. Elementary processes of degradation of polystyrene," Macromolecules; 21(10):3003-3010 (1988).
Hingmann et al., "Shear and elongation flow properties of polypropylene melts," J Rheol; 38:573-587 (1994).
Aramata et al., "Small-amplitude oscillatory shear flow measurements as a tool to detect very low amounts of long chain brancing in polyethylenes," Macromolecules; 31(11):3639-3647 (1998).
Stange et al., "Rheological behavior of blends from a linear and a long-chain branched polypropylene," J Rheol; 49(5):1059-1079 (2005).
Sugimoto et al., "Melt rheology of long-chain-branched polypropylenes," Rheologica acta;46(1):33-44 (2006).
Nam et al., "Effect of long-chain branches of polypropylene on rheological properties and foam-extrusion performances," J Appl Polym Sci; 96(5):1793-1800 (2005).
Tian et al., "The preparation and rheology characterization of long chain branching polypropylene," Polymer, 47(23):7962-7969 (2006).
Tzoganakis, "A rheological evaluation of linear and branched controlled-rheology polypropylenes," The Canadian Journal of Chemical Engineering; 72(4):749-754 (1994).
Schroff et al., "New measures of polydispersity from rheological data on polymer melts," J Appl Polym Sci; 57(13):1605-1626 (1995).
Delgadillo et al, "Thermorheological properties of LLDPE/LDPE blends," Rheologica Acta; 47(1):19-31 (2008).
Meissner et al., "A new elongational rheometer for polymer melts and other highly viscoelastic liquids," Rheologica Acta; 33(1):1-21 (1994).
Wagner et al., "The strain-hardening behaviour of linear and long-chain-branched polyolefin melts in extensional flows," Rheologica acta 2000; 39(2):97-109 (2000).
Meissner, "Development of a universal extensional rheometer for the uniaxial extension of polymer melts," Transactions of the Society of Rheology. 1972; 16(3):405-420 (1957-1977).
Meissner et al., Rotary clamp in uniaxial and biaxial extensional rheometry of polymer melts. Journal of Rheology (1978-present); 25(1):1-28 (1981).
Münstedt, "New universal extensional rheometer for polymer melts. Measurements on a polystyrene sample," Journal of Rheology (1978-present); 23(4):421-436 (1979).
Sentmanat, "Miniature universal testing platform: from extensional melt rheology to solid-state deformation behavior," Rheologica acta; 43(6):657-669 (2004).
Sentmanat et al., "Measuring the transient extensional rheology of polyethylene melts using the SER universal testing platform," Journal of Rheology (1978-present); 49(3):585-606 (2005).
Wood-Adams, et al., "Effect of molecular structure on the linear viscoelastic behavior of polyethylene," Macromolecules, 33(20):7489-7499 (2000).
Scorah et al, "Characterization by dilute solution and rheological methods of polystyrene and poly (methyl methacrylate) produced with a tetrafunctional peroxide initiator," J Appl Polym Sci; 103(2):1340-1355 (2007).
Scorah et al., "A. Branching Level Detection in Polymers. Encyclopedia of Polymer Processing (ECHP)," S.Lee, Ed., Taylor and Francis, New York; 251-265 (2005).
Zimm et al. "The dimensions of chain molecules containing branches and rings," J Chem Phys; 17:1301-1314 (1949).
Weng et al., "Long chain branched isotactic polypropylene," Macromolecules 2002; 35(10):3838-3843 (2002).
Langston et al., "One-pot Synthesis of Long Chain Branch PP (LCBPP)," Using Ziegler-Natta Catalyst and Branching Reagents; 260(1):34-41 (2007).
Zhou et al., "ESR study on peroxide modification of polypropylene," Ind Eng Chem Res; 36(4):1130-1135 (1997).
Qu et al., "Photoinitiated crosslinking of low-density polyethylene. 6. Spin-trapping ESR studies on radical intermediates," Macromolecules; 25(20):5215-5219 (1992).
Huang et al., "The rheological property and foam morphology of linear polypropylene and long chain branching polypropylene," Journal of Wuhan University of Technology-Mater.Sci.Ed; 28(4):798-803 (2013).
Zamotaev et al., "Photocrosslinking of polypropylene: the effect of different photo-initiators and coagents," Polym Degrad Stab 1995; 47(1):93-107 (1995).
Jain et al., "Effect of in situ prepared silica nano-particles on non-isothermal crystallization of polypropylene," Polymer; 46(20):8805-8818 (2005).
Kurzbeck et al., Rheological properties of two polypropylenes with different molecular structure. J Rheol; 43(2):359-374 (1999).
Auhl et al, "Rheological properties of electron beam-irradiated polypropylenes with different molar masses," Rheologica Acta: 1-11 (2012).
Lugão et al., "Characterization study of gamma-irradiated, high melt-strength polypropylene. Nuclear Instruments and Methods in Physics Research Section B: Beam Interactions with Materials and Atoms," 208:252-255 (2003).
Amintowlieh et al., "Effects of processing variables on Polypropylene degradation and long chain branching with UV irradiation," Polymer Degradation and Stability; 104:1-10 (2014).
Wu et al., "Photoinitiating characteristics of benzophenone derivatives as new initiators in the photocrosslinking of polyethylene," Polymer Engineering & Science; 41(7):1220-1226 (2001).
Chen et al., "Photocrosslinking of polyethylene. II. Properties of photocrosslinked polyethylene," Journal of Polymer Science Part A: Polymer Chemistry; 27(12):4077-4086 (1989).
Rånby, "Photoinitiated modifications of polymers: photocrosslinking, surface photografting and photolamination," Mat Res Innovat; 2(2):64-71 (1998).

(56) References Cited

OTHER PUBLICATIONS

Honerkamp et al., "A nonlinear regularization method for the calculation of relaxation spectra," Rheologica Acta 1993; 32(1):65-73 (1993).
Wood-Adams et al., "Using rheological data to determine the branching level in metallocene polyethylenes," Macromolecules 2000; 33(20):7481-7488 (2000).
Lau H, Bhattacharya S, Field G. Melt strength of polypropylene: Its relevance to thermoforming. Polymer Engineering & Science 1998;38(11):1915-1923.
Gotsis et al., "Effect of long branches on the rheology of polypropylene," J Rheol; 48(4):895-914 (2004).
Yamaguchi et al., "Enhanced strain hardening in elongational viscosity for HDPE/crosslinked HDPE blend. II. Processability of thermoforming," J Appl Polym Sci; 86(1):79-83 (2002).
Bernnat, "Polymer melt rheology and the rheotens test," PhD Thesis, University of Stuttgart, Germany, (2001).
Kim et al., "Cross-Linking of polypropylene by peroxide and multifunctional monomer during reactive extrusion," Adv Polym Technol; 12(3):263-269 (2003).
Borsig et al., "Long chain branching on linear polypropylene by solid state reactions," European Polymer Journal; 44(1):200-212 (2008).
Amintowlieh et al., "The effect of depth and duration of UV radiation on polypropylene modification via photoinitiation ," J Appl Polym Sci.: 131, 41021-41032 (2014).
Gabriel et al., "Influence of long-chain branches in polyethylenes on linear viscoelastic flow properties in shear," Rheologica Acta; 41(3):232-244 (2002).
Tzoganakis, "Reactive extrusion of polymers: A review," Adv Polym Technol; 9(4):321-330 (1989).
Moad , "The synthesis of polyolefin graft copolymers by reactive extrusion," Progress in Polymer Science; 24(1):81-142 (1999).
Bettini et al., "Grafting of maleic anhydrive onto polypropylene by reactive extrusion," J Appl Polym Sci; 85(13):2706-2717 (2002).
Prut et al., "Chemical modification and blending of polymers in an extruder reactor," Russian Chemical Reviews; 70(1):65-79 (2001).
Azizi et al., "Reactive extrusion of polypropylene: production of controlled-rheology polypropylene (CRPP) by peroxide-promoted degradation," Polym Test; 23(2):137-143 (2004).
Lagendijk et al., Peroxydicarbonate modification of polypropylene and extensional flow properties. Polymer; 42(25):10035-10043 (2001).
Wang et al., "Chemical modification of polypropylene with peroxide/pentaerythritol triacrylate by reactive extrusion," J Appl Polym Sci; 61(8):1395-1404 (1996).
Sardashti et al., "Radiation Induced Long Chain Branching in High-Density Polyethylene through a Reactive Extrusion Process," Macromolecular Reaction Engineering; 8(2):100-111 (2014).
Amintowlieh et al. Preparation and characterization of long chain branched polypropylene through UV irradiation and coagent. Under review: Polymer-Plastics Technology and Engineering: manuscript length 45 (2014).
Shroff et al., "Long-chain-branching index for essentially linear polyethylenes," Macromolecules; 32(25):8454-8464 (1999).
Y. Amintowlieh et al., "Continuous Modification of Polypropylene via Photoiniation", under review, *Polymer Engineering and Science* (2015).
Amintowlieh, "Rheological Modification of Polypropylene by incorporation of long chain branches using UV radiation," a thesis presented to the University of Waterloo in fulfillment of the thesis requirement for the degree of Doctor of Philosophy in Chemical Engineering (2014).
Collins et al., "Ploymerization of propylene using supported, chiral, ansa-metallocene catalysts: production of polypropylene with narrow molecular weight distributions," Macromolecules, 25; 1780-1785 (1992).
J. McMurry, Organic Chemistry, 3rd ed., Brooks/Cole Publishing Company, 1992, pp. 1192-1193 and pp. 1196-1197.

* cited by examiner

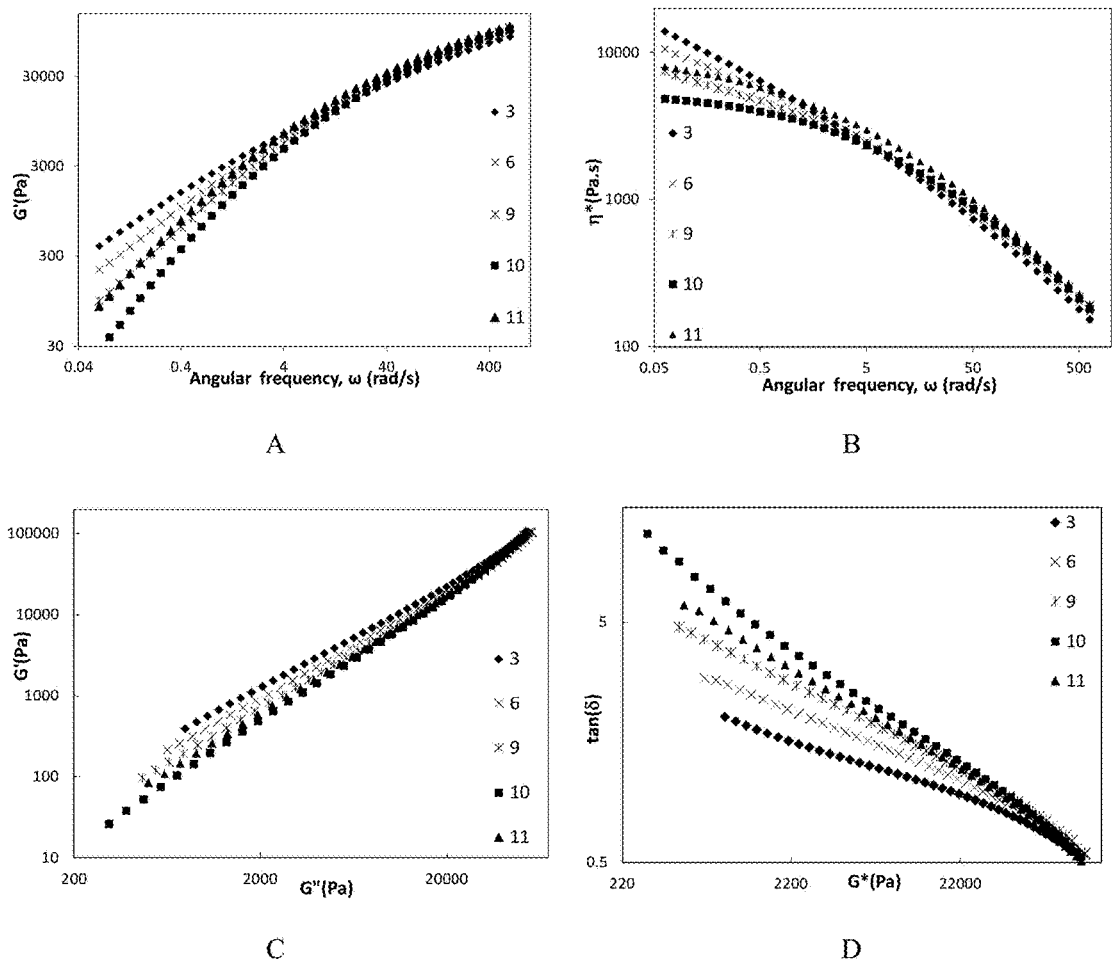
Figure 18 A B C D

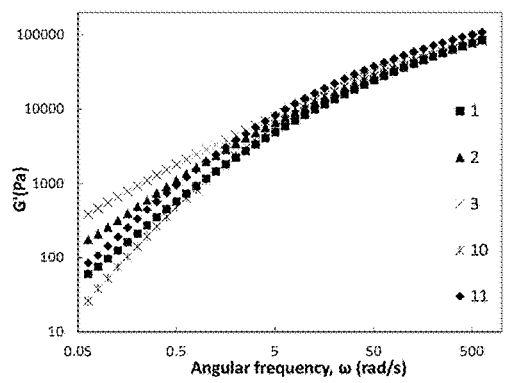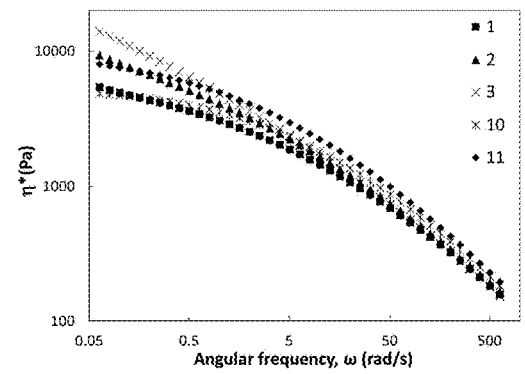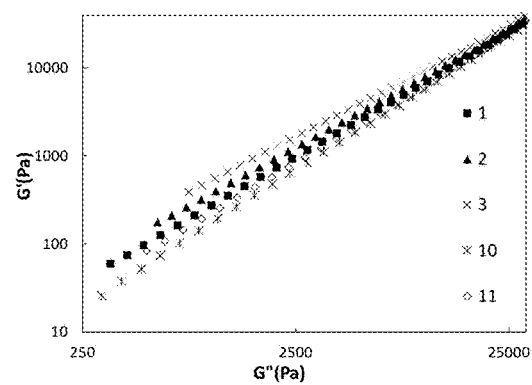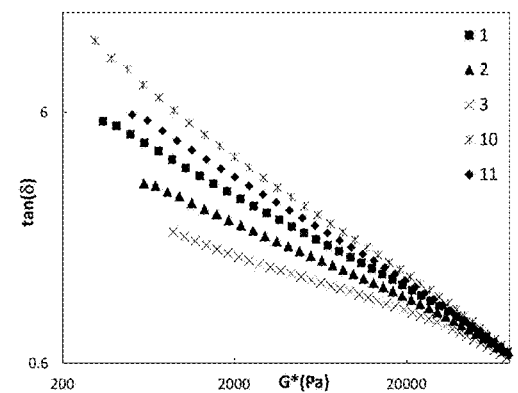
Figure 19 A B C D

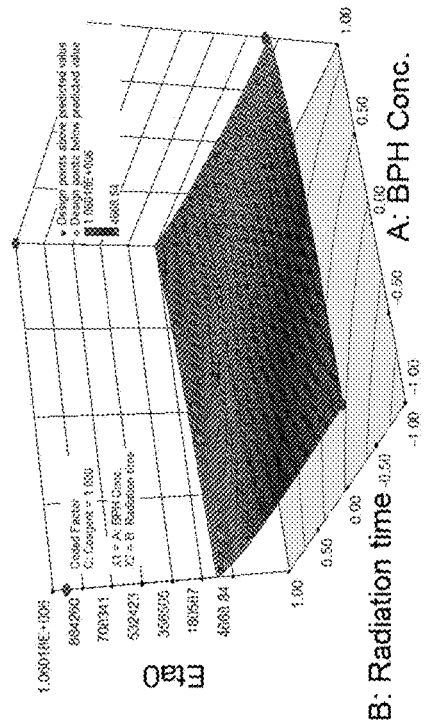
FIG. 37A
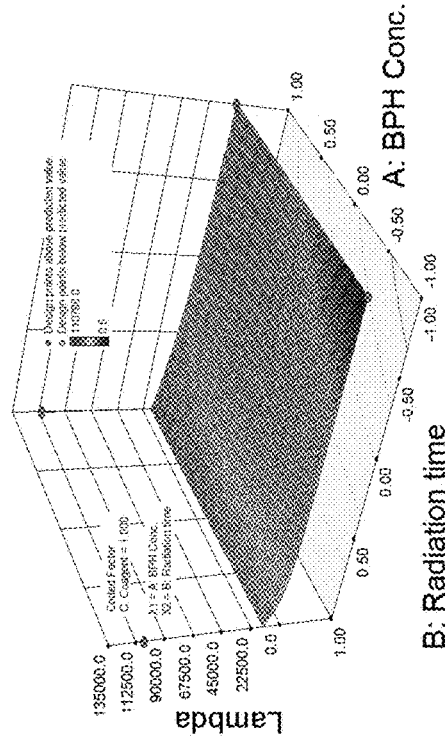
FIG. 37B
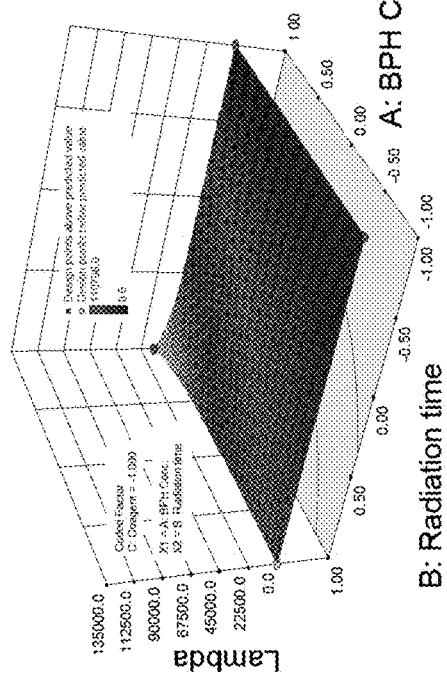

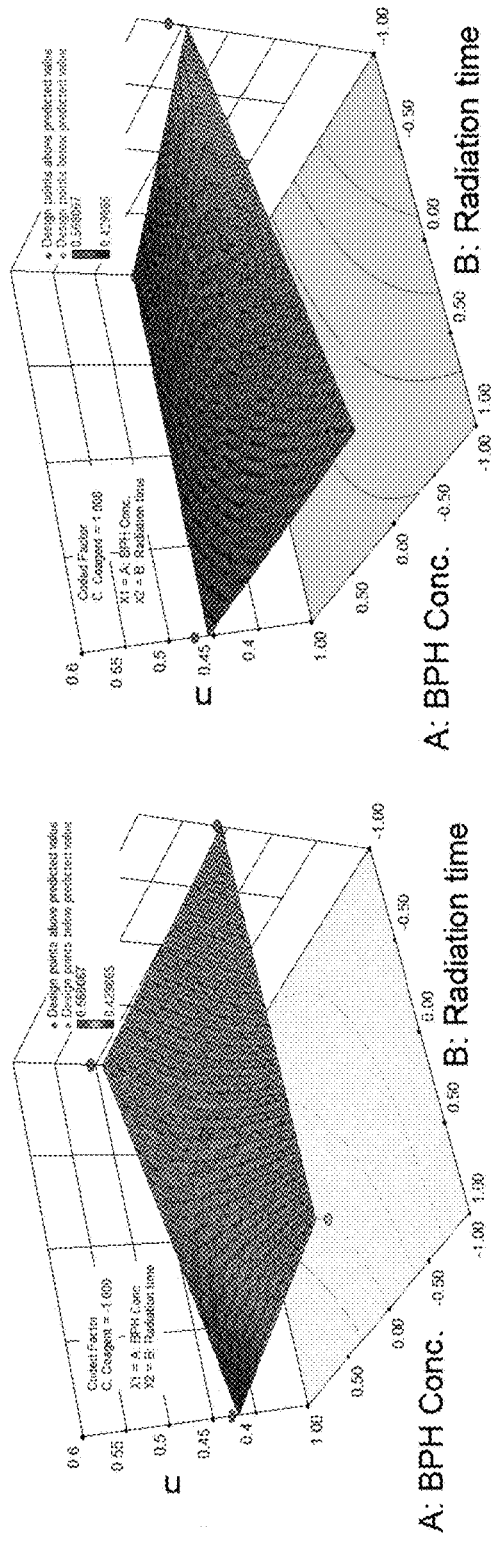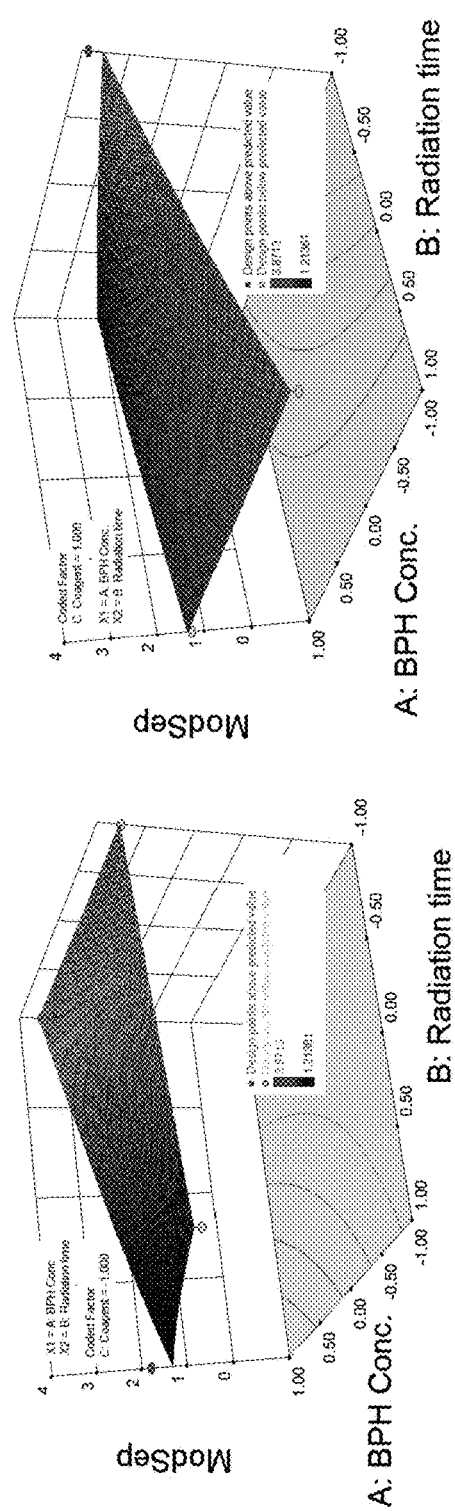
FIG. 37C
FIG. 38A

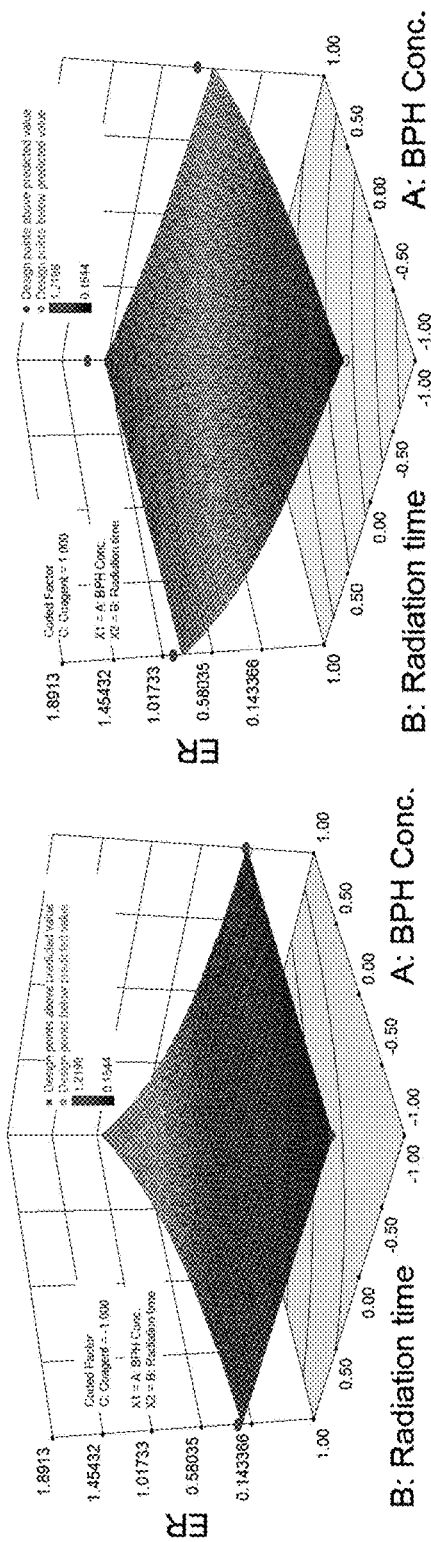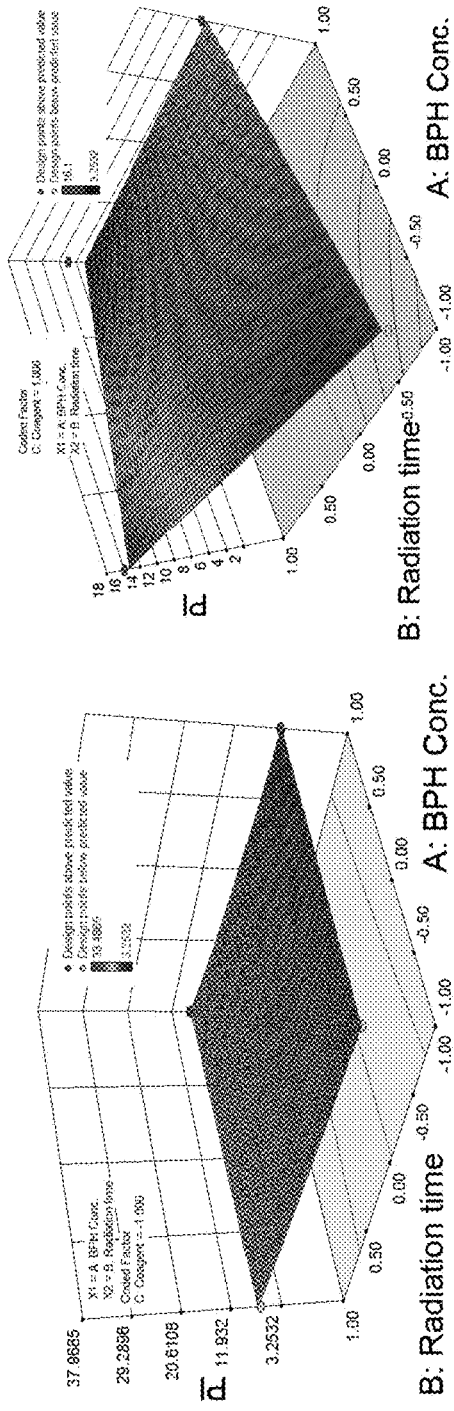
FIG. 38B
FIG. 38C

METHOD FOR MODIFYING POLYOLEFIN TO INCREASE LONG CHAIN BRANCHING

CROSS-REFERENCE TO RELATED APPLICATIONS

This application claims the benefit of U.S. Provisional Patent Application No. 61/995627, which is incorporated herein by reference in its entirety.

FIELD OF INVENTION

The present invention relates to a method for modification of polyolefins such as polypropylene to improve characteristics such as melt-state strain hardening behavior. More specifically, the invention relates to a method of preparing polypropylene having long chain branching by irradiating the polypropylene in the presence of a photoinitiator. The invention further relates to the use of the modified polypropylene in polymer processing.

BACKGROUND OF THE INVENTION

Polypropylene (PP) is a commodity polymer that is used in a variety of commercial applications. However, due to its linear chain structure, PP has low melt strength and lacks strain hardening behavior. This limits its application in certain areas that require melt extension. Such application areas include, but are not limited to, thermoforming, blow molding and foaming. The lack of strain hardening behaviour leads to problems including very narrow processing conditions windows, non-uniform foam cell size and pinholes in sheet thermoforming.

Polypropylene (PP) is one of the most common thermoplastics in the plastics industry with numerous applications ranging from household appliances to automotive interiors. Each application requires a specific PP grade with a specific average molecular weight (MW) and polydispersity index (PDI). PP molecular weight and PDI affect the melt flow behaviour, processing characteristics and eventually the final applications of PP.

However, the use PP is limited in applications requiring significant melt strength. Thus, modifying the molecular structure and enhancing strain hardening of PP melt, can lead to uses in areas such as foaming, thermoforming, extrusion coating and blow moulding.

The high melt strength of a polymer can be attributed to either long chain branching (LCB) or high MW. Hence, attempts have been made over the years to introduce LCB to PP chains. Methods such as electron beam radiation, gamma radiation or utilizing peroxides in the presence of coagents (like styrene or allylic and acrylic multi-functional monomers) have been utilized to impart LCB and increase the number of long chain branches in the PP chains.

Electron Beam Radiation

Electron beam radiation of PP has been used extensively to modify its melt strength. Linear PP pellets are irradiated in a vessel with electrons generated by an electron beam accelerator. Irradiation of PP is carried out under $N_2$ atmosphere to discourage chain scission as much as possible. Then, irradiated PP samples are heated at an elevated temperature to bring the entrapped radicals in the crystalline domains into the interface between crystalline and amorphous regions. This is done to encourage bimolecular termination of the trapped radicals, which leads to formation of long chain branches.

Electron beam (EB) irradiation is proposed in U.S. Pat. Nos. 5,414,027, 5,541,236, 7,169,827, 6,774,156, 7,019,044 and 2,948,666.

Gamma Irradiation

Another technique for rheology modification and increasing of the melt strength of PP is using gamma radiation. In this method, energetic ions and excited states are produced using Cobalt 60 as a gamma ray source. However, good control is lost due to the intensity of gamma radiation. As a result, gamma irradiation can also abstract hydrogens from the PP backbones and cause β-scission.

Gamma-ray irradiation is proposed in U.S. Pat. Nos. 4,916,198, 5,591,785, 5,731,362 and 5,883,151.

Free Radical Initiated Reactions

Peroxide initiators have been used along with co-agents such as triallyl trimesate (TAM), trimethylopropane triacrylate (TM PTA) and triallyl phosphate (TAP) to modify the rheology of PP by introducing LCB. This technique is popular since it is less expensive (and less energy intensive) than the previously described radiation techniques. The effects of allylic and acrylic co-agents on molecular weight and branching distribution were studied by comparing shear and elongation viscosities. It was found that a mix of degraded chains, slightly branched polymer chains and hyper-branched chains, which can only be formed after the gel point, were present in the polymer melt when co-agents were used.

The following mechanism has been suggested for the reaction between PP, peroxide and co-agent. After PP macro-radicals are formed because of the presence of the peroxide initiator, they will attack the carbon double bond on the co-agent, and then a stable radical adduct will be formed. This stable intermediate radical adduct is protected from β-scission. In addition, the hydrogen on this intermediate adduct can react with other degraded polymer chains. These degraded polymer chains are produced from the initial β-scission reaction and contain a terminal double bond. These terminal double bonds react with the intermediate radical adducts, leading to the formation of long chain branches and/or crosslinks. Eventually, the final PP structure will be a function of the yield and the selectivity of the peroxide in the degradation reaction and the co-agent that assists in the crosslinking (CL) step.

Free radical initiated reactions using multi-functional co-monomers is described in U.S. Pat. Nos. 5,047,485 and 5,416,169.

UV Irradiation

Yet another technique that can be employed is UV radiation. UV radiation is a cheaper and safer process for generating free radicals in PP and modifying its molecular structure. In this method, PP is mixed with photoinitiators and UV energy is utilized to activate the photoinitiator. After activation with UV radiation, these initiators can abstract hydrogens from the PP backbone. Hydrogen abstraction will be followed by scission and degradation of PP chains. Degradation of PP using UV energy along with photoinitiators was successful in a twin screw extruder to decrease the polydispersity index (PDI) of PP and produce controlled rheology PP [10]. In addition, in order to control the degradation level of PP in the melt state and form long chain branched PP (LCBPP) for foaming applications, multi-functional acrylic coagents were used along with photoinitiators. The radiation was carried out in the last two zones of a twin screw extruder by using a transparent barrel.

The effect of different photoinitiators and coagents on the amount of gel formed in PP films radiated with UV energy has also been investigated. Moreover, different photoinitiators along with coagents were used to introduce LCB to linear PP and increase its melts strength.

UV irradiation with the use of co-monomer is proposed in U.S Pat. No. 8,703,836.

Extruders have long been used as continuous reactors for polypropylene (PP) chemical modification [74-77]. This process is known as reactive extrusion (REX) and it has been employed to produce controlled rheology PP (CRPP) [1, 78]. In order to produce CRPP via REX, PP and peroxides are fed into the extruder, and initiation reactions followed by β-scission of the PP chains take place during melting and mixing in the extruder. These reactions are responsible for degradation of PP. As soon as temperature reaches the peroxide decomposition temperature, the peroxide abstracts hydrogens from the PP backbones and macroradicals are thus formed. Since PP tertiary radicals are unstable, the chain will break β-scission) and polymer with lower molecular weight (MW) and narrower molecular weight distribution (MWD) will be formed [1].

Utilizing thermo-chemical initiators, such as peroxides, in REX has its own disadvantages, such as limited controllability. Peroxides reach their decomposition temperature prior to effective mixing with PP, thus causing an excessive and non-homogenous degradation in PP. In order to overcome this issue, photoinitiators were used along with UV irradiation to efficiently degrade PP. In this way, the reaction initiation step and subsequent formation of macroradicals become independent of the processing temperature and the reaction only starts when UV irradiates the PP/photoinitiator mixture. He et al. [20] used this technique to modify PP rheology during extrusion. Photomodification was conducted in the last two zones of the extruder by opening the barrel and exposing the mixture to UV irradiation.

Photoinitiators were not only used to produce CRPP, but also to modify the melt strength of PP or other polyolefins by incorporating long chain branches (LCBs) to their structure [5, 79-81]. Increasing PP melt strength is possible by introducing LCBs to the PP structure. Producing long chain branched PP (LCBPP) is more challenging than CRPP, since β-scission reactions should be controlled by stabilizing PP radical centers. This is not trivial, since β-scission reactions are dominant at temperatures above 60° C. The typical temperature for PP processing is well above 60° C. ($T_{process}$>160° C-PP melting point); thus, excessive degradation is inevitable.

Since LCBPP has numerous commercial applications, there is a need to find a method to continuously modify PP and scale up the system. He et al. [49] irradiated a PP/photoinitiator (BPH)/pentaerythritol triacrylate (PETA) mixture during melt mixing in the extruder by removing the barrel (REX). They found that the modified PP had better foamability due to greater melt strength compared to the parent PP. PETA was used as a crosslinking agent along with BPH to generate long chain branched PP. However, possible drawbacks of UV radiation in the extruder include limited UV penetration depth into the thick plastic melt and excessive degradation due to high processing temperature. As mentioned before, the latter issue makes formation of long chain branches possible only if coagents (like PETA) are used to "block" β-scission reactions.

Despite the various approaches proposed, there remains a need for a solution to produce PP having LCB, safely and easily without the addition of comonomers or coagents.

SUMMARY OF THE INVENTION

It has been found that polypropylene can be modified to increase long chain branching (LCB) using UV and a photoinitiator in the absence of a co-monomer or co-agent.

In one aspect of the disclosure there is provided a method of modifying a polyolefin to increase long chain branching comprising: combining polyolefin with a photoinitiator and irradiating the mixture with UV radiation.

In a further aspect the polyolefin is polypropylene (PP) and the photoinitiator is benzophenone (BPH).

In a further aspect the method can be carried out as a batch or continuous process.

In an embodiment the method can be carried out as a batch process and the irradiation with UV can be carried out in the solid state.

In another embodiment the method can be carried out in a continuous extrusion process and the irradiation with UV can be carried out after extrusion of the material, in the solid state.

In a particular embodiment there is provided a method comprising combining PP with BPH at a concentration of about 0.2-0.5 wt %, the mixture is formed to have a thickness of 1 mm, and is irradiated at about 47-79% intensity with a 3 kW lamp power for about 360-600 sec.

In another embodiment there is provided a method comprising combining PP with BPH at a concentration of about 0.5 wt %, the mixture is formed to have a thickness of 1-3 mm and is irradiated at about 47% intensity with a 3 kW lamp power for about 5-15 min.

In still a further embodiment there is provided a method comprising combining PP with BPH at a concentration of about 0.5-1 wt % in a continuous extrusion process to provide a sample thickness of about 0.3-0.5 mm which is irradiated at about 47 intensity with a 3 kW lamp power for about 16-36 sec.

Other features and advantages of the present disclosure will become apparent from the following detailed description. It should be understood, however that the detailed description and the specific examples, while indicating embodiments of the disclosure, are given by way of illustration only, since various changes and modifications within the spirit and scope of the disclosure will become apparent to those skilled in the art from this detailed description. In particular, it will be appreciated that any method may use all of the aspects disclosed herein or any particular combination or sub-combination of the aspects.

BRIEF DESCRIPTION OF THE DRAWINGS

Embodiments of the invention will now be described by way of example only with reference to the appended drawings wherein:

FIG. 18A: Graph showing -ω), of the runs with different thickness after 15 min radiation;

FIG. 18B: Graph showing η*-ω, of the runs with different thickness after 15 min radiation;

FIG. 18C: Graph showing Cole-Cole plots, of the runs with different thickness after 15 min radiation;

FIG. 18D: Graph showing tan (δ)-G*, of the runs with different thickness after 15 min radiation;

FIG. 19A: Graph showing G'-ω of the runs with 1 mm thickness with different radiation times;

FIG. 19B: Graph showing η*-ω of the runs with 1 mm thickness with different radiation times;

FIG. 19C: Graph showing Cole-Cole plots of the runs with 1 mm thickness with different radiation times;

FIG. 19D: Graph showing tan (δ)-G* of the runs with 1 mm thickness with different radiation times;

FIG. 37A: 3D interaction plot for $\eta_0$; the upper plot is without coagent, whereas the lower plot is with coagent;

FIG. 37B: 3D interaction plot for λ; the upper plot is without coagent, whereas the lower plot is with coagent;

FIG. 37C: 3D interaction plot for n; the upper plot is without coagent, whereas the lower plot is with coagent;

FIG. 38A: 3D interaction plot for ModSep; the upper plot is without coagent, whereas the lower plot is with coagent;

FIG. 38B: 3D interaction plot for ER; the upper plot is without coagent, whereas the lower plot is with coagent;

FIG. 38C: 3D interaction plot for PI; the upper plot is without coagent, whereas the lower plot is with coagent;

DESCRIPTION OF THE INVENTION

Figure 1A:
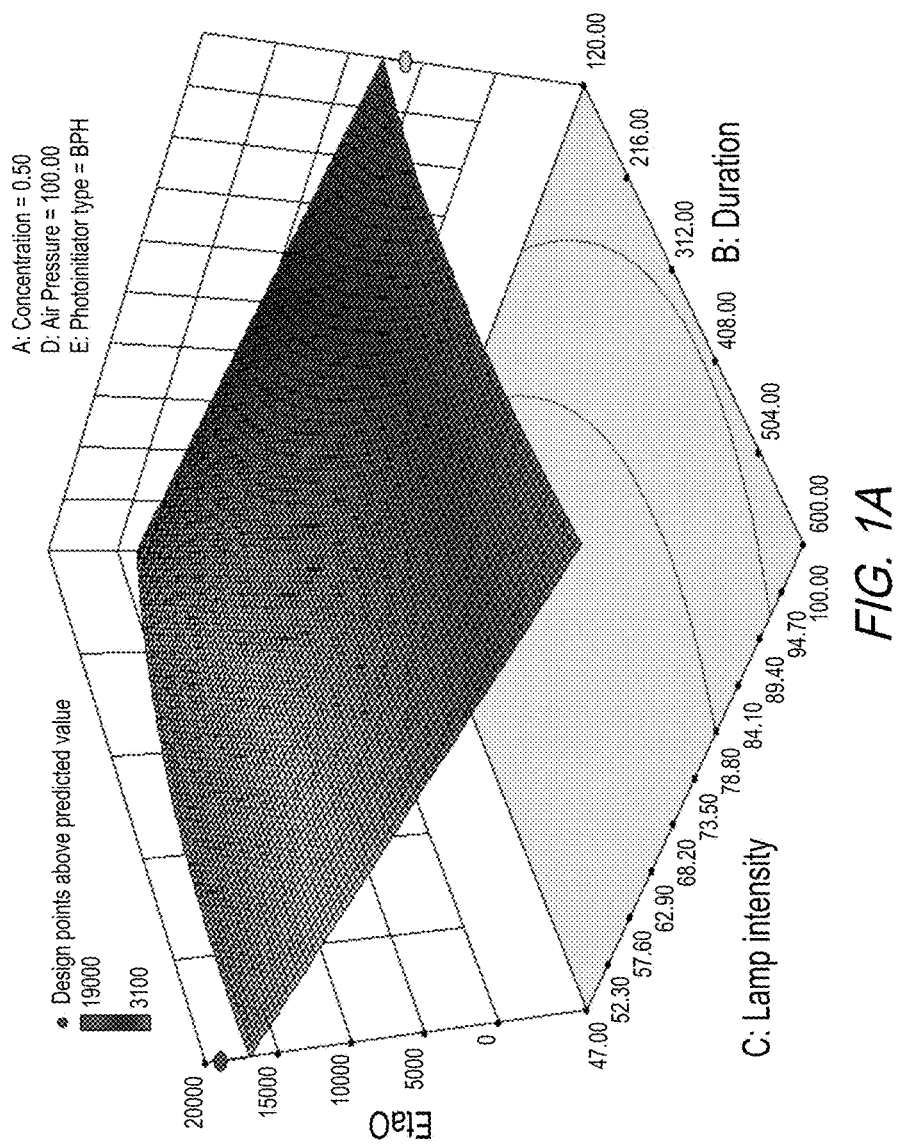
FIG. 1A: Graph showing 3D response surface for zero-shear viscosity.
Figure 1B:
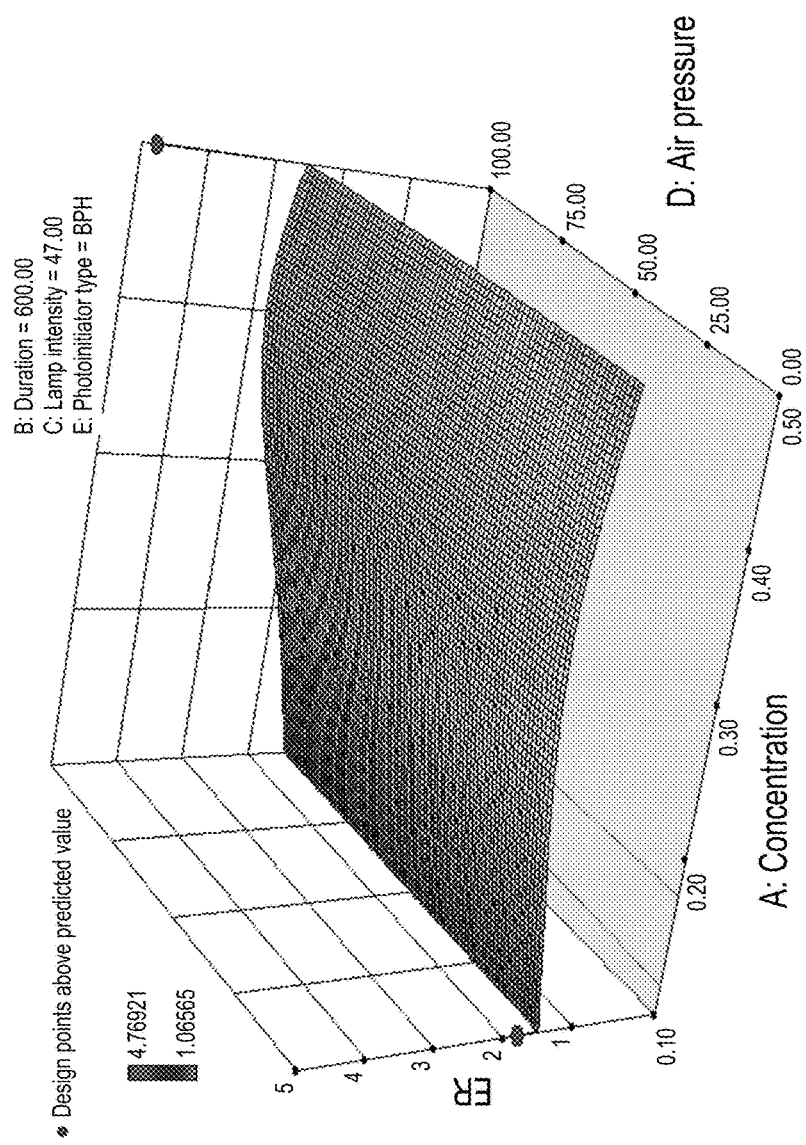
FIG. 1B: Graph showing 3D response surface for rheological polydispersity index of the high molecular weight chains (ER), when BPH is used as the photoinitiator.
Figure 2A:
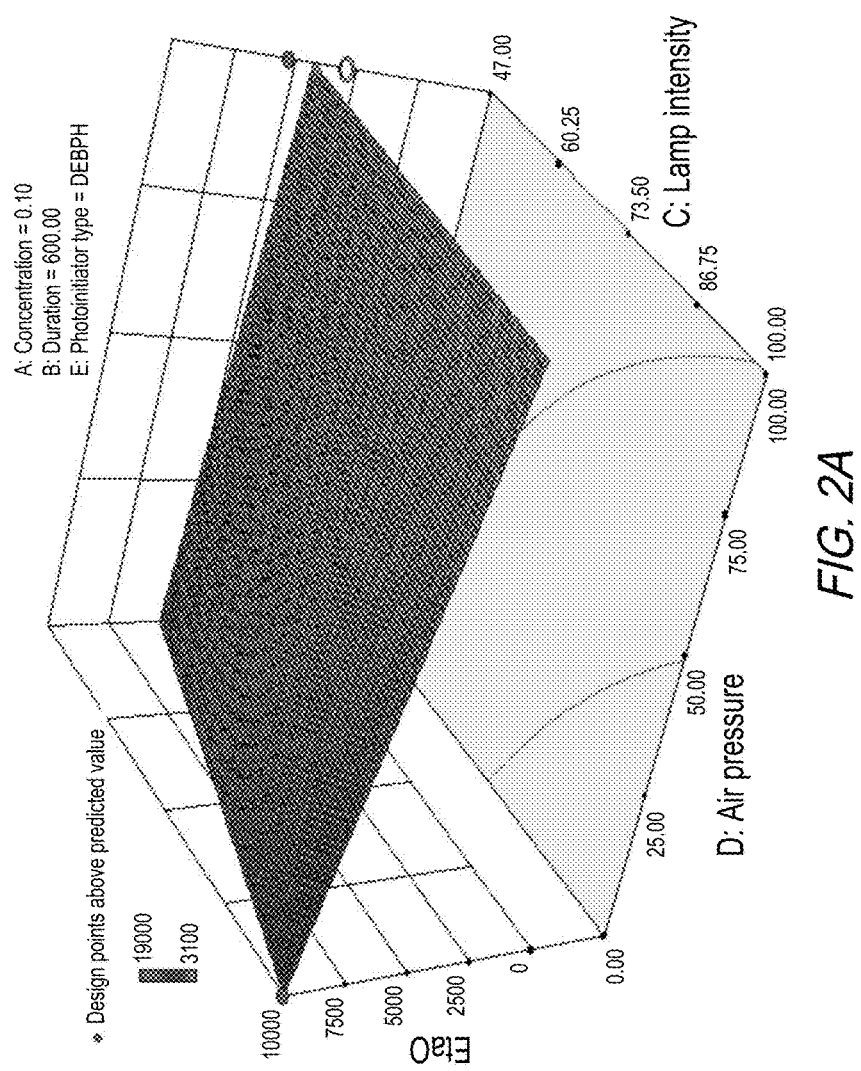
FIG. 2A: Graph showing 3D response surface for zero-shear viscosity.
Figure 2B:
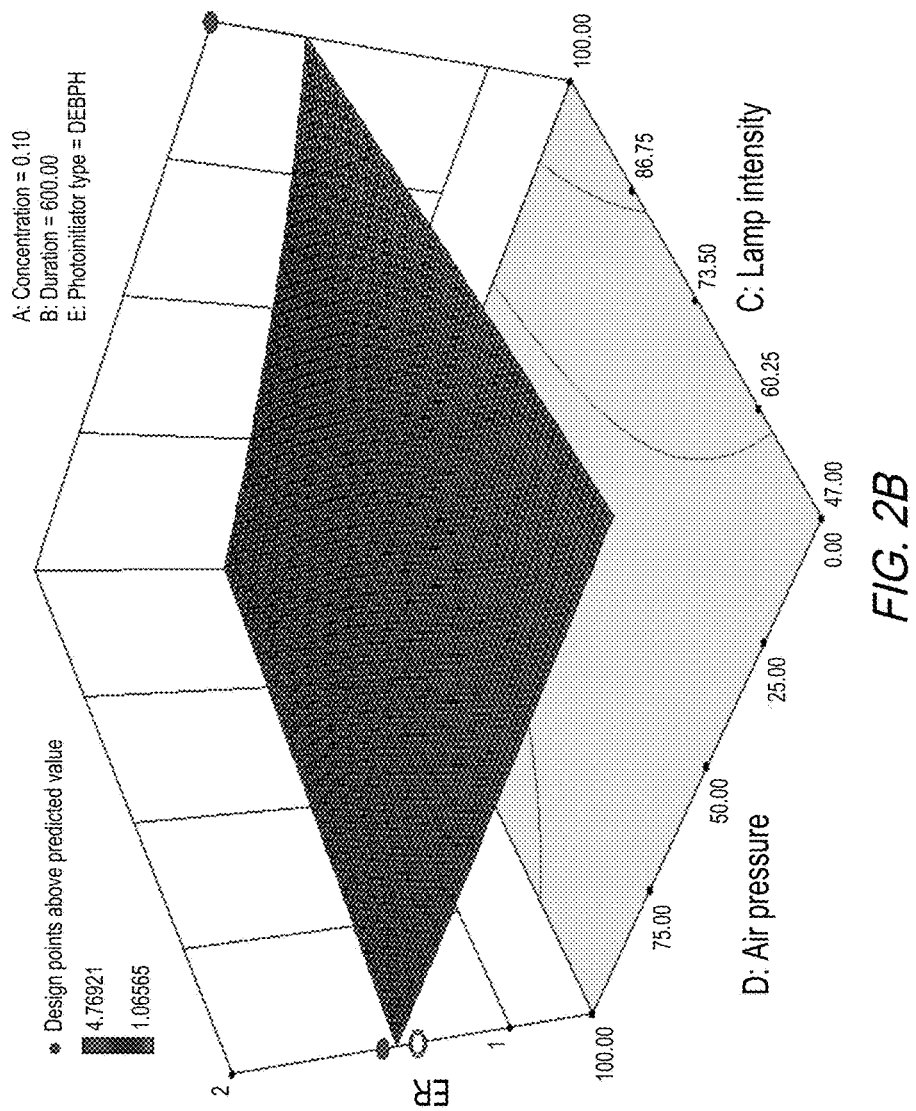
FIG. 2B: Graph showing 3D response surface for ER when DEBPH is used as the photoinitiator.

Described herein are various methods for the modification of polyolefin to improve strain hardening characteristics.

Improved strain hardening behaviour is an important feature to improve the processability of the polyolefin. In particular for the application of the polyolefin in different melt extrusion processes such as blow molding, thermoforming, and foaming.

The methods described herein are for modification of polyolefin to increase long chain branching with is known to increase strain hardening characteristics. It has now been found that polyolefins can be modified under relatively mild conditions. In particular it has been found that polypropylene can be modified by UV radiation without the use of a coagent.

It has been found that modification of polypropylene to increase long chain branching can be achieved with UV radiation by manipulating several variables which may include one or more of type and concentration or photoinitiator, duration of radiation, UV lamp intensity, cooling air pressure.

Linear viscoelastic (LVE) properties are known to be affected significantly by changes in polymer molecular structure characteristics such as LCB, molecular weight (MW) and molecular weight distribution (MWD). Modified polymers produced by the methods described herein have been analyzed to track these properties in order to determine the extent of long chain branching as well other changes in the polymer. Extensional viscosity, gel content, MWD and crystallinity of the modified polymers were measured in order to confirm the presence of LCB.

In one aspect of the disclosure there is provided a method of preparing polyolefin having LCB. In a particular aspect the polyolefin is polyethylene (PE) or polypropylene (PP). In a specific example the polyolefin is polypropylene (PP). In a particular example the polyolefin may be a homopolymer such as polypropylene homopolymer. In a further aspect the polyolefin is a linear polymer. In still a further aspect the polyolefin is a linear polypropylene homopolymer having a melt flow rate (MFR) of 3.5 g/10 min.

In the method the polyolefin is combined with a photoinitiator. The photoinitiator acts to abstract hydrogen from the backbone of the polymer, for instance from the polypropylene (PP) backbone to form a prolypropylene macroradical. The photoinitaitor may include any photoinitiator capable of abstracting hydrogen from the PP backbone in the presence of UV radiation. Examples of suitable photoinitiators include benzophenone (BPH) and benzophenone derivatives such as 4,4'bis diethylamino-benzophenone (DEBPH), 4,4'-Dihydroxybenzophenone, 4-(Dimethylamino)benzophenone, 3,4-Dimethylbenzophenone, 2-MethylBenzophenone, 3-MethylBenzophenone, 2,2'-Dihydroxy-4,4'-dimethoxybenzophenone, 1-Hydroxycyclohexyl phenyl ketone, 2-Hydroxy-2-methylpropiophenone, and 2-Methylanthraquinone. Other suitable initiators may include Xanthone and its derivatives $C_{13}H_8O_2$, Acetophenone $C_6H_5C(O)CH_3$, Anisoin $C_{16}H_{16}O_4$, Anthraquinone $C_{14}H_8$ $O_2$, Benzil $C_6H_5COCOC_6H_5$, Benzoine $C_{14}H_{12}O_2$ (Benzoine ethyl ether $C_6H_5aCOH(OC_2H_5)C_6H_5$ and other derivatives). In a particular example the photoinitiator is BPH or DEBPH.

In a further aspect the concentration of the photoinitiator may be varied depending on the choice of photoinitiator and other features. In one aspect where the photoinitiator is BHP the photoinitiator concentration range may be from about 0.2-1 wt %, in a particular aspect the range may be from about 0.2-0.5 wt %, in another aspect from about 0.5-1 wt %, in a preferred aspect the initiator concentration will be about 0.5 wt %.

The method further comprises irradiating the mixture of polyolefin and photoinitiator. with UV radiation. The source of the UV radiation may be selected to correspond to the photoinitiator selected. For instance in the case where the photoinitiator is BPH or a BPH,derivatives the UV lamp may be a mercury lamp. In a further aspect the lamp intensity may be varied. In a particular aspect the lamp power is 3 kW. The lamp intensity can be controlled as a percentage of the total. In particular embodiments the lamp intensity will be about 47-79% of total with a lamp power of 3 kW. In a further embodiment the lamp intensity will be about 47% with a lamp power of 3 kW.

In another aspect of the method the irradiation time can be varied. The irradiation time may be varied in relation to the lamp intensity, the sample thickness or other parameters. In particular embodiments of the invention the irradiation time may range from about 10 sec. to 15 min. In particular examples from about 120-600 sec., preferably about 360-600 sec., in other examples the range is from about 5-15 min. In still further examples the range may be about 10-40 sec., preferably about 16-36 sec.

In a further aspect of the method the mixture of polypropylene and photoinitiator may be prepared as a solid sample. Irradiation of the mixture may take place in the solid state.

In a further aspect the method may be carried out as a batch process. In a particular example the polypropylene and photoinitiator may be combined and formed to have a desired thickness.

In a particular embodiment PP pellets along with varying amounts of photo-initiator were mixed in a batch mixer at 190° C. and 100 rpm. The samples were subsequently ground using a grinding mill and were compression-moulded into discs at 190° C. under an applied force of 10000 $lb_f$. The discs were then irradiated using a UV lamp for varying time periods using varying lamp intensities.

In still a further aspect the thickness of the sample may be varied. The time and intensity of the irradiation may be varied in relation to the thickness to obtain improved LCB formation. The thickness may range from about 0.3 to 3 mm. In some embodiments the thickness may range from about 1-3 mm. In a particular embodiment the thickness is 1 mm.

In another aspect the method may be carried out as a continuous process, for example as a continuous extrusion process. In one embodiment, irradiation of the sample may be carried out in the melt phase within the extruder. In preferred embodiment irradiation of the sample is done after extrusion of the material from the extruder. The irradiation in this case may be solid state irradiation.

In the embodiment where the material is extruded it may be extruded at a range of thicknesses. In one example the range may 0.3-0.5 mm.

In a further aspect of the method external cooling may be applied during irradiation of the sample with UV, in order to prevent excessive heating of the material during irradiation. Various methods of cooling may be applied however in one example cooling air is provided for this purpose. Cooling air may be supplied at a range of pressures and may be selected to control the temperature depending on the lamp source, intensity and duration of irradiation.

In a particular embodiment of the method the polyolefin is polypropylene the photoinitiator is BPH at a concentration of about 0.2-0.5 wt %. The material prepared at a thickness of 1 mm is irradiated at about 47-79% intensity with a 3 kW lamp power for about 360-600 sec.

In a further aspect of the method the properties of the polymer can be measured and compared to unmodified polymer. For the method described above, the following property changes were observed.

| Property | Change/Improvement |
|---|---|
| Zero-shear viscosity | Up to +150% |
| Average relaxation time | Up to +30,000% |
| Shear thinning index | Up to −20% |
| ER | Up to +300% |
| Modsep | Up to −35% |
| LCB/1000 repeat units | Up to +5% |
| Gel content | Up to +8% |
| Melt strength | At least +200% |
| Melt drawdown velocity | At least +10% |

In another aspect of the method the polyolefin is polypropylene and the photoinitiator is BPH at a concentration of about 0.5 wt %. The material prepared at a thickness of 1-3 mm is irradiated at about 47% intensity with a 3 kW lamp power for about 5-15 min.

The properties of the polymer can be measured and compared to unmodified polymer. For the method described above the following property changes were observed.

| Property | Change/Improvement |
|---|---|
| Zero-shear viscosity | Up to +300% |
| Average relaxation time | Up to +9,000% |
| Shear thinning index | Up to −20% |
| ER | Up to +160% |
| Modsep | Up to −60% |
| LCB/1000 repeat units | Up to +4.5% |
| Gel content | Up to +15% |

In still a further aspect of the method the polyolefin is polypropylene and the photoinitiator is BPH at a concentration of about 0.5-1 wt %. The material is prepared in a continuous extrusion in a sample thickness of about 0.3-0.5 mm and is irradiated at about 47% intensity with a 3 kW lamp power for about 16-36 sec.

The properties of the polymer can be measured and compared to unmodified polymer. For the method described above the following property changes were observed.

| Property | Change/Improvement |
|---|---|
| Zero-shear viscosity | Up to +10,000% |
| Average relaxation time | Up to +10$^7$% |
| Shear thinning index | Up to −25% |
| ER | Up to +700% |
| Modsep | Up to −70% |
| LCB/1000 repeat units | Up to +4% (this is the LCB in the sol fraction) |
| Gel content | Up to +16% |

It is a further aspect of the disclosure to provide a material that is the product of a method disclosed herein. The product being a polyolefin preferably polypropylene having increased long chain branching relative to polypropylene that has not be modified.

The product material produced by the methods disclosed having increased long chain branching compared to non-modified product will also have improved strain hardening behavior. Said materials are suitable to applications that require melt extension. Such applications include but are not limited to thermoforming, blow molding, and foaming.

The following non limiting examples are illustrative of the present disclosure.

Experimental
Design of Experiments
Processing Conditions

The processing condition/variables studied are listed in Table 1, along with their selected levels. These factors will be referred to as A to E.

TABLE 1

Variables and ranges

| Factor | Process variable (units) | Ranges |
|---|---|---|
| A | Photoinitiator concentration (wt %) | 0.1-0.5 (with respect to polymer mixture) |
| B | Duration of radiation (s) | 120-600 |
| C | UV lamp intensity (%) | 47-100 (with respect to total lamp intensity) |
| D | Cooling air pressure (%) | 0-100 (with respect to total airflow pressure) |
| E | Type of photoinitiator (N/A) | BPH and DEBPH |

In Table 1, factor A (photoinitiator concentration) levels are with respect to total weight in the polymer mixture. These ranges for photoinitiator concentration are chosen based on preliminary screening experiments. Factor C, the UV lamp intensity, was adjusted as a percentage of the total UV lamp intensity, which was 1.42 W/m$^2$ at a distance of 1.3 cm from the lamp (3 kW lamp power). Factor D, the cooling air pressure, was expressed as a percentage of the total available air flow (line) pressure (which was 8247 kPa), and adjusted via a pressure regulator. Finally, factor E, the photoinitiator type, included the choices of benzophenone (BPH) and 4,4' bis-diethylamino-benzophenone (DEBPH).

Cooling air pressure was used as a surrogate variable in order to control temperature during the radiation. An increase in lamp intensity (factor C) and decrease in cooling air pressure (factor D) result in a higher temperature level. For all experimental trials, and within the putative range of factors C and D, the temperature level of the environment beneath the lamp varied between 35 to 135° C.

Based on the process variables and levels of Table 1, DesignExpert 8 software (DesExp) was used to design the experimental runs (trials) having the variables as defined in Table 2. The 32 runs of Table 2 are based on the D-optimal design option, which results eventually in models with minimum variance in their parameters with the minimum number of trials. (D-optimality refers to the minimization of the determinant of the parameter variance-covariance matrix and is a standard criterion in statistical designs [15]). Of course, the experimental trials of Table 2 were conducted in a completely randomized order. The starred runs 6, 11, 18, and 22 are completely independent replicates of runs 7, 12, 19 and 23 respectively. The replicates were used to calculate pure error and construct empirical models based on the main factors and their interactions that significantly affect each response. These models were subsequently used to identify conditions which result in the highest LCB content.

TABLE 2

Design of experiments for D-optimal design

| Run ID | A | B | C | D | E |
|---|---|---|---|---|---|
| 1 | 0.5 | 120 | 47 | 0 | BPH |
| 2 | 0.25 | 300 | 47 | 0 | BPH |
| 3 | 0.1 | 600 | 47 | 0 | BPH |
| 4 | 0.1 | 120 | 100 | 0 | BPH |
| 5 | 0.1 | 120 | 100 | 0 | BPH |
| 6* | 0.5 | 600 | 100 | 0 | BPH |
| 7 | 0.5 | 600 | 100 | 0 | BPH |
| 8 | 0.3 | 600 | 47 | 50 | BPH |
| 9 | 0.3 | 360 | 74 | 50 | BPH |

TABLE 2-continued

Design of experiments for D-optimal design

| Run ID | A | B | C | D | E |
|---|---|---|---|---|---|
| 10 | 0.1 | 600 | 100 | 50 | BPH |
| 11* | 0.1 | 120 | 47 | 100 | BPH |
| 12 | 0.1 | 120 | 47 | 100 | BPH |
| 13 | 0.5 | 600 | 47 | 100 | BPH |
| 14 | 0.26 | 600 | 79.2 | 100 | BPH |
| 15 | 0.5 | 120 | 100 | 100 | BPH |
| 16 | 0.1 | 378 | 100 | 100 | BPH |
| 17 | 0.5 | 120 | 47 | 100 | DEBPH |
| 18* | 0.1 | 600 | 47 | 100 | DEBPH |
| 19 | 0.1 | 600 | 47 | 100 | DEBPH |
| 20 | 0.1 | 120 | 76 | 100 | DEBPH |
| 21 | 0.28 | 120 | 100 | 100 | DEBPH |
| 22* | 0.5 | 600 | 100 | 100 | DEBPH |
| 23 | 0.5 | 600 | 100 | 100 | DEBPH |
| 24 | 0.1 | 120 | 47 | 0 | DEBPH |
| 25 | 0.5 | 600 | 47 | 0 | DEBPH |
| 26 | 0.1 | 402 | 69 | 0 | DEBPH |
| 27 | 0.5 | 302 | 67 | 0 | DEBPH |
| 28 | 0.35 | 422 | 100 | 0 | DEBPH |
| 29 | 0.1 | 600 | 100 | 0 | DEBPH |
| 30 | 0.5 | 120 | 100 | 0 | DEBPH |
| 31 | 0.3 | 360 | 74 | 50 | DEBPH |
| 32 | 0.1 | 120 | 100 | 50 | DEBPH |

Process Response Variables (Tests)

The process response variables were the shear thinning index (n), zero shear viscosity ($\eta_0$), relaxation time ($\lambda$) and rheological polydispersity indices (PI, ModSep and ER). These response variables, along with brief descriptions of sample preparation and other measurements, are discussed in the subsection below.

Materials and Sample Preparation

PP homopolymer (Pro-fax PH 382M) from LyondellBasell with a melt flow rate (MFR) of 3.5 g/10 min was used. Benzophenone (BPH), of 99% purity, was purchased from Sigma Aldrich and used as received. 4, 4'-bis-diethylaminobenzophenone (DEBPH), of 99% purity, was purchased from VWR and used as received. BPH and DEBPH were the two selected photoinitiators.

PP pellets along with photoinitiator were melt-mixed in a batch mixer at 190° C. and 100 rpm for 8 minutes. The samples were ground using a Wiley mill (model 1102, Arthur H. Thomas Co.). After grinding, PP-initiator blend granules were compression-moulded into discs with 25 mm diameter and 1 mm thickness at 190° C. under an applied force of 4,400 N for five minutes. The discs were subsequently irradiated using a mercury UV lamp (Versa Cure).

Prior to radiation of the samples, the lamp was turned on for two minutes so that a steady level of radiation intensity was achieved. During irradiation, pressurized air was used to cool down the area beneath the lamp.

Characterization

Rheological Characterization

A stress-controlled parallel plate rheometer (AR2000, TA instruments) was used to measure the rheological properties of the irradiated samples at 190° C. Parallel plates with diameter of 25 mm were used for all shear tests. Strain sweeps were carried out to identify the linear viscoelastic region during the test (typically less than 1% strain over the whole frequency range). Frequency sweeps were subsequently performed in the range of 0.01-100 Hz at a constant strain of 0.9%. From these tests, storage modulus (G'), loss modulus (G''), complex modulus (G*), loss tangent (tan δ), and complex viscosity ($\eta^*$) were obtained at different angular frequencies ($\omega$).

In order to check the validity of the Cox-Merz rule, capillary rheometry was conducted on runs 9, 13 and the parent PP. The validity of the Cox-Merz rule was confirmed, since parallel plate rheometry data ($\eta^*$ vs. $\omega$) were in agreement with capillary rheometry data (shear viscosity vs. shear rate). Thus, the Cross model (Equation 2-1) was fit on $\eta^*$ vs. $\omega$ data to determine the shear thinning index (n), zero shear viscosity ($\eta_0$) and relaxation time ($\lambda$) of each sample.

$$\eta^* = \frac{\eta_0}{1 + (\omega\lambda)^n} \quad \text{Equation 2-1}$$

The parameters in Equation 2-1 were used as indicator variables for further analysis and will be discussed in more detail later. They are summarized in Table 3. It is worth noting that $\eta_0$ is the limiting value of the complex viscosity at very low shear rates where the viscosity of the polymer melt is independent of shear rate (Newtonian viscosity). $\lambda$ represents the terminal relaxation time whose inverse is related to a characteristic shear rate for departure from the Newtonian plateau. The variable "n" is the shear thinning index, which is the slope of the shear thinning region in the $\eta^*$-$\omega$ plots.

Rheological polydispersity indices are determined using Equation 2-2 to 2-5.

$$PI = \frac{10^5}{G_c(\text{Pa})} \quad \text{Equation 2-2}$$

$$ModSep = \frac{\omega'}{\omega''} \quad \text{Equation 2-3}$$

$$ER = C_1 G' \text{ at } G'' = 500 \text{ Pa} \quad \text{Equation 2-4}$$

PI is the so-called rheological "polydispersity index", ModSep stands for "Modulus Separation" and ER is another polydispersity index, more indicative of the high molecular weight end, as introduced by Shroff and Mavridis [84]. These useful rheological polydispersity indices relate to MWD breadth and branching. $G_c$ in Equation 2-2 is the crossover modulus, which is the modulus at which G' and G'' are equal. In Equation 2-3, $\omega'$ and $\omega''$ are the angular frequencies when G' and G'' are equal to 1000 Pa. In Equation 2-4, $C_1$ is the slope of the log (G') versus log (G'') curve.

In Equation 2-2 and Equation 2-3, PI correlates inversely with $G_c$ and ModSep shows the G' and G'' distance from each other at a specific modulus (1000 Pa). It is expected that the values of PI and ModSep reflect the MWD of the runs, while ER is only sensitive to the high MW end of the MWD (essentially, it is the polydispersity of the high molecular weight chains). PI, ModSep and ER were calculated for all of the runs.

The Sentmanat extensional rheometer (SER) universal testing platform (Xpansion instruments) was used to measure extensional flow properties in conjunction with a stress-controlled rotational rheometer (MCR501 by Anton Paar). In this set-up, the uniaxial tensile stress growth coefficient ($\eta^+_E$) is measured over time. Experiments were performed at Hencky strain rates of 0.01, 0.1, 1 and 10 s$^{-1}$ at 180° C. Linear viscoelastic (LVE) measurements were repeated at this temperature to find the linear viscoelastic envelope of ($3\eta^+_0$) needed as a basis to identify strain hardening effects.

Strain hardening for long chain branched samples is exhibited by a positive deviation of $\eta^+_E$ from $(3\eta^+_0)$ Determination of Gel Content The percent gel content of selected samples was found by extraction. The method followed is described in ASTM D2765-11. 0.3±0.015 mg of samples were weighed and wrapped in stainless steel cloth to form a cage. The cage was then weighed and immersed in boiling xylene for 12 h. At that point, the sample cage was dried in a vacuum oven at 130° C. for 24 h and weighed again. The material remaining in the cage is the insoluble fraction (gel fraction) of the modified PP.

Gel Permeation Chromatography (GPC)

High temperature GPC (Polymer CHAR (Spain)) was used to determine molecular weight (MW), molecular weight distribution (MWD), polydispersity index (PDI) and intrinsic viscosity [η] of the runs. Refractive index, FTIR and viscometer detectors were employed to characterize each slice of the chromatogram. The GPC set-up had three columns in series (PLgel Olexis, mixed), and each column was 30 cm long with a diameter of 7.5 mm. 1, 2, 4-trichlorobenzene (TCB) was used as the GPC solvent at 135° C. 13-15 mg of each sample was dissolved in 9 ml of TCB at 160° C. for 90 minutes. The solutions were inspected visually first for complete dissolution prior to injection. 250 mg/l Irganox 1010 was used as stabilizer. Each run was independently replicated once.

It is well known that GPC is not the most reliable tool for determining low degrees of long chain branching in PP. However, one can still compare intrinsic viscosities of linear and branched PP and make qualitative conclusions about the presence of long chain branches.

The mean squared radius of gyration $R_g$, is related to the intrinsic viscosity [η] of a polymer of molecular weight M in solution via Equation 2-5.

$$[\eta] \propto \frac{R_g}{M} \qquad \text{Equation 2-5}$$

It is known that the presence of LCB leads to lower end-to-end distance of polymer chains and denser polymer coils. Thus, a lower intrinsic viscosity [η] and radius of gyration $R_g$ will result for a long chain branched polymer compared to its linear counterpart of the same molecular weight. Therefore, in a plot of $R_g$ or [η] versus M, the linear samples will show linear behaviour, whereas a branched polymer will start deviating from the linear behaviour (towards smaller values) at higher molecular weights. One can use these plots for each slice of the GPC chromatogram, thus creating a contrast between linear and branched structures.

For a more quantitative measure, the Zimm-Stockmayer branching parameter is used to determine number of branches in the polymer. This parameter represents the ratio of the mean squared radius of gyration of branched to linear polymer. The Zimm-Stockmayer branching parameter, g, can also be obtained from the ratio of intrinsic viscosity of branched to linear polymer (Equation 2-6).

$$g = \frac{R_{g\ branch}}{R_{g\ linear}} = (g')^{1/\varepsilon} = \left(\frac{[\eta]_{branch}}{[\eta]_{linear}}\right)^{1/\varepsilon} \qquad \text{Equation 2-5}$$

In Equation 2-6, ε is a constant between 0.5-1.5 for different branching configurations. Theoretical functions for ε of different branching structures are described in the literature. This value is equal to 0.75 for randomly branched polymers. In Equation 2-6, g becomes lower than 1 for branched PP. Zimm and Stockmayer suggested Equation 2-7 for the evaluation of the weight average number of long chain branches in a polymer (Bw). This equation for a trifunctional randomly branched polymer is:

$$g = \frac{6}{Bw}\left[0.5\left(\frac{Bw}{7}\right)^{0.5} + \ln\left(\frac{(2+Bw)^{0.5} + Bw^{0.5}}{(2+Bw)^{0.5} - Bw^{0.5}}\right) - 1\right] \qquad \text{Equation 2-6}$$

By obtaining the Zimm-Stockmayer branching parameter g (Equation 2-6) first from GPC measurements, the weight average number of long chain branches is evaluated using Equation 2-7. The number of long chain branches per 1000 repeating units is subsequently obtained by Equation 2-8.

$$N_{LCB} = 1000 * M_m * \frac{Bw}{M} \qquad \text{Equation 2-7}$$

In Equation 2-8, $M_m$ is the molar mass of the monomer and M is the molar mass of the branched molecules.

Thermal Properties

Differential scanning calorimetry (DSC) was used to determine the effect of UV treatment on the crystallinity of selective runs. Q2000 DSC controlled by a TA processor was used to conduct the DSC tests. The DSC conditions (sample size close to 5 mg) were as follows: Cycle 1: temperature sweep from 35° C. to 210° C., heating rate of 20° C. min$^{-1}$; Cycle 2: temperature sweep from 210° C. to 35° C., cooling rate of 10° C. min$^{-1}$; and finally, Cycle 3: temperature sweep from 35° C. to 210° C., heating rate of 10° C. min$^{-1}$. Cycle 1 is to erase the previous thermal history of the polymer, whereas Cycles 2 and 3 are used to determine crystallization and melting points. All cycles were done under 50 ml/min nitrogen. The DSC data were analyzed by Universal Analysis 2000 software (TA Instruments).

The percentage crystallinity of each sample was calculated as:

$$X_c = \frac{\Delta H_f}{\Delta H_f^{100\%\ crystalline\ PP}} * 100 \qquad \text{Equation 2-8}$$

In Equation 2-9, $\Delta H_f$ is the melting enthalpy of the experimental sample in question, which is measured by integrating the area under the melting peak. The denominator represents the melting enthalpy of a 100% crystalline PP sample. This has been found to be 209 J/g for a 100% crystalline pure PP.

Melting temperature ($T_m$), crystallization temperature ($T_c$) and $X_c$ were determined as complementary aids to study the effect of degradation and LCB on some of the modified samples and compare them with the parent PP. $T_m$, $T_c$ and $X_c$ of the parent PP were 164° C., 131° C. and 44.5%, respectively.

DSC showed that the $T_m$ and $T_c$ values of the modified runs did not change compared to the parent PP characteristics. $T_m$ was in the range of 162-164° C. and $T_c$ was in the range of 129-131 for the runs. Moreover, the crystallinity levels of all runs were in the range of 44-45%, except for the runs that showed degradation. These 'degraded' runs exhibited lower crystallinity (38-39%), as expected, due to the presence of shorter chains.

Results/Examples and Discussion

Statistical Analysis of LVE Properties

LVE properties such as n, $\eta_0$ and $\lambda$ were determined by fitting Equation 2-1 to $\eta^*$ vs. $\omega$ data. In addition, rheology indices (PI, ModSep and ER) were determined using Equation 2-2, Equation 2-3 and Equation 2-4. These values are summarized in Table 3. Again, starred runs represent independent replicates of the runs below them, as per Table 2.

TABLE 3

LVE responses along with rheological polydispersity data for experimental runs

| Run ID | n | $\eta_0$ (Pa·s) | $\lambda$(s) | PI | ModSep | ER |
|---|---|---|---|---|---|---|
| 1 | 0.51 | 5579 | 0.88 | 3.83 | 3.59 | 1.33 |
| 2 | 0.49 | 6430 | 2.03 | 4.30 | 3.19 | 1.78 |
| 3 | 0.50 | 5953 | 1.31 | 4.19 | 3.19 | 1.86 |
| 4 | 0.53 | 4491 | 0.59 | 4.03 | 3.46 | 1.52 |
| 5 | 0.55 | 3316 | 0.45 | 3.74 | 3.81 | 1.11 |
| 6* | 0.50 | 6184 | 1.86 | 4.42 | 2.85 | 2.15 |
| 7 | 0.60 | 5800 | 0.70 | 4.80 | 2.87 | 1.88 |
| 8 | 0.48 | 8570 | 2.53 | 3.88 | 3.19 | 1.79 |
| 9 | 0.49 | 10000 | 14.87 | 5.19 | 2.71 | 2.89 |
| 10 | 0.58 | 3446 | 0.30 | 3.53 | 3.55 | 1.38 |
| 11* | 0.54 | 4670 | 0.55 | 4.01 | 3.53 | 1.24 |
| 12 | 0.54 | 4871.5 | 0.48 | 3.66 | 3.74 | 1.16 |
| 13 | 0.46 | 19000 | 227.37 | 6.87 | 2.39 | 4.77 |
| 14 | 0.54 | 9079 | 2.40 | 4.87 | 2.83 | 2.18 |
| 15 | 0.52 | 6469 | 1.44 | 4.42 | 3.23 | 1.48 |
| 16 | 0.50 | 7479 | 1.99 | 3.97 | 3.45 | 1.36 |
| 17 | 0.59 | 5341 | 0.39 | 3.64 | 3.81 | 1.08 |
| 18* | 0.60 | 3035 | 0.18 | 3.42 | 3.83 | 1.48 |
| 19 | 0.60 | 3191 | 0.19 | 3.30 | 4.04 | 1.35 |
| 20 | 0.58 | 5353 | 0.45 | 4.04 | 3.60 | 1.28 |
| 21 | 0.57 | 5251 | 0.42 | 3.77 | 3.72 | 1.12 |
| 22* | 0.57 | 5902 | 0.53 | 3.70 | 3.60 | 1.21 |
| 23 | 0.58 | 6193 | 0.59 | 3.95 | 3.47 | 1.22 |
| 24 | 0.60 | 3819 | 0.33 | 4.84 | 3.48 | 1.31 |
| 25 | 0.56 | 5519 | 0.51 | 3.86 | 3.65 | 1.07 |
| 26 | 0.54 | 6456 | 0.69 | 3.58 | 3.59 | 1.26 |
| 27 | 0.57 | 5779 | 0.49 | 3.66 | 3.70 | 1.10 |
| 28 | 0.56 | 6802 | 0.88 | 4.65 | 3.37 | 1.66 |
| 29 | 0.54 | 10970 | 2.13 | 4.72 | 3.15 | 2.00 |
| 30 | 0.57 | 6652 | 0.59 | 3.86 | 3.59 | 1.25 |
| 31 | 0.56 | 5834 | 0.60 | 3.85 | 3.58 | 1.20 |
| 32 | 0.57 | 5613 | 0.46 | 3.68 | 3.68 | 1.11 |
| PP | 0.57 | 7828 | 0.67 | 3.58 | 3.68 | 1.19 |

Table 4 summarizes literature remarks on the effect of LCB and degradation on LVE properties. This table was used as a road-map for qualitative analysis of the runs. By comparing the LVE properties of the experimental runs with the parent PP (designated as PP at the end of Table 3) and using Table 4, several diagnostic remarks can be made for each experimental trial (of Table 3). These remarks are cited in Table 5.

TABLE 4

Summary of literature remarks for assessing LCB or degradation in the runs

| Response | Polymer conformation | References |
|---|---|---|
| n | Increase in n: narrowing MWD along with degradation | [18] |
| | Decrease in n: LCB and/or broadening MWD | |
| $\eta_0$ | Increase in $\eta_0$: increase in MW and/or LCB | [1, 25] |
| | Decrease in $\eta_0$: decrease in MW (degradation) | |
| $\lambda$ | Increase in $\lambda$: broader MWD and/or LCB | [1, 25] |
| | Decrease in $\lambda$: narrower MWD | |

TABLE 4-continued

Summary of literature remarks for assessing LCB or degradation in the runs

| Response | Polymer conformation | References |
|---|---|---|
| PI | Increase: broader MWD | [16] |
| | Decrease: narrower MWD | |
| ModSep | Increase: narrower MWD | [16] |
| | Decrease: broader MWD | |
| ER | Increase: broader distribution of the high molecular weight chains and/or LCB | [16] |
| | Decrease: narrower distribution of the high molecular weight chains and/or degradation | |
| G'-$\omega$ | The slope of Log G'-Log $\omega$ graph at terminal region is 2 for linear polymer | [1, 18, 26] |
| | Deviation to lower slopes is an indication of LCB | |
| | Larger G' at low $\omega$: LCB and/or CL | |
| G''-$\omega$ | The slope of Log G''-Log $\omega$ graph at terminal region is 1 for linear polymer | [1, 18, 26] |
| | Deviation to lower slopes is an indication of LCB | |
| Cole-Cole plot (G'-G'') | Above the linear reference sample: high MWD and/or LCB | [16] |
| | Below the linear reference sample: lower MWD | |
| tan$\delta$-G* | Above the linear reference sample: high MWD and/or LCB | [16, 27, 28] |
| | Below the linear reference sample: lower MWD | |

TABLE 5

Possible molecular structure (relative to parent PP) of the different runs based on LVE data

| Run ID | Molecular structure |
|---|---|
| 1 | Possibility of very small amount of LCB and/or broadening MWD along with degradation, formation of shorter chains |
| 2 | Possibility of very small amount of LCB and/or broadening MWD along with degradation, formation of smaller chains |
| 3 | Possibility of very small amount of LCB and/or broadening MWD along with degradation, formation of shorter chains |
| 4 | Degradation, lower MW |
| 5 | Degradation, lower MW |
| 6* | Possibility of very small amount of LCB and/or broadening MWD along with degradation, formation of shorter chains |
| 7 | |
| 8 | Possibility of LCB, crosslinking and/or broadening MWD |
| 9 | Possibility of LCB, crosslinking and/or broadening MWD |
| 10 | Degradation, lower MW |
| 11* | Degradation, lower MW |
| 12 | |
| 13 | Possibility of LCB, crosslinking and/or broadening MWD |
| 14 | Possibility of LCB, crosslinking and/or broadening MWD |
| 15 | Possibility of very small amount of LCB and/or broadening MWD along with degradation, formation of shorter chains |
| 16 | Possibility of very small amount of LCB and/or broadening MWD along with degradation, formation of shorter chains |
| 17 | Degradation, lower MW |
| 18* | Degradation, lower MW |
| 19 | |
| 20 | Degradation, lower MW |
| 21 | Degradation, lower MW |
| 22* | Degradation, lower MW |
| 23 | |
| 24 | Degradation, lower MW |
| 25 | Degradation, lower MW |
| 26 | Degradation, lower MW |
| 27 | Degradation, lower MW |
| 28 | Possibility of very small amount of LCB and/or broadening MWD along with degradation, formation of shorter chains |
| 29 | Possibility of LCB, crosslinking and/or broadening MWD |
| 30 | Degradation, lower MW |

TABLE 5-continued

Possible molecular structure (relative to parent PP) of the different runs based on LVE data

| Run ID | Molecular structure |
|---|---|
| 31 | Degradation, lower MW |
| 32 | Degradation, lower MW |

FIGS. 1A, 1B, 2A and 2B show representative response surface graphs for $\eta_0$ and ER. Other LVE properties such as n and $\lambda$ show similar trends.

On the other hand, using DEBPH mostly results in degraded PP except when samples have the lowest concentration of DEBPH and are radiated for long durations (600 s). By decreasing the cooling air pressure and increasing lamp intensity, $\eta_0$ and ER reach their highest values for this initiator (FIG. 2). Although the above mentioned conditions result in the maximum of $\eta_0$ and ER for DEBPH as photoinitiator, larger values for $\eta_0$ and ER can be obtained using BPH at its optimum conditions (high concentration, long radiation duration, low lamp intensity and high cooling air pressure).

Run 29 (the black dot at the maximum of the $\eta_0$ and ER graphs of FIG. 2) was chosen among the runs prepared with DEBPH that shows indications of LCB. More detailed tests were thus conducted to confirm formation of LCB and/or CL using DEBPH at the above mentioned radiation conditions (see also Table 2).

LVE Graphs of Selected Runs

Figure 3:
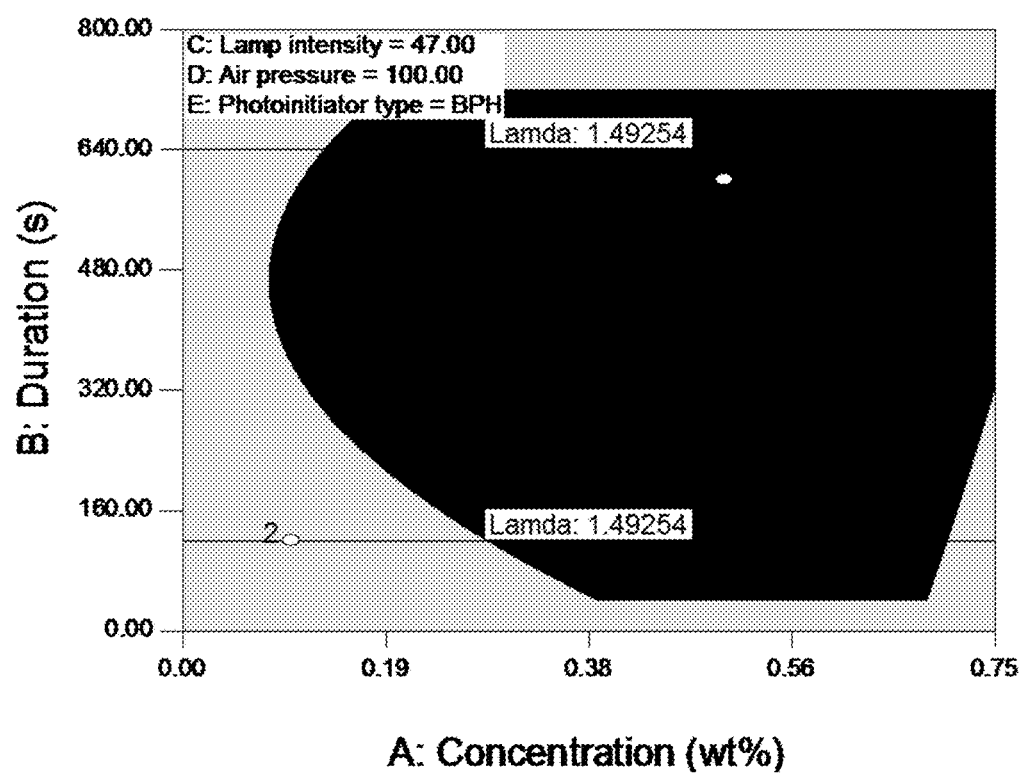
FIG. 3: Graph depicting a processing window that maximizes degree of LCB using BPH.
Figure 4:
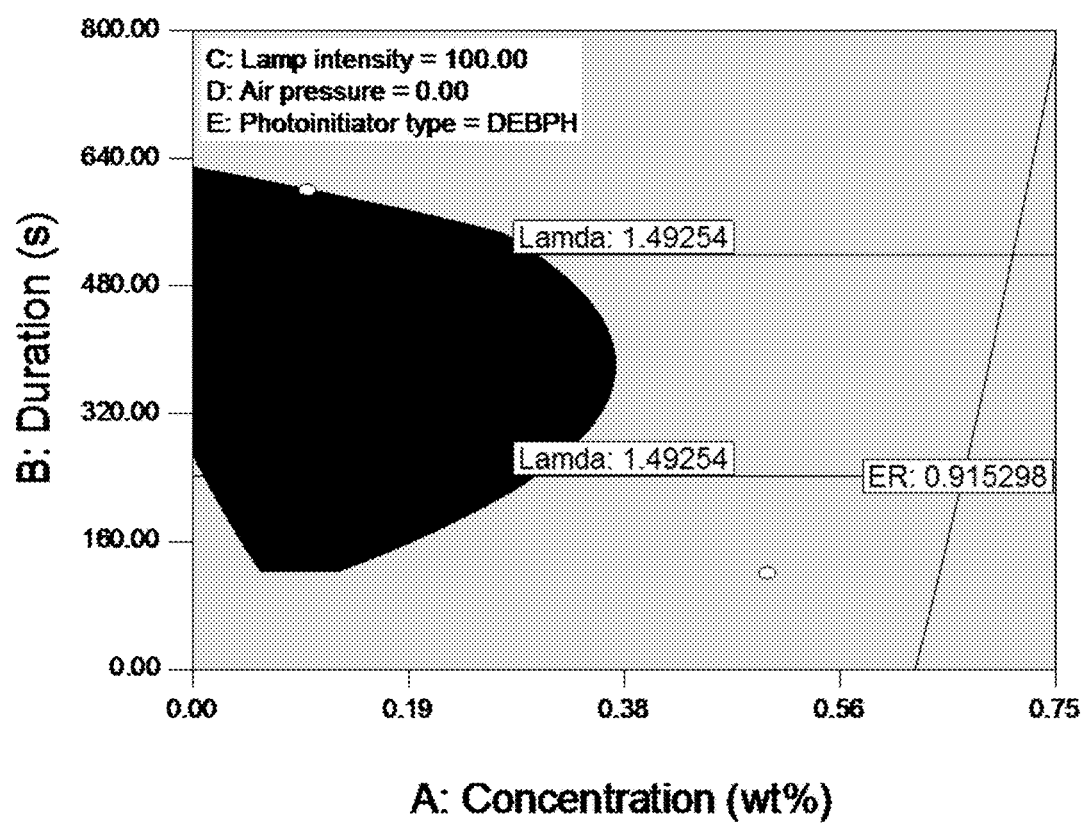
FIG. 4: Graph depicting a processing window that maximizes degree of LCB using DEBPH.

In the previous section, LVE properties which were extracted from $\eta^*$, G' and G" versus angular frequency ($\omega$) graphs were analyzed to find conditions that result in the largest level of LCB. In this section, these graphs along with Cole-Cole plots and tan $\delta$ versus frequency information are analyzed more closely for selective runs. Other tests such as GPC, extensional rheometry and gel content determination were performed on the same representative runs to confirm formation of LCB or network or degradation. Among runs (see Table 2 to Table 5 for a summary of these runs along with brief commentary about the expectations from each run) that exhibited the potential for formation of branches or network, runs 9, 13 and 29 were chosen. Run 29 was the only run, prepared via DEBPH, that showed indications of LCB. Runs 9 and 13 had the largest and second largest values of $\eta_0$, $\lambda$ and ER, respectively (see Table 3). Runs 10 and 11 were selected among the runs that showed a strong possibility for degradation, since the $\eta_0$, $\lambda$ and ER values of these runs were quite low (see Table 3). FIG. 3 and FIG. 4 show G' and $\eta^*$ versus $\omega$ for these runs in comparison to parent PP.

Figure 5:
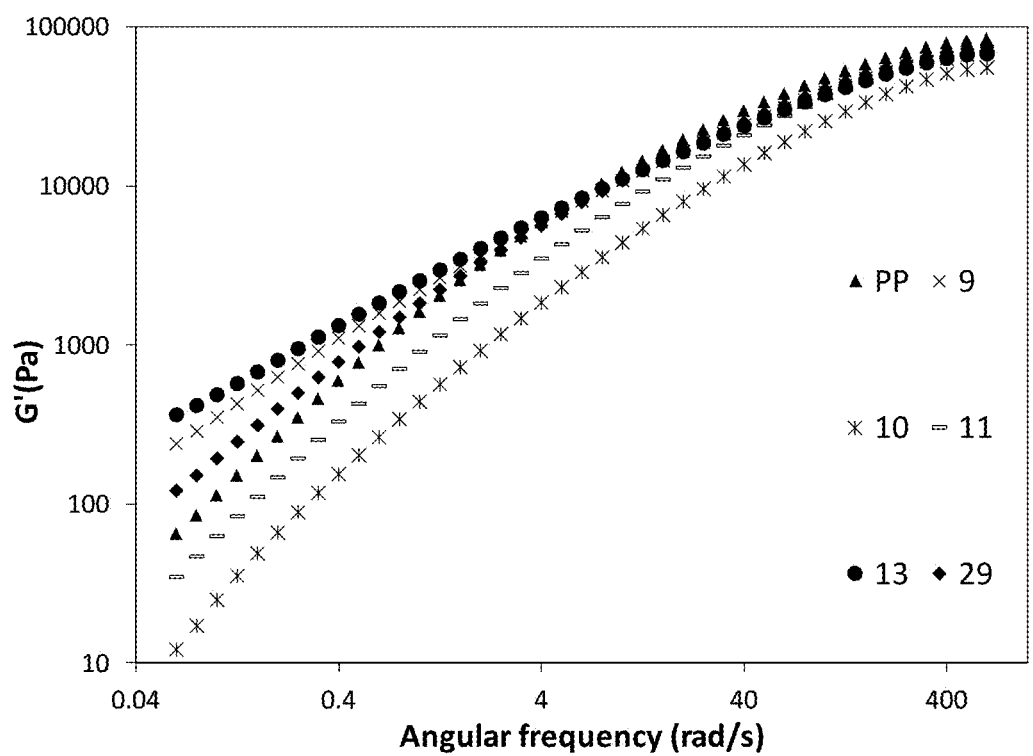
FIG. 5: Graph showing storage modulus (G') versus angular frequency for runs 9, 10, 11, 13, 29 and parent PP.
Figure 6:
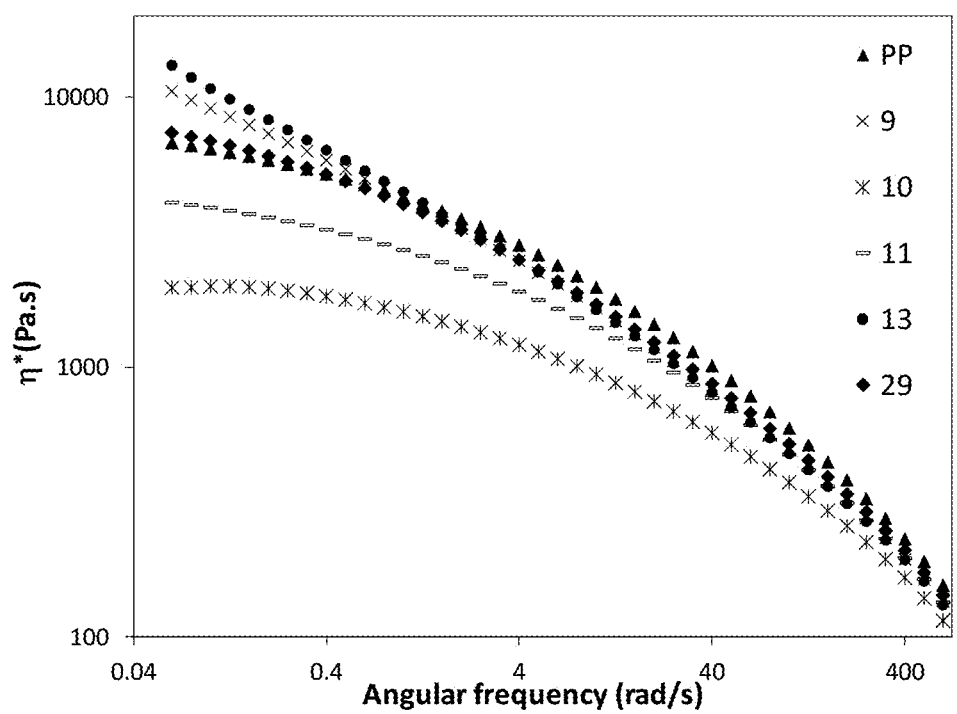
FIG. 6: Graph showing complex viscosity ($\eta^*$) versus angular frequency for runs 9, 10, 11, 13, 29 and parent PP.

From FIG. 5, it can be seen that runs 9, 13 and 29 have higher G' values in comparison to the parent PP. This is due to formation of structures in the polymer that are responsible for elasticity (LCB or CL). FIG. 6 shows $\eta^*$ versus $\omega$ for these runs. Run 9, 13 and 29 show larger $\eta^*$ values at low angular frequencies ($\omega$). This is due to the presence of higher MW chains in their structure. Also, these curves are more shear sensitive (steeper slope of $\eta^*$ versus $\omega$) in comparison to parent PP and the 'degraded' runs (10 and 11). Both manifestations can be due to formation of LCB and/or broadening of MWD.

Figure 7:
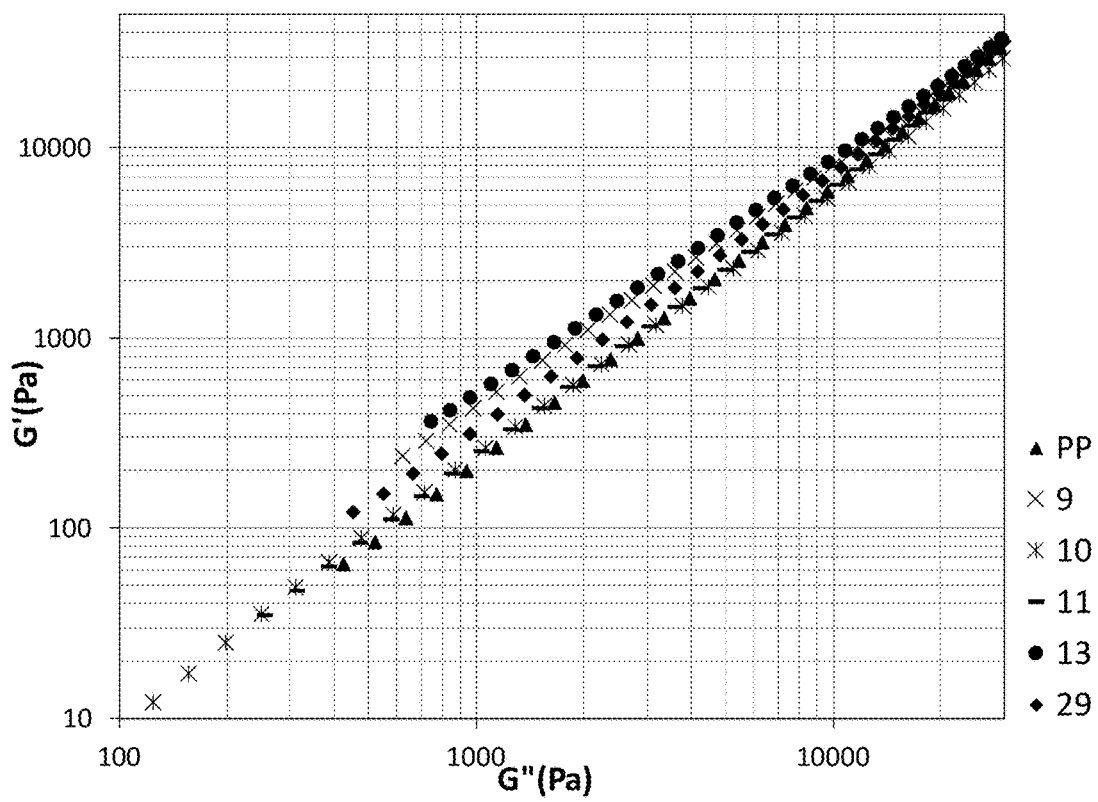
FIG. 7: Graph showing Cole-Cole plots for runs 9, 10, 11, 13, 29 and parent PP.

FIG. 7 shows Cole-Cole plots. The ratio of G' versus G" is another indication for formation of LCB. Runs with broader MWD or runs with LCB in their chains deviate from linear PP (reference or parent PP) to higher G' values at low G" ranges (small frequencies). Run 9, 13 and 29 clearly show this deviation from parent PP (and the 'degraded' runs 10 and 11).

Figure 8:
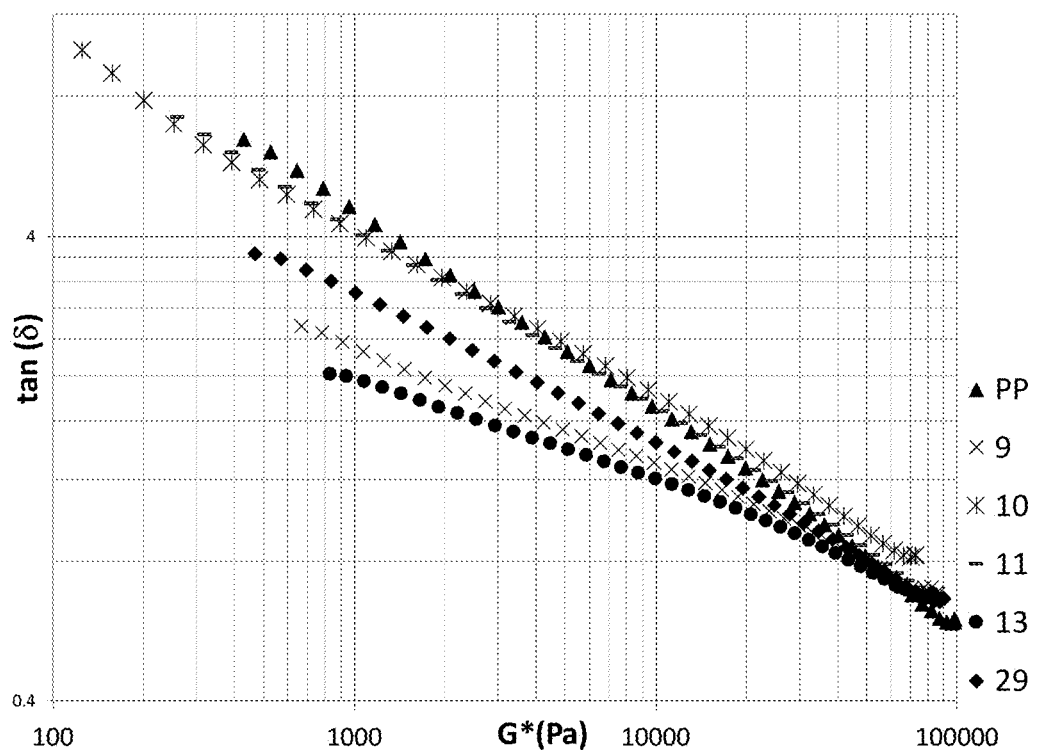
FIG. 8: Graph showing tan (δ) versus complex modulus (G*) for runs 9, 10, 11, 13, 29 and parent PP.

For the final check, in this group of characterization tests, FIG. 8 shows loss tangent (tan $\delta$) versus G* for the same runs. Both Cole-Cole plots and tan ($\delta$)-G* are affected by the PDI of the MWD rather than simply the MW. Tan $\delta$-G* plots are more sensitive to changes in MWD and LCB compared to Cole-Cole plots. It can be seen that at low frequencies, runs 9, 13 and 29 that show signs of LCB have the lowest tan($\delta$)-G* curves compared to linear 'degraded' and parent PP. This again points to the direction towards the presence of long branches and/or broader MWD, as did FIG. 7 earlier.

Extensional Rheometry

Extensional viscosity measurements were conducted to confirm the presence of LCB in the modified PP runs. The same experimental runs (9, 10, 11, 13, 29 and PP) were characterized using the Sentmanat extensional rheometer (SER). Each test was independently replicated three times. The values of the uniaxial tensile stress growth coefficient ($\eta^+_E$) versus time for these runs are plotted in FIG. 9 (a and b) at strain rates of 0.01, 0.1, 1 and 10 s$^{-1}$, respectively. The continuous solid lines in FIG. 9 (a and b) represent three times the shear stress growth coefficient from parallel plate rheometry (i.e., 3 $\eta^+_0$ (t)), in order to have a better visual comparison between the extensional viscosity data and Trouton's law. An increasing $\eta^+_E$ above Trouton's law levels indicates strain hardening and this behavior is expected from long chain branched polymers.

Figure 9A:
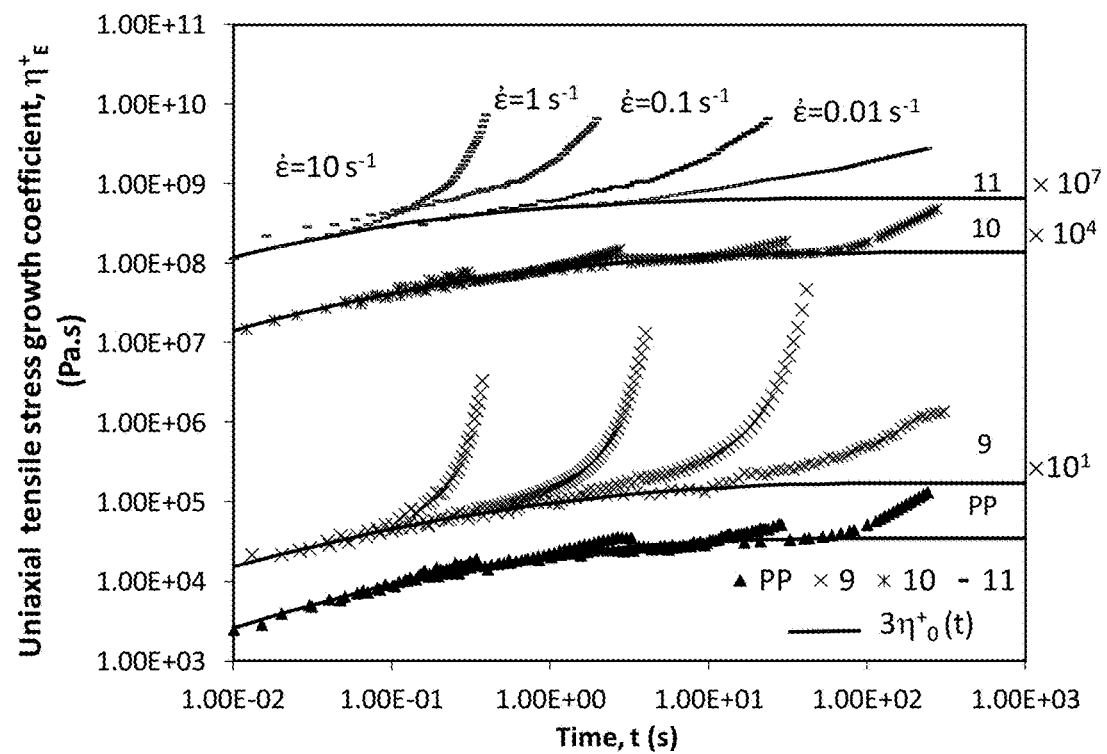
FIG. 9A: Graph showing uniaxial tensile stress growth coefficient (η*E) vs. time for runs 9, 10, 11 and parent PP at Hencky strain rates of 0.01, 0.1, 1, and 10 s-1.
Figure 9B:
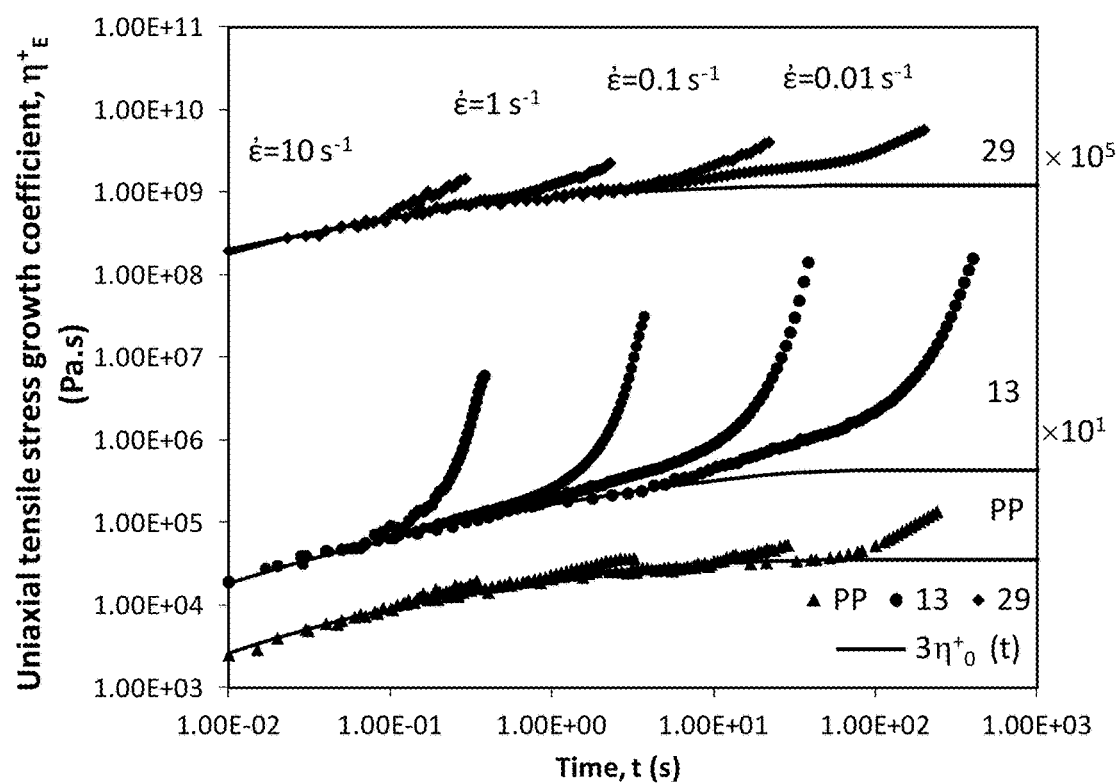
FIG. 9B: Graph showing uniaxial tensile stress growth coefficient (η*E) vs. time for runs 13, 29, and PP parent at Hencky strain rates of 0.01, 0.1, 1 and 10 s-1.

FIG. 9-A and FIG. 9B indicate that the parent PP does not show significant strain hardening behavior. $\eta^+_E$ clearly increased at all strain rates for runs 9 (FIGS. 9a) and 13 (FIG. 9b) compared to parent PP. As expected, the 'degraded' runs (runs 10 and 11) do not show significant increases in $\eta^+_E$ compared to the parent PP (FIG. 9a). Run 29, which has a larger $\eta_0$ than parent PP (see Table 3), shows again rather insignificant strain hardening compared to runs 9 and 13. This might be due to formation (in run 29) of isolated CL structures rather than LCB, since isolated CL does not lead to significant increase in extensional viscosity (see discussion about gel content which follows).

In order to compare the degree of strain hardening among the runs, the strain hardening coefficient (SHC) was determined (Equation 3-1).

$$SHC = \frac{\eta^+_E(t, \dot{\varepsilon})}{3\eta^+_0(t)} \qquad \text{Equation 3-1}$$

In Equation 3-1, $\eta^+_E$ (t,$\epsilon$') is the uniaxial tensile stress growth coefficient at the Hencky strain of 2.71. $\eta^+_0$ (t) is the shear stress growth coefficient. Equation 3-1 describes the extent of deviation from Trouton's law, which is due to formation of LCB. Values of SHC acquired at different Hencky strain rates (0.01, 0.1, 1 and 10 s$^{-1}$) are shown in FIG. 10.

Figure 10:
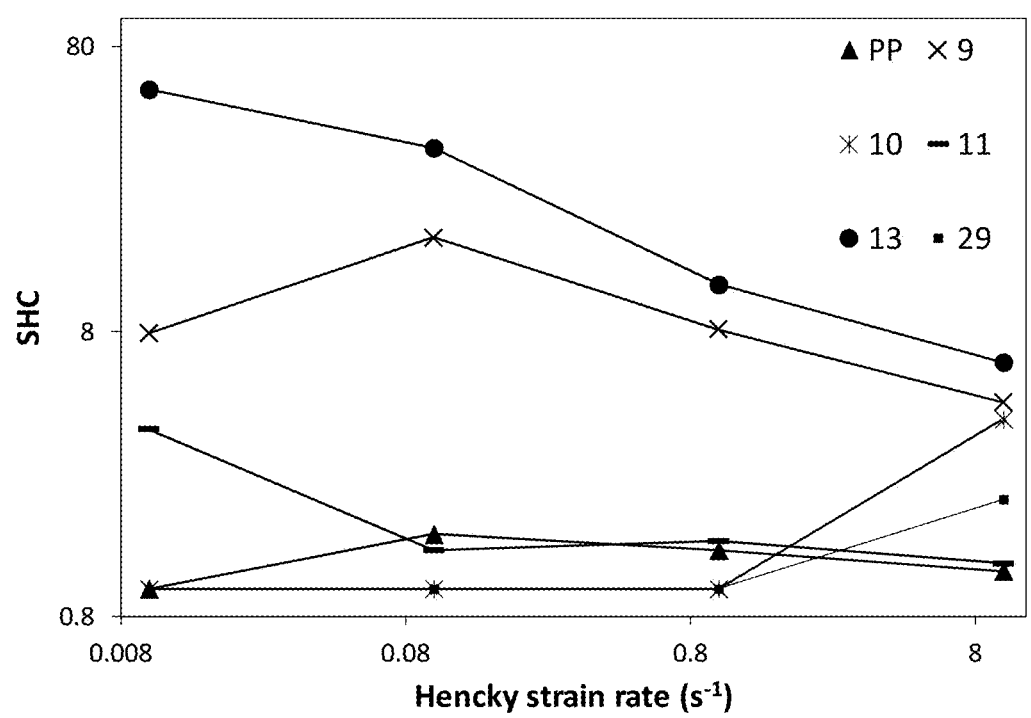
FIG. 10: Graph showing strain hardening coefficient (SHC) versus Hencky strain rate for runs 9, 10, 11, 13, 29, and PP (lines are simply visual guides)

FIG. 10 indicates that runs 9 and 13 show a much higher level of extensional viscosity at all strain rates compared to the other runs. This is in agreement with parallel plate rheometry data, thus confirming the presence of LCB or CL in these two runs. The parent PP shows a slight increase in SHC which might be due to the presence of high molecular weight linear structures and the broad molecular weight distribution of the parent PP. Runs 10 and 11 fail to show considerable increases in SHC compared to parent PP.

Gel Content

Gel content levels of runs 9, 10, 11, 13, 29 and the parent PP were determined and the results are summarized in FIG. 9. Each run was independently replicated and standard deviation values calculated and reported in FIG. 11.

Figure 11:
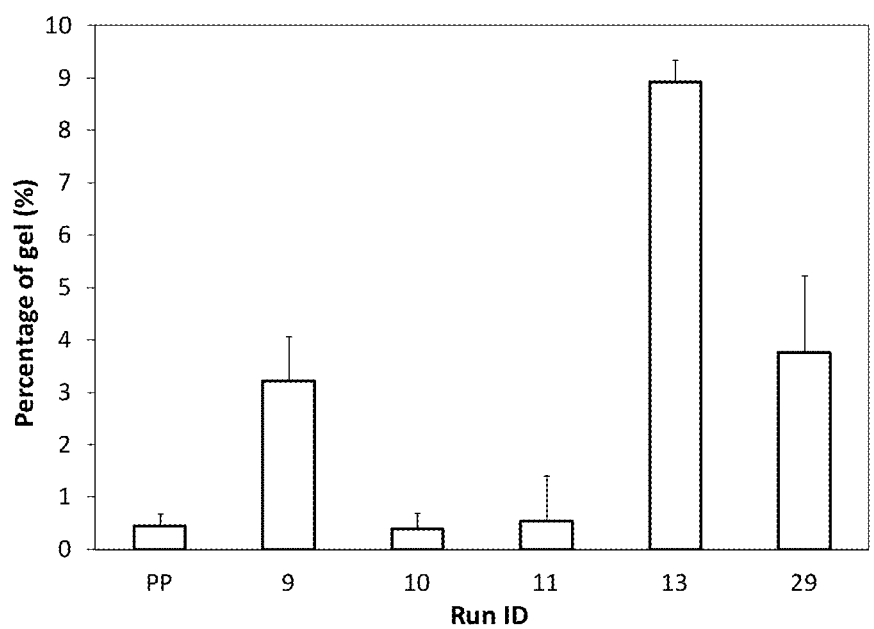
FIG. 11: Graph showing gel fraction of runs 9, 10, 11, 13, 29 and parent PP.

A gel fraction in FIG. 11 below 1% signifies zero gel content, for all practical purposes, as the calculation denotes typical noise related to the nature of the measurements. As expected, there was no gel in the parent PP. Similarly, runs 10 and 11, the 'degraded' runs, do not show any insoluble fraction either. Run 13 shows the highest percentage of gel. Thus, the strain hardening behavior observed from extensional rheometry for this run can be attributed to both formation of LCB and CL. Moreover, runs 9 and 29 show about the same percentage of gel. However, in extensional rheometry run 9 shows significantly higher strain hardening behavior compared to run 29 (see FIG. 10). Thus, the higher SHC level of run 9 can be attributed to formation of LCB in addition to CL. LCB is not formed in run 29 and, therefore, the higher values of $\eta_0$ and $\lambda$ of run 29 can be due to the presence of 3.7% gel. Formation of LCB in run 9 has also been confirmed by GPC test results (see further discussion in section 3.4).

GPC Results

The results for number average MW($\bar{M}_n$), weight average MW ($\bar{M}_w$), z-average MW ($\bar{M}_z$) and polydispersity index (PDI) are summarized in Table 6.

TABLE 6

GPC analysis results

| Run ID | $\bar{M}_n$(kg/mol) | $\bar{M}_w$(kg/mol) | $\bar{M}_z$(kg/mol) | PDI |
|---|---|---|---|---|
| PP | 46.3 | 272.9 | 828.5 | 5.9 |
| 9 | 48.95 | 311 | 1260.3 | 6.35 |
| 10 | 15.05 | 110.8 | 325.9 | 7.34 |
| 11 | 17.7 | 140.7 | 500.9 | 7.95 |
| 13 | 43.1 | 259.1 | 904.2 | 6.01 |
| 29 | 31.4 | 152.5 | 206.1 | 4.86 |

PDI values indicate that polydispersity of all runs increased compared to the parent PP, except for run 29. The MW of run 9 increased considerably compared to parent PP, which confirms formation of LCB in this run. Run 13, which also shows indication of LCB, has a larger z-average molecular weight ($\bar{M}_z$) due to formation of longer chains as a result of LCB formation. The reason that the MW of run 13 is not as high as run 9 (despite larger strain hardening exhibited by run 13 in FIG. 8) might be due to the larger gel fraction of this run. The gel from these runs was filtered out before entering the GPC columns and, consequently, was not taken into account in the MW determinations.

Figure 12:
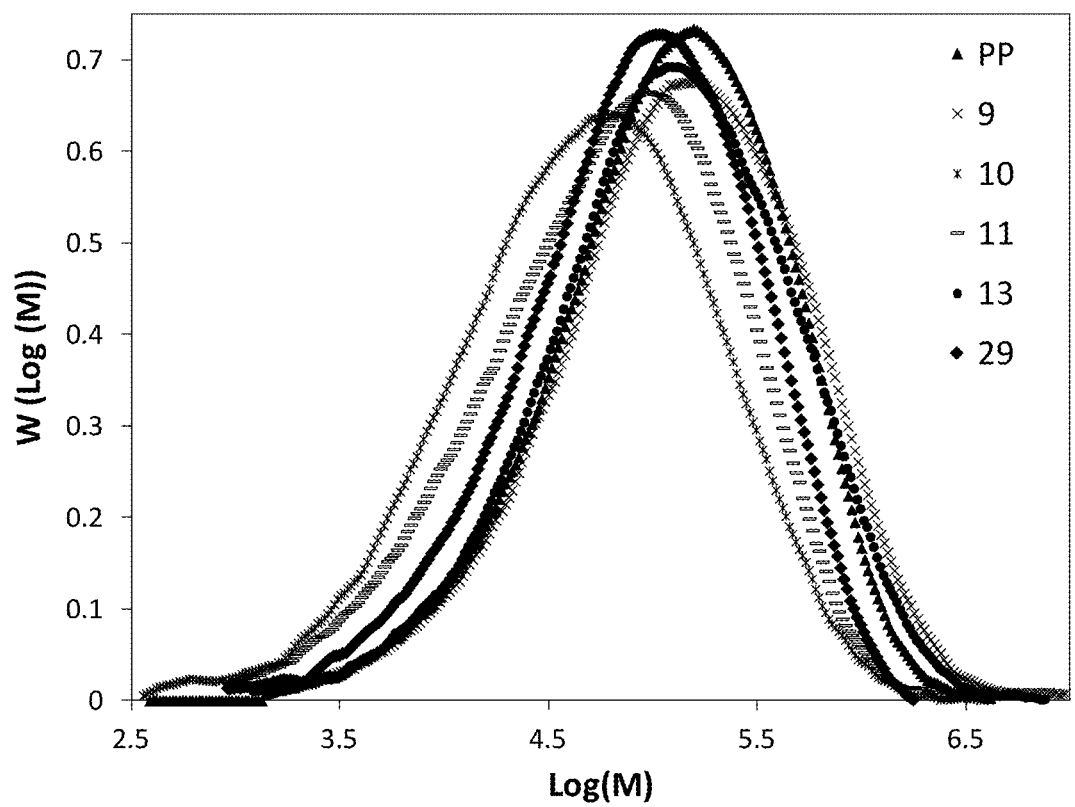
FIG. 12: Graph showing molecular weight distributions (MWDs) for runs 9, 10, 11, 13, 29 and parent PP.

The full MWDs for these runs are plotted in FIG. 12. Runs 9 and 13 have longer tails at high molecular weight ranges compared to parent PP; however, the 'degraded' runs (10 and 11) are shifted toward lower molecular weights.

The MWDs of runs 9, 10, 11 and 13 are in agreement with the rheological polydispersity indices (Table 3). All these runs have greater PI and lower ModSep than the parent PP, which is in agreement with the PDI values (Table 6). Moreover, the longer tail at high molecular weight ranges (FIG. 12) for runs 9 and 13 reflects significantly large ER values for these runs.

A few comments are now in order for the behavior of run 29. Run 29 has greater $\eta_0$, PI and ER values than the parent PP; hence, higher MWs and a broader MWD were expected. However, GPC results showed that the MW for run 29 was lower than the parent PP, and in addition, the MWD was slightly narrower. Moreover, run 29 did not show significant strain hardening behavior, despite the presence of crosslinked material in its structure.

While not wishing to be bound by this theory, one possible explanation for such behavior is the presence of two domains in the polymer produced by run 29: degraded (low molecular weight), and isolated gel. Gel content experiments verified the presence of about 4% gel in this sample. On the other hand, GPC data confirmed that the MW of run 29 had decreased. As mentioned before in the beginning of this section, since the isolated gel fraction in sample 29 was filtered out prior to injection into the GPC columns, the collected GPC chromatogram only reflected the degraded domains characteristics.

Thus, GPC showed lower values for $\bar{M}_w$ and $\bar{M}_z$ compared to the other runs, including the parent PP.

Thus, the presence of isolated crosslinked domains in run 29 resulted in greater $\eta_0$ and $\lambda$ values compared to the parent PP (as illustrated by the parallel plate rheometry data). These isolated gel domains could act like a filler, and since they are dispersed in the sample, they can cause an increase in $\eta^*$ and G' vs. $\omega$. However, these isolated gel domains do not cause significant changes in the strain hardening behavior, because the crosslinked regions and the linear chains are not interconnected.

Figure 13:
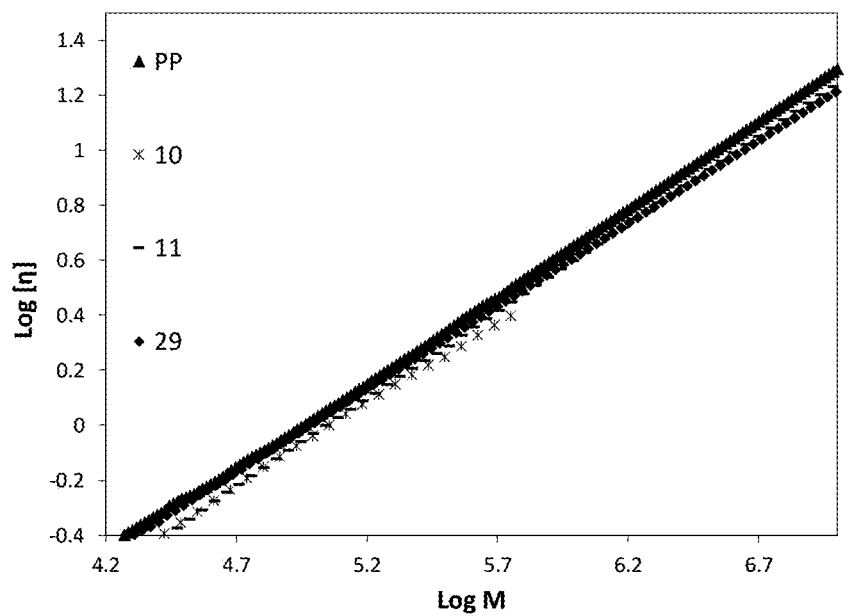
FIG. 13: Graph showing comparison between Mark-Houwink plots for runs 10, 11, 29 and parent PP.
Figure 14:
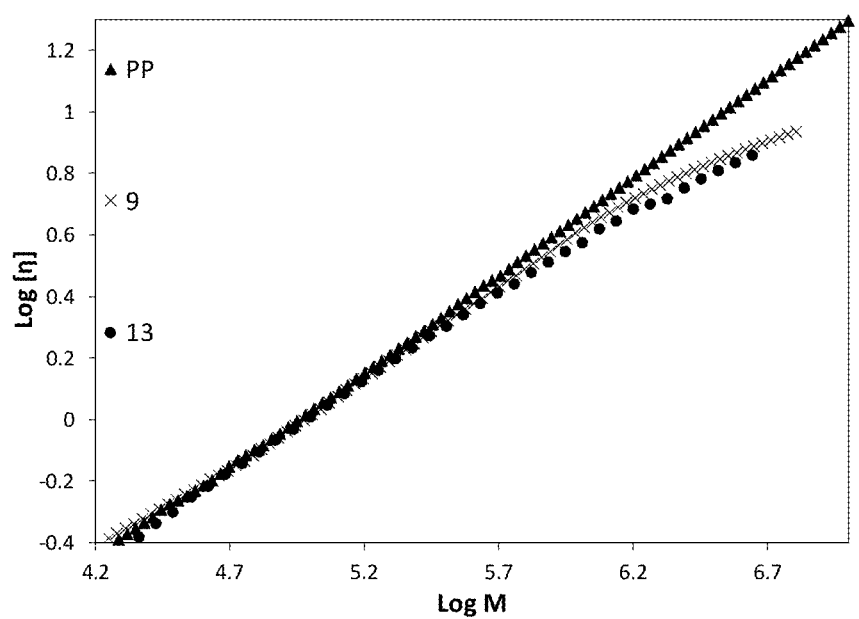
FIG. 14: Graph showing Mark-Houwink plots for runs 9, 13 and parent PP.

Log-log plots of intrinsic viscosity [$\eta$] vs. molecular weight for the different chromatograms are plotted in FIG. 13 and FIG. 14. Qualitative comparisons between the obtained curves can serve as an indicator of the molecular structure of the polymers. The Mark-Houwink relation stipulates that log [$\eta$] versus log M is linear for a linear polymer with known slope and intercept (Mark-Houwink constants). Presence of LCB in the polymer causes deviations from this linear relation by shifting the slope at higher molecular weights to lower values [19,29].

In FIG. 13, the parent PP shows linear behavior due to its linear structure and it is used as a reference for further comparisons between runs. Runs 10 and 11, the 'degraded' runs, do not show any change in slope towards lower intrinsic viscosities at high MW ranges. Run 29 shows a very slight deviation from parent PP around MW of 177 kg/mol. However, this deviation is not clear. In order to see deviations from the parent PP more clearly for runs 9 and 13, log [$\eta$] vs. log M curves for runs 9 and 13 have been plotted separately in FIG. 14. It can be seen that runs 9 and 13 show evidence of LCB by deviating from the linear PP at higher molecular weights. The slope of the log [$\eta$]-log M curve is lower for these two runs compared to the parent linear PP (LPP), after a value of M around 180 kg/mol.

Furthermore, in FIG. 14, run 13 deviates from parent PP over a broader range of MW (M) values. This is in agreement with extensional rheology data, according to which run 13 exhibited significantly larger SHC levels compared to run 9 (see FIG. 8).

Finally, using Equation 2-7 and Equation 2-8, the number of LCB per 1000 repeating units ($N_{LCB}$) was also calculated for runs 9 and 13. $N_{LCB}$ for run 9 is 0.035 in the MW range of 320-1,500 kg/mol, whereas for run 13, $N_{LCB}$ is 0.042 in the range of 130-1,500 kg/mol. This confirms once more that run 13 has a greater amount of LCB.

Processing conditions that can result in LCB in the modified PP structure were identified for both photoinitiators (BPH and DEBPH). Three representative samples have been prepared that show indications of LCB formation. Extensional viscosity, gel content, MW, MWD, intrinsic viscosity and thermal properties of these samples were measured. The results from detailed characterization tests for all the selected runs are summarized in Table 7. From Table 7, it can be concluded that when BPH was used as photoinitiator, formation of LCB and CL was confirmed. It has been found that adding 0.5 wt-% of BPH to PP, for a radiation period of 600 s, with low lamp intensity and high cooling air pressure, significantly increased strain hardening behavior in PP.

TABLE 7

Summary of indicators for different runs, relative to parent PP

|  | 9 | 10 | 11 | 13 | 29 |
|---|---|---|---|---|---|
| LVE properties ($\eta_0$, n, $\lambda$ and ER) | Yes* | No* | No | Yes | Yes |
| G' and $\eta^*$ vs. $\omega$ | Yes | No | No | Yes | Yes |
| tan $\delta$-G* and Cole-Cole plots | Yes | No | No | Yes | Yes |
| Extensional rheometry | Yes | No | inconclusive | Yes | inconclusive |
| Gel content | Yes | No | No | Yes | Yes |
| Log [$\eta$]-log M | Yes | No | No | Yes | No |
| Overall | LCB-CL | Linear-degraded | Linear-degraded | LCB-CL | CL |

*Yes/(No): the test confirms formation of long chain branches in the run/(no evidence for LCB)

Effect of Radiation Time and Sample Thickness on Photomodification Reactions

In order to introduce long chain branches to PP backbone, first, a tertiary hydrogen should be abstracted from the PP backbone. Free radicals generated via peroxide initiator decomposition or high energy radiation, such as electron beam (EB) and gamma radiation, are often responsible for hydrogen abstraction. Combination of a tertiary radical center with another radical center results in formation of branches on the PP backbone. The main difficulty in this process is the tendency of PP macroradicals to degrade via β-scission followed by termination via disproportionation. This mechanism is shown schematically in FIG. 15.

One issue that arises during modification of polymers by UV radiation is related to the depth of radiation. It is known that penetration of UV light is limited and this can cause inhomogeneities in LCB (and crosslinking (CL)) of the samples. Chen and Rånby [60] investigated the effect of thickness of polyethylene (PE) samples by analyzing the variation in percent of gel formed and relating it to the thickness of the PE samples.

In this disclosure, the effect of UV penetration depth was investigated by radiating solid PP discs with different thicknesses. Moreover, the effect of UV radiation duration along with radiation depth, depth was also investigated since radiation time affects the overall extent of the modification process. In order to investigate the effects of these variables on the degree of modification, discs were prepared with specific thicknesses and radiated for different lengths of time.

Linear polypropylene (PP) was modified using UV radiation in the presence of 0.5 wt-% of benzophenone (BPH) photoinitiator to introduce long chain branching to the PP backbone. Irradiation was carried out in the solid state and the temperature level was kept below 60° C. The effects of radiation duration and sample thickness on the extent of these branching modification reactions were investigated. Linear viscoelastic (LVE) properties, molecular weight (MW), molecular weight distribution (MWD), and gel content were determined and compared for runs having different sample thicknesses, irradiated for different times. Comparisons were also conducted with the parent PP and the PP mixed with photoinitiator. It was found that long chain branching (LCB) decreased by increasing the thickness of the samples. On the other hand, an increase in radiation duration resulted in enhanced LCB, but also led to larger gel content in the samples.

Materials and Methods

Materials

PP homopolymer (Pro-fax PH 382M) from LyondellBasell with a melt flow rate (MFR) of 3.5 g/10 min was used. Benzophenone (BPH) of 99% purity was purchased from Sigma Aldrich and used as received.

Design of Experiments

In order to study the effects of UV radiation duration and penetration depth (i.e., sample thickness), three-level factorial design experiments were conducted. Statistical analysis was carried out using Design Expert 8.0.7.1 software. Run 10 used a mixture of PP with 0.5 wt-% BPH but without any irradiation. Melt mixing for run 10 was achieved in a batch mixer. Run 11 used simply the parent PP. The experimental results from runs 10 and 11 were used for comparisons with runs 1-9.

TABLE 8

Design of experiments for 3-level factorial design

| Run ID | BPH (wt-%) | Thickness-A (mm) | Time-B (min) |
|---|---|---|---|
| 1 | 0.5 | 1 | 5 |
| 2 | 0.5 | 1 | 10 |
| 3 | 0.5 | 1 | 15 |
| 4 | 0.5 | 2 | 5 |
| 5 | 0.5 | 2 | 10 |
| 6 | 0.5 | 2 | 15 |
| 7 | 0.5 | 3 | 5 |
| 8 | 0.5 | 3 | 10 |
| 9 | 0.5 | 3 | 15 |
| 10 | 0.5 | 1 | 0 |
| 11 | 0 | 1 | 0 |

Preparation Method

PP pellets with 0.5 wt-% of photoinitiator were melt-mixed in a batch mixer at 190° C. and 100 rpm for 8 minutes. The samples were ground using a Wiley mill (model 1102, Arthur H. Thomas Co.). After grinding, the granules were compression-moulded into discs with 25 mm diameter and thickness of 1, 2, and 3 mm at 190° C. under an applied force of 4400 N for 10 to 15 minutes. The discs were irradiated using a Mercury UV lamp (Versa Cure) for varied amounts of time. Radiation was carried out at a distance of 30 cm from the UV light source. Samples were irradiated for 5, 10, and 15 minutes. During irradiation, pressurized air was used to cool down the area beneath the lamp and the temperature was kept constant at 55° C.

Characterization

For these analyses the same procedures described above were followed. From these tests, storage modulus (G'), loss modulus (G"), complex modulus (G*), loss tangent (tan $\delta$), and complex viscosity ($\eta^*$) were obtained at different angular frequencies ($\omega$). $\eta^*$ vs. $\omega$ graphs were used to find the shear thinning index (n), zero shear viscosity ($\eta_0$) and relaxation time ($\lambda$) of each sample by fitting the Cross model (Equation 3-11 in section 3.1 of Chapter 3) utilizing MATLAB (7.11.0 R2010b).

Rheological polydispersity indices were determined using Equation 2-2, Equation 2-3 and Equation 2-4. NLREG, a nonlinear regression software [62], is the nonlinear regression software which was used to calculate the relaxation spectrum (H(λ)).

GPC and gel content measurements were conducted in the same way as described above.

Results and Discussion

Figure 16:
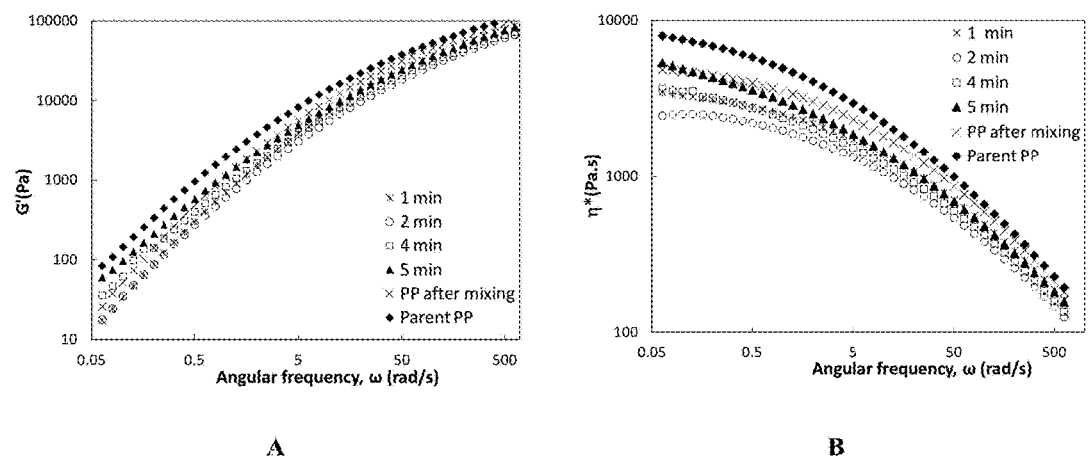
FIG. 16: Graphs showing G' (A) and η* (B) vs. ω for 1 mm thick samples which were radiated between 1 and 5 min.

Conditions that maximize the LCB level in PP were found using LVE data as described above. In addition, formation of LCB and CL under these conditions was confirmed by extensional rheometry, GPC, and gel content measurements. Preliminarily experiments were conducted to monitor the progress of photomodification with radiation time (from the onset of radiation until formation of branches and/or crosslinks). These results were used to suggest a mechanism for degradation and LCB formation for PP with UV radiation. FIG. 16 shows G' (A) and η* (B) of the runs radiated between 1 to 5 min compared to PP after melt mixing with BPH and the parent PP (runs 10 and 11 in Table 8). All the samples of FIG. 16 have been prepared from the same polymer sheet (1 mm thickness), which was irradiated for different durations (from 1 min to 5 min).

In FIG. 16 and B, G' and η* of PP after mixing (with BPH) are lower than the parent PP due to thermal degradation during the processing in the batch mixer. It can also be seen that G' and η* decrease after 1 minute of radiation and the decrease continues until 2 minutes from the onset of radiation. This is believed to be due to β-scission and degradation of the chains during the first 2 minutes from the beginning of the reaction. For durations greater than 2 minutes, LVE properties (G' and η) start to increase. This may be attributed to formation of LCB in the samples. LVE properties continue to increase even after 15 minutes from the onset of radiation.

Figure 17:
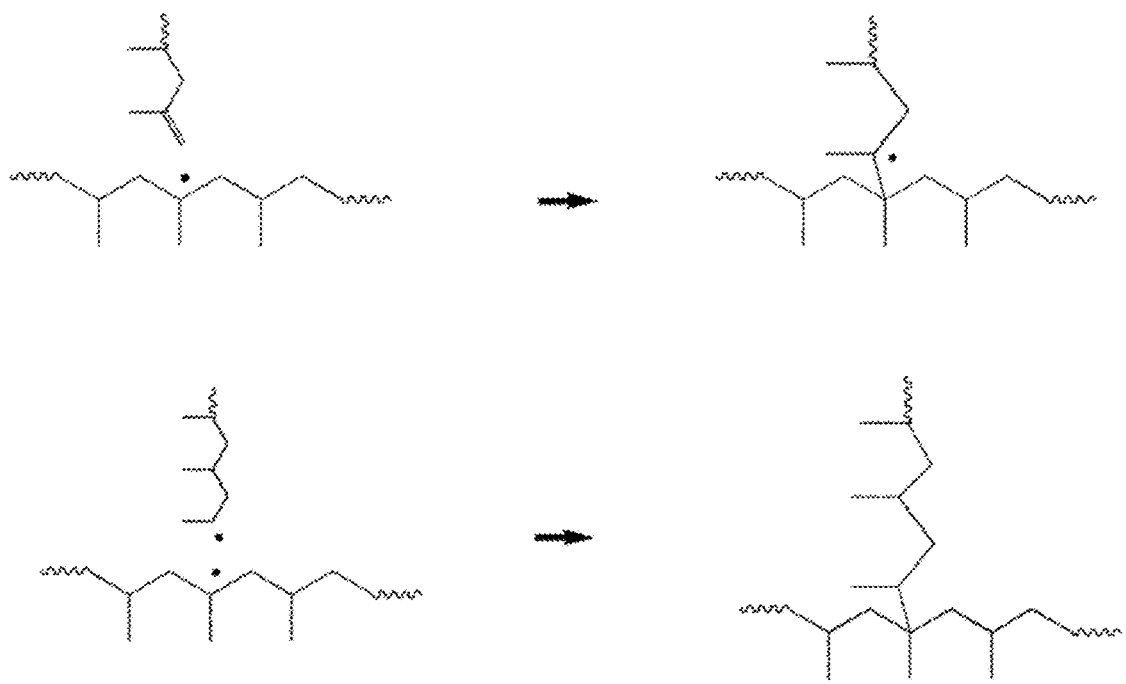
FIG. 17: Schematic depicting mechanism for formation of LCB in the PP backbone.

While not wishing to be bound by theory from the above observations, the following mechanism is suggested for formation of LCB in PP via UV radiation (see FIG. 17).

Figure 15:
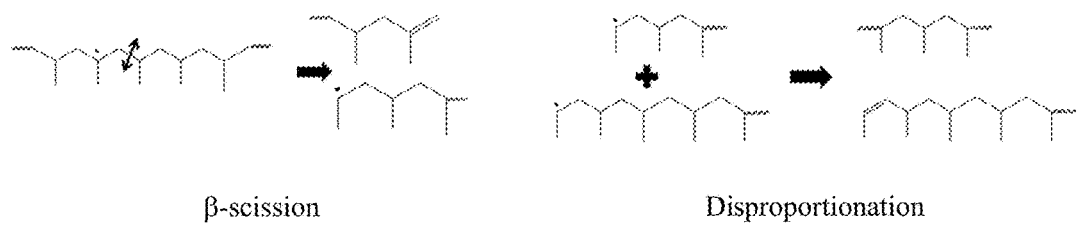
FIG. 15 is a schematic showing the mechanism for PP degradation.

According to FIG. 17, in the first step, excited BPH molecules abstract hydrogens from the tertiary carbon atoms in the PP backbone and form macroradicals. These macroradicals are unstable and undergo β-scission (FIG. 15). Due to β-scission reactions, PP chains with terminal double bonds are formed. When the concentration of these chains increases, the probability of reactions between PP macroradicals and chains with terminal double bonds also increases (FIG. 17). Consequently, long chain branches will be formed.

During irradiation, degradation and LCB happen simultaneously, but as radiation proceeds, LCB will eventually overcome degradation. The validity of this mechanism is corroborated by the experimental observation that degradation is more prominent at the initial stages of radiation (observe the lower η* and G' levels at the beginning of radiation, as per FIG. 16). However, as irradiation proceeds, LCB prevails over degradation, which results in the subsequent increase in η* and G' (see runs which were radiated for 4 and 5 minutes in FIG. 16).

Effect of Radiation Time and Sample Thickness on LVE Properties

FIG. 18A and B show G' and η* for runs 3, 6 and 9, which have the same exposure time to UV (15 min) but different thicknesses (1, 2 and 3 mm, respectively). A lower sample thickness results in larger G' and η* at low frequencies. This trend is also observed for runs that were radiated for 5 minutes (runs 1, 4 and 7) and 10 minutes (runs 2, 5 and 8). This is due to the limited depth of radiation for thicker samples. Chen and Rånby [60] found that 1 mm is the critical depth of UV penetration in PE films. Therefore, above this critical thickness, inhomogeneities are expected in crosslinking through the depth of the samples. Since η* and G' decrease with increasing the thickness of the samples, one can conclude that the critical thickness is either lower than or at 1 mm for discs at the experimental lamp intensity.

Cole-Cole and tan (δ)-G* plots for the same runs are shown in FIG. 18C and D. These two plots are sensitive to the MWD rather than a single MW average, and, in fact, tan (δ)-G* is even more sensitive to MWD than Cole-Cole plots [32]. In Cole-Cole plots, long chain branched polymers deviate from the linear reference (greater G' values at low G" ranges). Despite the thermal degradation of run 10 (PP after melt mixing without UV treatment), no significant deviation was observed in the Cole-Cole plots and tan δ-G* from run 11 (parent PP), which suggests that thermal degradation does not affect significantly the MWD at the processing conditions used. The increase in G' vs. G" (FIG. 18C) and decrease in tan (δ) vs. G* (FIG. 18D) with a decrease in the sample thickness are mainly due to broadening of the MWD and the larger number of long chain branches in the thinner samples.

FIG. 19 compares G', η*, Cole-Cole plots and tan (δ)-G* plots for the runs with the same thickness (1 mm) but radiated for different amounts of time (5, 10 and 15 min). An increase in radiation time above 5 minutes increases elasticity (G') (FIG. 19A) and complex viscosity (η* ) (FIG. 19B), and broadens the MWD (FIG. 19C and D). This is due to formation of a larger number of branches as the reaction proceeds over time. The same trend was observed for runs with 2 mm (runs 4, 5 and 6) and 3 mm (runs 7, 8, and 9) thickness that were radiated for varied durations.

Figure 20:
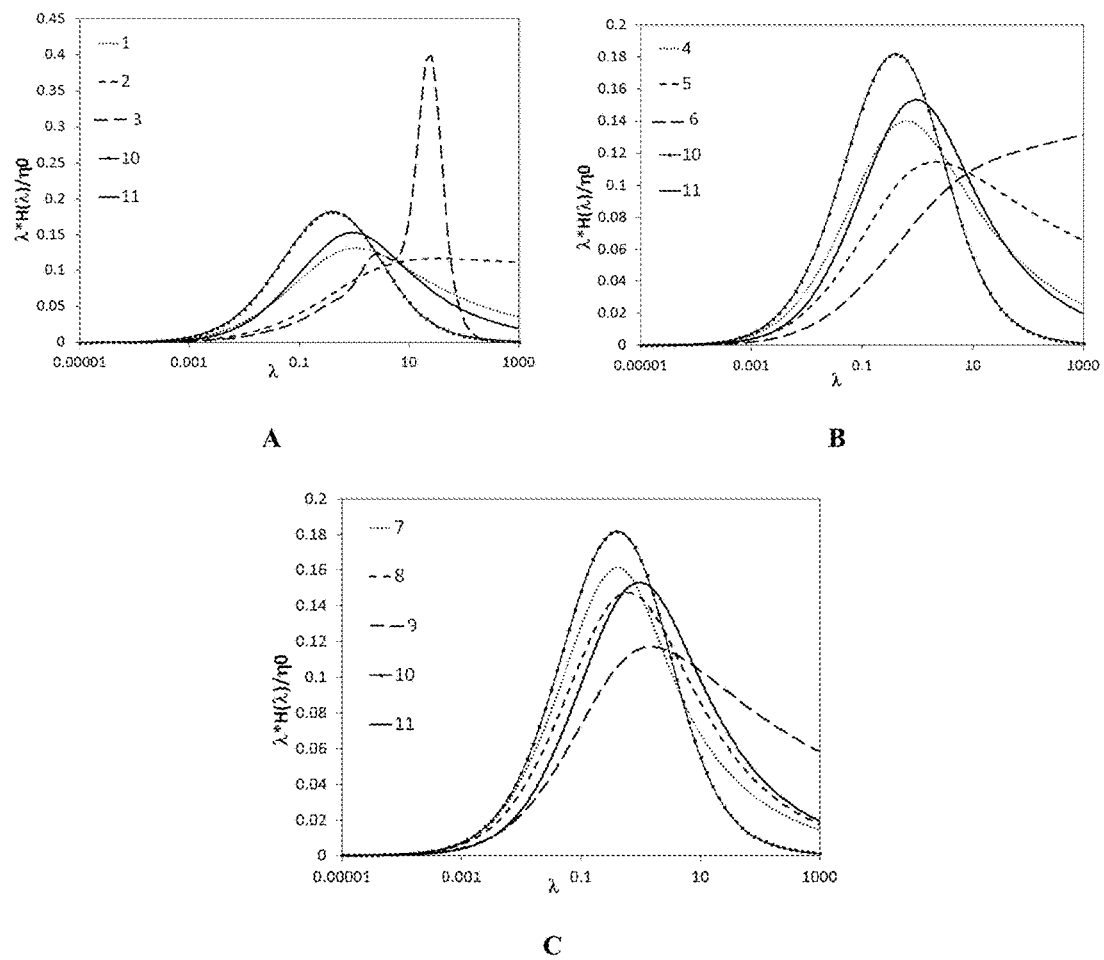
FIG. 20A: Graph showing comparison between relaxation spectra of the runs with a thickness of 1 mm.
FIG. 20B: Graph showing comparison between relaxation spectra of the runs with a thickness of 2 mm.
FIG. 20C: Graph showing comparison between relaxation spectra of the runs with a thickness of 3 mm.
Figure 21:
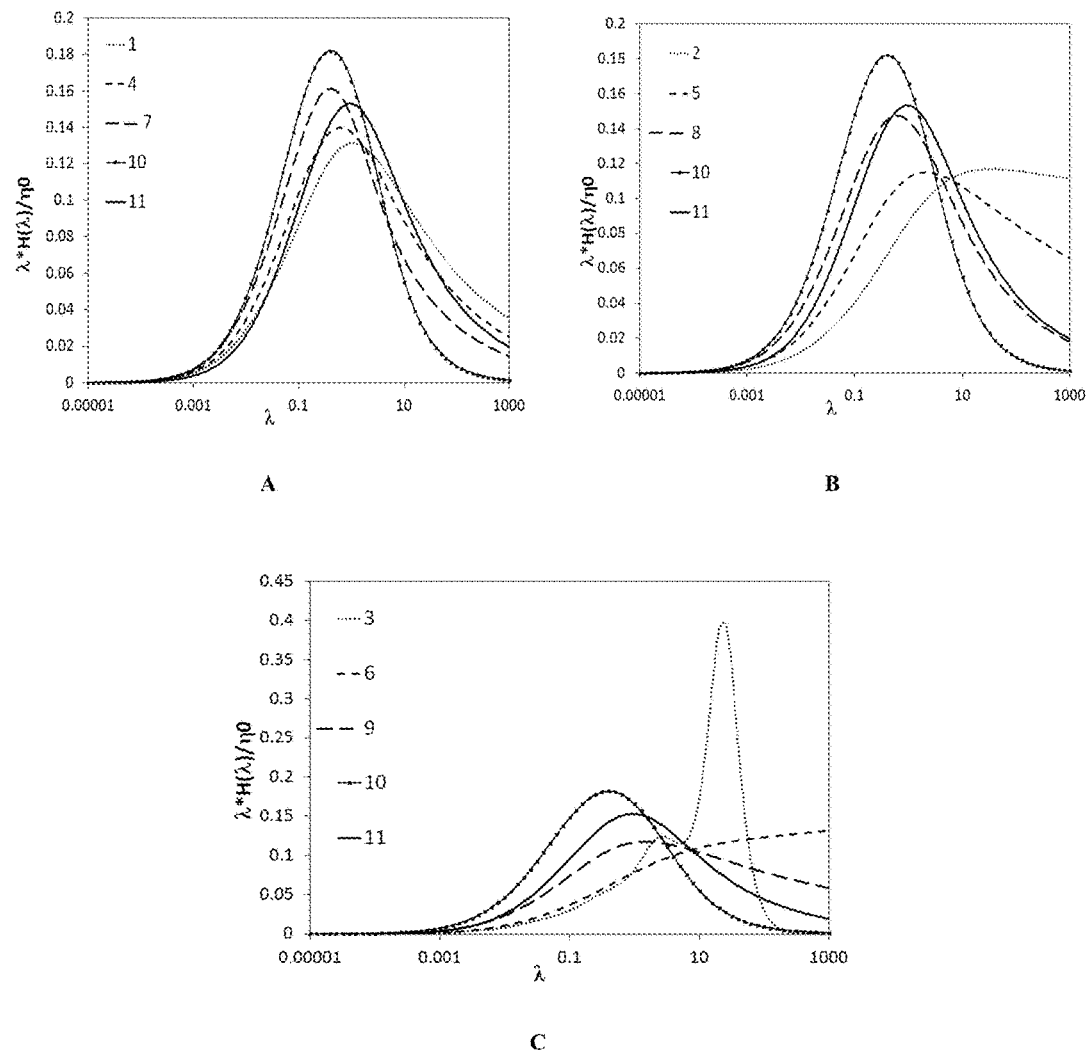
FIG. 21A: Graph showing comparison between relaxation spectra of the runs with the same radiation time of 5 min.
FIG. 21B: Graph showing comparison between relaxation spectra of the runs with the same radiation time of 10 min.
FIG. 21C: Graph showing comparison between relaxation spectra of the runs with the same radiation time of 15 min.
Figure 22:
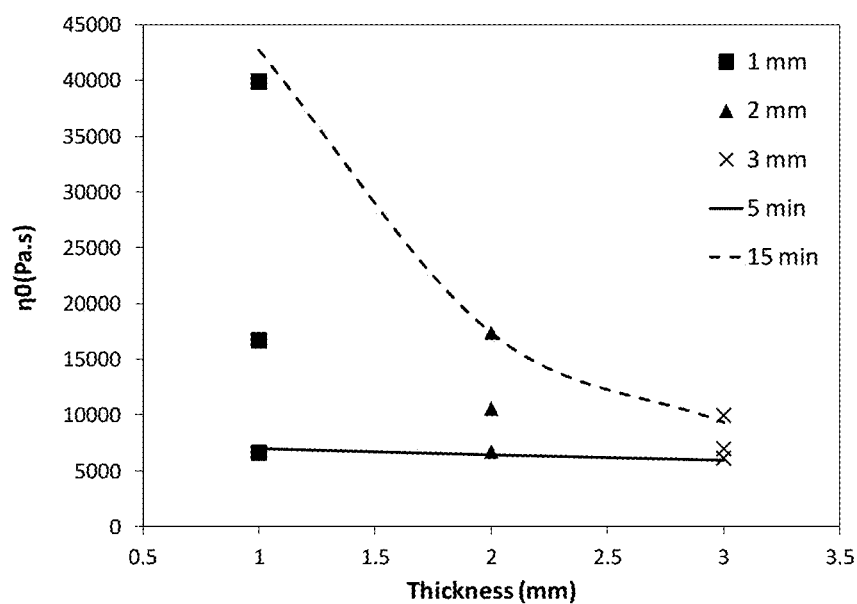
FIG. 22: Graph showing the effect of the time-thickness interaction on zero shear viscosity ($\eta_0$)
Figure 23:
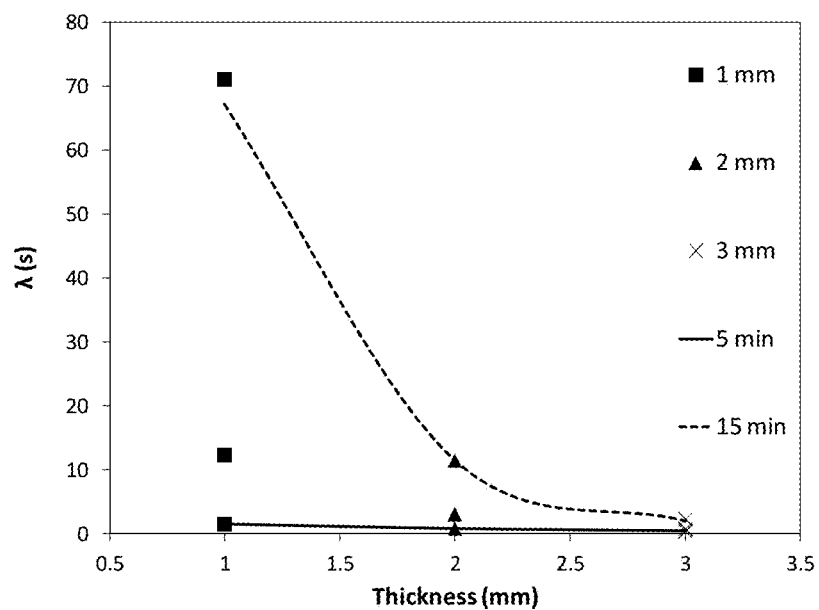
FIG. 23: Graph showing the effect of the time-thickness interaction on relaxation time (λ)
Figure 24:
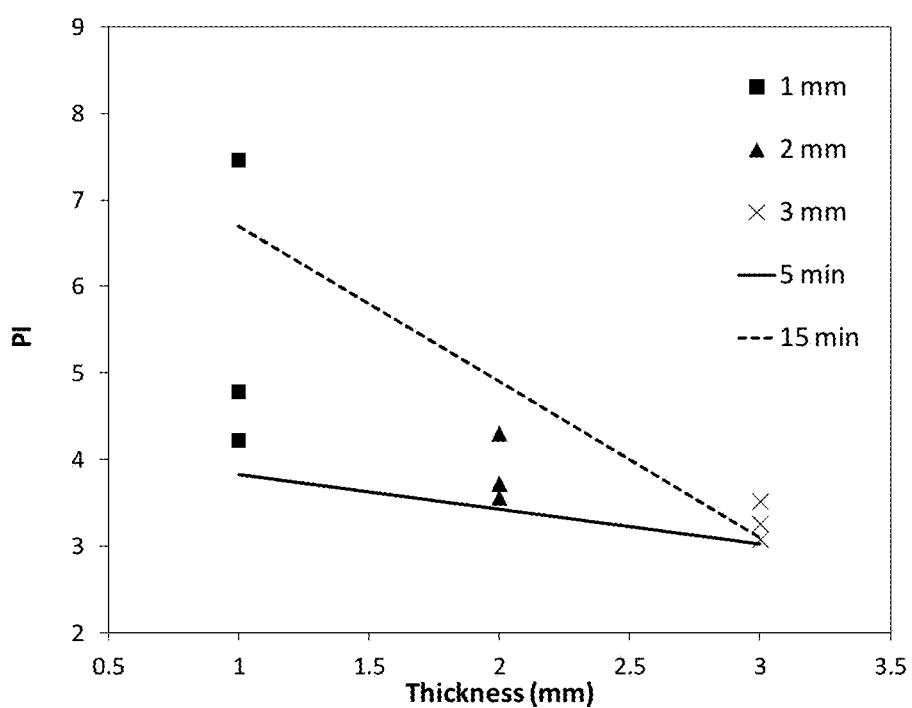
FIG. 24: Graph showing the effect of the time-thickness interaction on rheological polydispersity index (PI)
Figure 25:
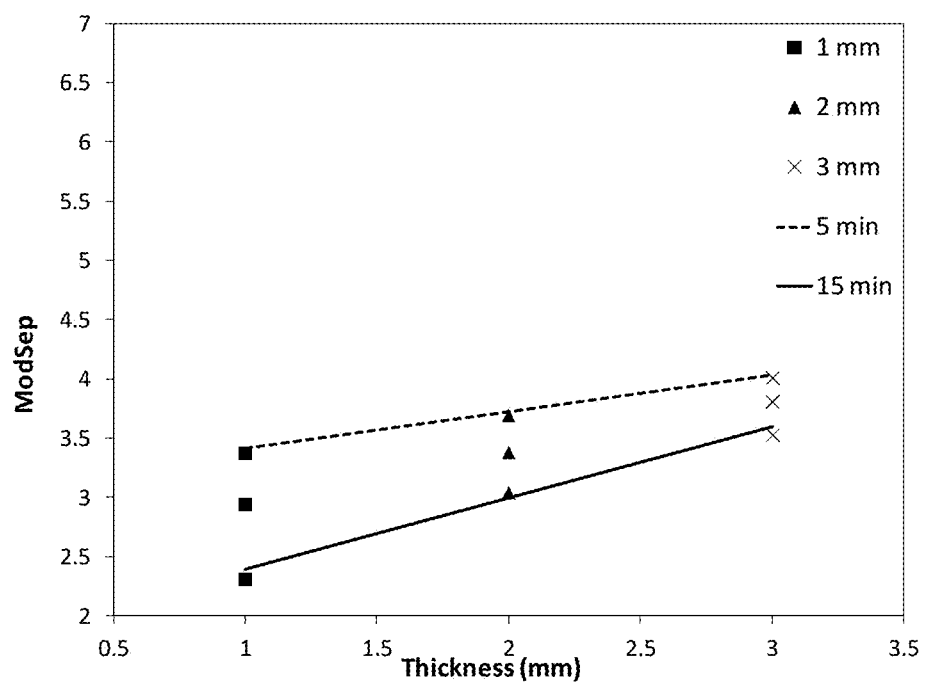
FIG. 25: Graph showing the effect of the time-thickness interaction on ModSep.

The effects of radiation time and depth on the relaxation spectrum, which is an indication of rheological polydispersity, are shown in FIG. 20 and FIG. 21. FIG. 20A compares the relaxation spectra of the 1 mm thick samples, which were radiated for 5, 10 and 15 minutes, respectively. Broadening in the relaxation spectrum occurs after 10 minutes from the onset of radiation. Increasing the radiation time leads to formation of a bimodal relaxation spectrum, as can be observed for run 3, which was irradiated for 15 minutes (FIG. 20A). This shows formation of chains with very long relaxation times, due to long chain branching and crosslinking, along with chains with short relaxation times. Since the UV radiation depth is limited, long chain branched and crosslinked chains with high molecular weight tend to form on the surface of the radiated discs but the molecular properties in the middle of the sample remain unchanged. Consequently, a bimodal relaxation spectrum will most likely result due to differences in relaxation times (and molecular properties) between the sample surface and sample core.

A broadening in the relaxation spectrum is also evidenced for runs 4, 5, 6 (FIGS. 20B) and 7, 8, 9 (FIG. 20C), which again confirms the above mentioned trends (broadening of the relaxation spectrum with radiation time). Broadening of the relaxation spectrum is less pronounced for thicker samples, because the ratio of the surface region to the core region of these (thick) samples is lower. Surface region refers to the outer face of the sample, up to the depth that UV can penetrate, while core region refers to the middle (and lower) part of the sample which UV cannot readily penetrate.

Scrutinizing now the relaxation spectra of the runs that have the same radiation time reveals that thicker samples have a narrower relaxation spectrum. In order to compare the effect of thickness on the relaxation spectrum of the runs with the same radiation time, runs 1, 4 and 7 (FIG. 21A) are plotted along with runs 2, 5, 8 (FIG. 21 B) and runs 3, 6, 9 (FIG. 21C). When the radiation time is constant, thinner samples have a broader relaxation spectrum. The relaxation spectrum not only becomes broader by decreasing sample thickness, but also shifts to longer times ($\lambda$). This is because the number of high MW chains with a high relaxation time is greater in thinner samples.

Linear viscoelastic constants ($\eta_0$, $\lambda$ and n) along with rheological polydispersity indices (PI, ModSep and ER) can be found using Equation 2-2, Equation 2-3 and Equation 2-4, respectively.

Runs with larger ER values indicate a broader distribution of the high molecular weight chains. PI and ModSep are polydispersity indicators for the shorter chains. An increase in PI and a decrease in ModSep indicate broadening of the MWD [32]. It is expected that LCBPP have a larger ER due to the presence of high molecular weight chains and broader MWD. An increase in PI and decrease in ModSep are also expected due to broadening of the MWD during UV modification. Moreover, formation of LCB results in a larger $\eta_0$ and $\lambda$, and a lower shear thinning index (n).

$\eta_0$, $\lambda$, n and polydispersity indices of the runs are summarized in Table 9. It can be seen that all radiated runs (1 to 9) have larger $\eta_0$, $\lambda$ and ER, and lower n values compared to run 10, which is PP after melt mixing with BPH.

TABLE 9

Linear viscoelastic properties of the runs

| Run # | Thickness (mm) | time (min) | $\eta_0$ (Pa·s) | $\lambda$ (s) | n | PI | ModSep | ER |
|---|---|---|---|---|---|---|---|---|
| 1 | 1 | 5 | 6,620 | 1.5 | 0.50 | 4.22 | 3.37 | 1.46 |
| 2 | 1 | 10 | 16,700 | 12.3 | 0.47 | 4.78 | 2.94 | 1.95 |
| 3 | 1 | 15 | 39,900 | 71.1 | 0.48 | 7.46 | 2.31 | 3.27 |
| 4 | 2 | 5 | 6,730 | 0.96 | 0.51 | 3.56 | 3.69 | 1.23 |
| 5 | 2 | 10 | 9,400 | 2.53 | 0.48 | 3.72 | 3.44 | 1.42 |
| 6 | 2 | 15 | 17,400 | 10.9 | 0.47 | 4.30 | 3.04 | 2.12 |
| 7 | 3 | 5 | 6,130 | 0.46 | 0.55 | 3.08 | 4.01 | 1.03 |
| 8 | 3 | 10 | 6,980 | 0.82 | 0.52 | 3.26 | 3.81 | 1.28 |
| 9 | 3 | 15 | 9,980 | 2.37 | 0.49 | 3.52 | 3.53 | 1.39 |
| 10 | 1 | 0 | 5,290 | 0.30 | 0.60 | 3.43 | 3.94 | 0.82 |
| 11 | 1 | 0 | 9,325 | 0.79 | 0.57 | 3.63 | 3.64 | 1.27 |

Comparison between runs 1, 2 and 3 shows that longer exposure time to UV results in larger $\eta_0$, $\lambda$ and lower n values, as expected from the $\eta^*$ vs. $\omega$ graphs (Table 9 and FIG. 19). This trend is also observed for the 2 mm (runs 4, 5 and 6) and 3 mm (runs 7, 8, and 9) samples. On the other hand, an increase in the thickness of the samples limits UV light penetration and subsequently results in lower $\eta_0$, $\lambda$ and higher n at the same exposure times (compare runs 1, 4 and 7, or 2, 5 and 8, or 3, 6 and 9). This is because all these LVE constants are indicators of an average property within the sample. Therefore, due to the limited UV penetration in the samples, formation of LCB or CL is not uniform in thicker samples.

The data points presented in Table 9 were analyzed next with the Design-Expert software. Empirical models were fit for each response. These models and their regression coefficients ($R^2$ and adjusted $R^2$) are cited in Table 10.

TABLE 10

Empirical models for LVE properties

| Empirical model | $R^2$ | Adj. $R^2$ | Equation # |
|---|---|---|---|
| $1/\sqrt{\eta_0} = 0.02 - 0.000642*A - 0.000941*B + 0.000226*A$ | 0.97 | 0.95 | Equation 5-1 |
| $\ln(\lambda) = -1.31 - 0.11*A + 0.49*B - 0.11*AB$ | 0.98 | 0.97 | Equation 5-2 |
| $n = 0.50071 + 0.017833*A + 0.0041*B$ | 0.75 | 0.68 | Equation 5-3 |
| $PI = 2.09 + 0.3*A + 0.43*B - 0.14*AB$ | 0.86 | 0.80 | Equation 5-4 |
| $ModSep = 3.76 + 0.17*A - 0.13*B + 0.03*AB$ | 0.98 | 0.97 | Equation 5-5 |
| $ER - 1.39 = 0.58 + 0.19*A - 0.04*B$ | 0.91 | 0.88 | Equation 5-6 |

In Table 10, variables A and B are sample thickness and radiation time, respectively, and AB denotes the factor interaction between thickness and time. In all of these models, the time-thickness interaction (AB) is significant except for ER and n. AB interaction plots for $\eta_0$, $\lambda$, PI and ModSep are shown in FIG. 22, FIG. 23, FIG. 24 and FIG. 25, respectively. In these figures, the full and dashed lines show the statistical fit (based on the equations of Table 10) at 5 and 15 minutes of radiation, respectively, while the square, triangle and cross symbols represent the actual data points corresponding to the 1, 2 and 3 mm samples, respectively. For all these responses, the effect of thickness is not as pronounced at low radiation times. However, at longer radiation times, an increase in thickness results in a decrease in $\eta_0$, $\lambda$ and PI. At high radiation times, ModSep shows the opposite trend and correlates directly with the time-thickness interaction (i.e., an increase in thickness results also in an increase in ModSep). This is expected as ModSep has an inverse relation with MWD (unlike PI and ER). In the same way, the effect of time is more significant when the thickness of the samples is low. The increase in $\eta_0$, $\lambda$, PI and decrease in ModSep of the runs is less pronounced for thicker samples.

Effect on Molecular Weight and Molecular Weight Distribution

Number average ($\overline{M}_n$), weight average ($\overline{M}_w$), z average ($\overline{M}_z$) and polydispersity index (PDI) values from all runs are summarized in Table 11.

In Table 11, when the thickness is low, the effect of radiation time is more significant. Comparing the 1 mm thick samples (runs 1, 2, and 3), it can be inferred that longer radiation times result in larger average molecular weights (in principle) and PDI; however, these changes are less pronounced when the thickness increases (2 mm and 3 mm runs).

Figure 26:
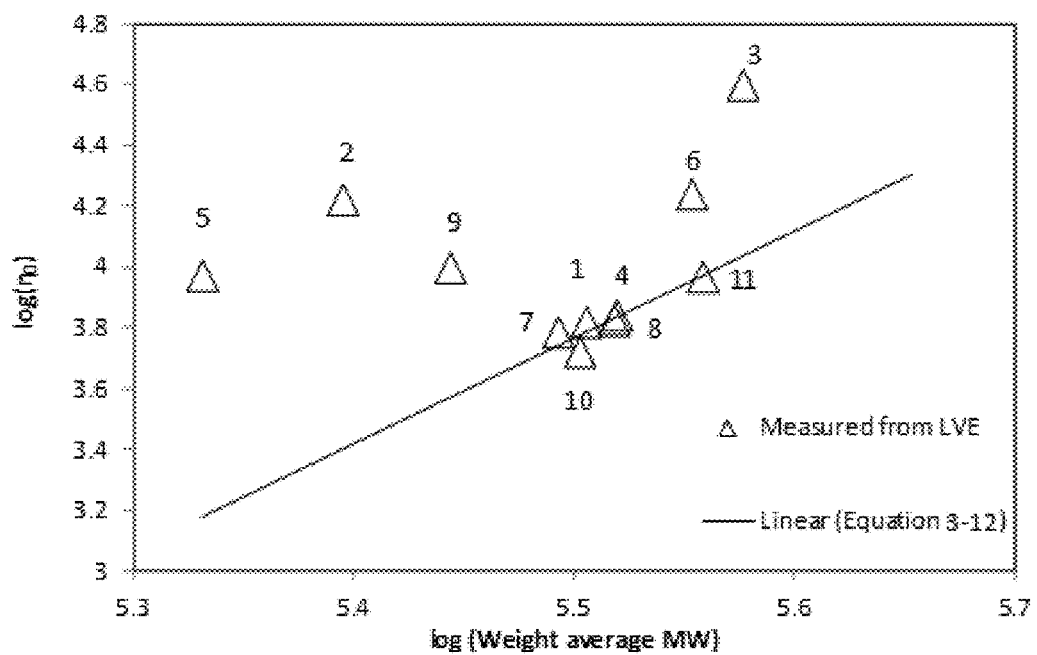
FIG. 26: Graph showing comparison between calculated (linear reference) and measured $72_0$.

Having the weight average MW ($\overline{M}_w$) values from GPC, $\eta_0$ can be calculated. Comparing the calculated $\eta_0$ and $\eta_0$ from the LVE measurements (Cross model), one can make inferences [6] about the type of the long chain branches. FIG. 26 shows these calculated $\eta_0$ and measured $\eta_0$ values (from LVE) versus $\overline{M}_w$ for all experimental runs.

Runs 2, 3, 5, 6 and 9 are above the linear reference, which indicates that the long chain branches in these runs are possibly star-shaped. In the 1 mm thick samples (runs 1, 2 and 3), radiation for 5 minutes does not cause a significant deviation above the linear reference, whereas after 10 minutes of radiation $\overline{M}_w$ decreases (Table 11), but $\eta_0$ increases (Table 9). If one increases the radiation time to 15 minutes, this results in an increase in both molecular weight and $\eta_0$. Samples with thickness of 2 mm (runs 4, 5 and 6) also exhibit a similar trend. The suggested reason for this trend is degradation, which happens at the onset of radiation and then in parallel to the LCB reactions. Degradation results in a decrease in molecular weight; however, a subsequent formation and increase in the amount of long chain branches can compensate for the effect of initial degradation. Radiation for 5 min does not cause significant changes in the molecular weight of the samples (runs 1 and 4). After 10 min, and despite formation of long chain branches ($\eta_0$ is above the linear reference), the effect of degradation on the molecular weight is still more dominant than that of LCB (runs 2 and 5). In other words, the population of long chain branches is not high enough to compensate for initial degradation effects on $\overline{M}_w$. An increase in $\overline{M}_w$ is observed after 15 minutes from the onset of radiation, when the amounts of long chain branched (and crosslinked) molecules are large. This subsequently results in an increase in $\overline{M}_w$ and and deviation of $\eta_0$ above the linear reference.

TABLE 11

Molecular weight averages and PDI of the radiated runs along with melt mixed and parent PP

| Sample ID | Thickness (mm) | Radiation time (min) | $\overline{M}_n$ (kg/mol) | $\overline{M}_w$ (kg/mol) | $\overline{M}_z$ (kg/mol) | PDI |
|---|---|---|---|---|---|---|
| 1 | 1 | 5 | 69.2 | 320.2 | 908.9 | 4.6 |
| 2 | 1 | 10 | 43.1 | 259.1 | 904.2 | 6.0 |
| 3 | 1 | 15 | 36.5 | 377.1 | 1,331.8 | 10.3 |
| 4 | 2 | 5 | 71.8 | 329.6 | 650.2 | 4.6 |
| 5 | 2 | 10 | 53.0 | 214.5 | 502.9 | 4.0 |
| 6 | 2 | 15 | 67.5 | 357.3 | 919.3 | 5.3 |
| 7 | 3 | 5 | 77.7 | 310.9 | 676.7 | 4.0 |
| 8 | 3 | 10 | 76.3 | 330.4 | 582.4 | 4.3 |
| 9 | 3 | 15 | 66.8 | 277.9 | 700.8 | 4.2 |
| 10 | 1 | 0 | 75.0 | 317.9 | 591.2 | 4.2 |
| 11 | 1 | 0 | 78.4 | 361.4 | 714.8 | 4.6 |

For the 3 mm thick samples, the decrease in $\overline{M}_w$ (Table 11) and increase in $\eta_0$ (Table 9) were only evident after 15 minutes from the onset of radiation. This is because the molecular weight of the thick samples is not as affected due to UV penetration limitations, and therefore the average molecular properties of the samples can remain unchanged even after long radiation times.

Figure 27:
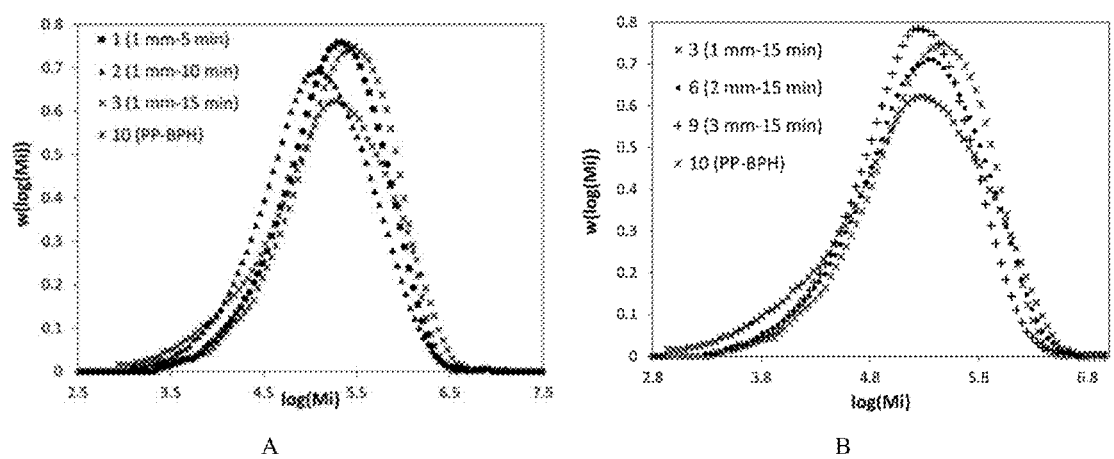
FIG. 27A: Graph showing MWDs of the runs with 1 mm thickness at different exposure times to UV.
FIG. 27B: Graph showing MWDs of the runs with different thickness after 15 min radiation.

In order to compare the MWDs of the runs with 1 mm thickness at different radiation durations, the MWDs are summarized in FIG. 27A. FIG. 27B contrasts the MWDs of the runs with different thickness that were exposed to UV for 15 min. In FIG. 27 (A and B), the parent PP (run 11) is not shown as its MWD overlaps with run 10, which is PP after melt mixing with 0.5 wt-% BPH.

In FIG. 27A, the MWD of run 1 is slightly shifted towards lower MWDs (relative to that of the reference of run 10). This shift towards lower MWDs is more significant in run 2, which is radiated for longer durations. Moreover, the MWD of run 2 has become significantly broader compared to run 1 and run 10 (the reference run). Radiation for 15 min (run 3) not only results in a broader MWD (compared to runs 1, 2 and 10) but also shifts the MWD tail to larger molecular weights. This is in agreement with the mechanism of FIG. 17, which suggests degradation and LCB happening simultaneously. Hence, an increase in molecular weight (MW) happens after long radiation time when the population of long chain branches are large enough to compensate for degradation effects on both the MW and MWD.

FIG. 27B shows the effect of sample thickness on the MWD of the runs that are radiated for 15 min. Comparison between runs 3, 6 and 9 shows an increase in the population of long chains with a decrease in samples thickness. Consequently, this shifts the distribution towards higher molecular weights (larger tail in runs 3 and 6 compared to the parent PP). This is because UV can penetrate thoroughly into the whole depth of the samples, in thinner samples, and hence formation of high molecular weight chains due to LCB is more effective. For run 9, the distribution becomes narrower and shifts towards lower MWs compared to the reference run (run 10). This is again due to limitations in UV penetration into the depth of the samples, which results in formation of fewer long chain branches in the sample.

Figure 28:
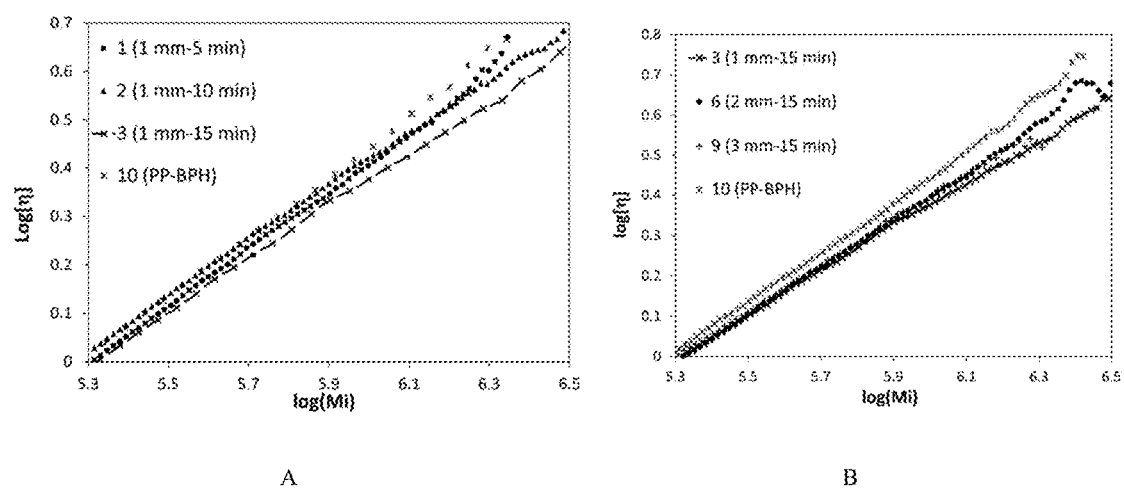
FIG. 28A: Graph showing intrinsic viscosity [η] vs. log(Mi)with 1 mm thickness at different exposure times to UV.
FIG. 28B: Graph showing intrinsic viscosity [η] vs. log(Mi) with different thickness after 15 min radiation.

The intrinsic viscosity ([$\eta$]) of the samples was also measured via GPC and compared for different runs. Qualitative comparisons between the obtained curves can serve as an indicator of the molecular structure of the polymers. It is known that formation of LCB in the polymer results in a lower intrinsic viscosity due to the smaller radius of gyration of long chain branched chains. Thus, log [$\eta$] versus log (Mi) is linear for a linear polymer with known slope and intercept (Mark-Houwink constants). Mi here represents molecular weight values. However, presence of LCB in the polymer causes deviations from this linear relation by shifting the slope at higher molecular weights to lower values. As changes in the slope of log [$\eta$]-log (Mi) are more significant for thin samples and long radiation times, plots are shown for different radiation times for samples of thickness of 1 mm (FIG. 28A), and subsequently at 15 min radiation time for different thicknesses (FIG. 28B). This way is analogous to the results of FIG. 27 (with curve 10 (solid line) representing the reference run). In FIG. 28A, runs 2 and 3 show a change in their slope to lower intrinsic viscosities. This change is more pronounced in the slope of run 3 at MW values of about 790 kg/mol (log (Mi) values of about 5.89). FIG. 28B shows the intrinsic viscosity of the runs with different thicknesses but with the same radiation time (15 min of radiation). As the thickness of the samples decreases, the deviation from the linear reference becomes clearer (and hence, the presence of LCB).

Effect on Gel Content

In order to investigate the presence of gel (due to crosslinking) in each run, extraction experiments were carried out. The results from these measurements are summarized in FIG. 29. The parent PP (run 11) and PP after melt mixing with BPH (run 10) are not shown in FIG. 29 since there was no gel found in these samples.

Figure 29:
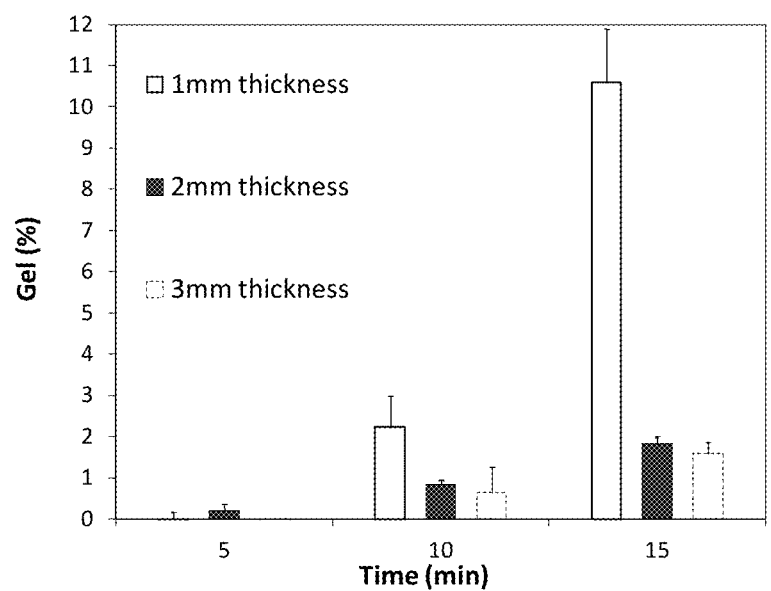
FIG. 29: Graph showing gel content of the runs with different thickness at different radiation times.

FIG. 29 shows that after 5 min of radiation almost no gel was detected in the runs and only after 10 min from the onset of radiation significant formation of gel was detected. Increases in radiation time cause larger percentage of CL in the samples with the same thickness. Moreover, decrease in the thickness increases the percentage of gel in the runs. An increase in gel content upon increasing radiation time is more significant at low thicknesses. This is the same trend that was observed in rheological properties earlier.

Figure 30:
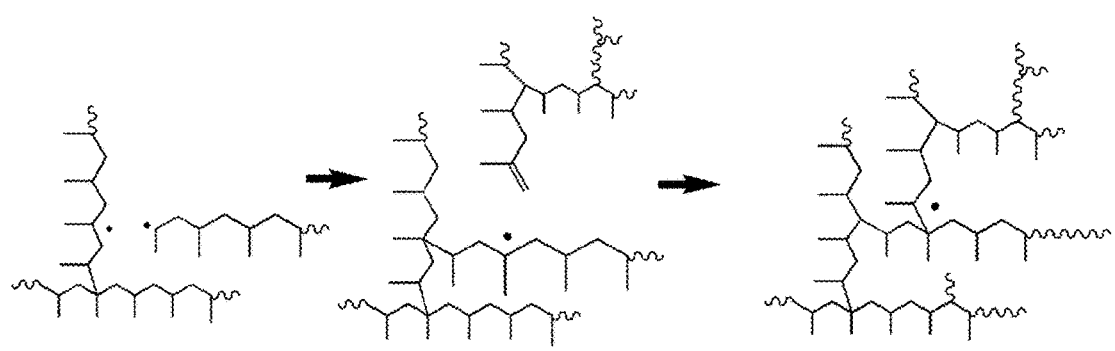
FIG. 30: Graph showing schematic of mechanism that leads to crosslinking of long chain branched polymers.

It is postulated that formation of gel in the samples might be due to addition of more branches to the chains that are already long chain branched, which may result in formation of network structures. FIG. 30 explains this mechanism. These reactions are probable since long chain branched chains have more repeating units and they are statistically more favored to undergo hydrogen abstraction again.

The amount of gel content of the runs was analyzed statistically and the empirical model is shown in Table 12. As expected, the AB two-factor interaction is significant (A=thickness, B=time).

TABLE 12

Empirical model for gel content in the radiated runs

| Statistical model | R2 | Adj. R2 | Equation # |
|---|---|---|---|
| $\sqrt{Gel}$ = −3.10 + 0.55*A + 0.37*B − 0.10*AB | 0.89 | 0.83 | Equation 5-7 |

Figure 31:
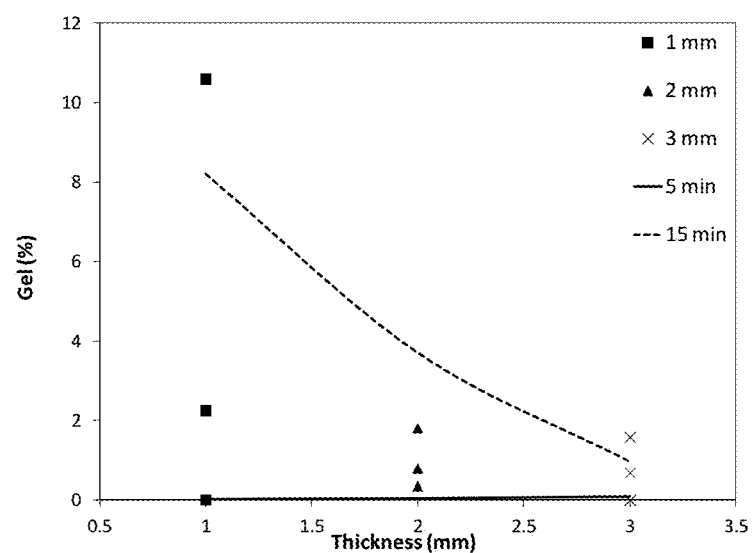
FIG. 31: Graph showing the effect of the time-thickness interaction on gel content.

FIG. 31 shows the effect of the AB interaction on the percent gel in the samples. As expected from the previous effects on LVE and molecular weight properties, an increase in thickness at constant radiation time results in lower gel content in the samples. This effect is more pronounced after 15 min of radiation.

PP has been modified using 0.5 wt-% BPH as photoinitiator and UV radiation to introduce LCB to its structure and increase its melt strength. The effects of radiation time and thickness of samples were investigated simultaneously using three-level factorial experiments. Both factors and their interaction were found to significantly affect the rheological properties, such as $\eta_0$, $\lambda$, PI, and ModSep, the molecular properties (MW and MWD), and, finally, gel content. ER and the shear thinning index depended on radiation time and thickness, but seemed independent of the interaction.

Both an increase in radiation time and a decrease in thickness of the samples result in a broader relaxation spectrum and larger $\eta_0$, $\lambda$ and ER, and more shear thinning behaviour (smaller n). On the other hand, at the same radiation time, thicker samples have lower $\eta_0$, $\lambda$ and ER, and larger n. Moreover, thick samples are less sensitive to changes in radiation times. Broadening of the relaxation spectrum with increasing radiation time was observed after longer radiation times for thicker samples (2 and 3 mm) compared to 1 mm samples.

The MW and MWD data show that an increase in radiation time and a decrease in sample thickness result in an increase in MW and broadening of MWD. The same trends were observed for the gel content of the samples. Thinner samples which were irradiated for longer durations showed greater gel content than thick samples which were radiated for shorter durations. Lower gel content and lower MW of the thick samples were attributed to limitations in UV penetration depth, which causes inhomogeneities in the formation of LCB throughout the sample.

A twin screw extruder was used for continuous modification of polypropylene (PP) via UV radiation. Long chain branches were incorporated in the PP backbone to modify its rheological properties. Benzophenone (BPH) as photoinitiator were utilized during PP photomodification. In some examples a coagent trimethylolpropane triacrylate (TMPTA) was used. Radiation was carried out after mixing in the extruder on solid stretched strands with approximately 0.3 mm thickness. The effects of photoinitiator concentration, radiation time and coagent presence were studied via a two-level full factorial design of experiments. It was shown that photomodification of PP can be done continuously. Formation of long chain branches (LCBs) in the experimental runs was confirmed via rheological measurements. Gel content of the samples was also measured. It was found that long chain branches can be formed in PP, both with and without TMPTA, at certain processing conditions. The amount of gel in the samples prepared with TMPTA was higher; however, the gel content could be controlled by manipulating BPH concentration and radiation time.

A continuous processing method for modification of PP via UV-irradiation has been developed. Modification was conducted in the solid state, and a twin screw extruder was used to continuously supply polypropylene for the modification. In contrast to continuous photomodification of PP by REX, UV modification was carried out after the strand exits the die and solidifies. Formation of long chain branches (LCBs) in PP was assessed with and without coagent's aid as a radical stabilizer. Trimethylolpropane triacrylate (TMPTA), a trifunctional acrylic coagent was used to "block" chain scission. The extruded solid strands were stretched to increase UV radiation penetration depth by decreasing strand thickness. Also, it is speculated that chain orientation, which happens due to external extensional forces, decreases degradation. Rheological measurements were used to evaluate the effect of BPH concentration, radiation time and coagent presence on viscoelastic properties and gel content. The (optimal) combination of these variables that results in long chain branching (LCB) rather than degradation or crosslinking (CL) was found.

In order to overcome this issue, and make sure that the modification was indeed feasible, the radiation was first carried out in the batch mode and solid state [58]. Processing conditions that essentially "preserve" macroradicals were determined by manipulating the processing variables. The processing variables, such as photoinitiator concentration, duration of irradiation, UV lamp intensity, process temperature, and photoinitiator type, were optimized to encourage radical combinations rather that β-scission. The effect of different combinations of these variables on rheological properties, molecular weight characteristics and branching level were studied in solid state. It was found that when UV lamp intensity was low, BPH concentration was more than 0.3 wt-% (in the total mixture), and radiation was carried out for more than 5 minutes at temperatures below 60° C., the melt strength of PP was increased significantly. It was found that LCB and degradation happen in parallel, and during the first minute of the modification process, degradation was the dominant reaction. As the radiation duration increased, more branches were formed (chain combination reactions dominant) [70].

When lower radiation time was needed, trimethylolpropane triacrylate (TMPTA) was added to PP/photoinitiator mixture as a coagent to increase the rate of LCB. TMPTA is a trifunctional acrylic monomer, which reacts with the radical centers and prevents them from β-scission. However, addition of coagent encourages formation of excessive gel in the samples [50], which might not be desirable for certain applications. Hence, processing variables were manipulated to find conditions which result in minimum gel content in the samples, while the number of long chain branches was still high. It was found that when the concentration of BPH was high (above 0.5 wt-%) and the TMPTA concentration low (below 0.2 wt-%), branching content was sufficiently large, while gel content could be controlled below 5%. All these modifications (producing LCBPP via UV radiation) were successfully conducted after mixing PP with the photoinitiator in the batch mode in solid state [58, 70].

Materials and Methods

Materials

Polypropylene homopolymer (PP2255E1) from Exxon-Mobil with melt flow rate (MFR) of 3.5 g/10 min (230° C., 2.16 kg) was used as the parent PP. Benzophenone (BPH), 99% purity, was purchased from Sigma-Aldrich and used as photoinitiator. Trimethylolpropane triacrylate (TMPTA) was purchased from Sigma-Aldrich and used as coagent. Irganox 1010, Ciba Specialty Chemicals, was used as antioxidant to prevent PP thermal degradation.

Design of Experiments

In order to study the effect of photoinitiator concentration, radiation time and coagent presence on the continuous modification of PP, a two-level full factorial design was used (see Table 13). Runs 1 to 8 represent the $2^3$ factorial design and run 9 is the center point, which was independently replicated (run 10). Runs 11 and 12 were conducted in addition to the 23 factorial design (and its center points) in order to generate more information about the process. Finally, run 13 is PP mixed with 1 wt-% BPH, which has only been passed through the extruder with no UV radiation. The properties of this run are shown for the sake of comparison. Viscoelastic properties along with the gel content of the runs were measured and statistically analyzed via Design Expert 8.0.7.1 software. Runs 9 and 10 were used to obtain an error estimate for further assessments of the significance of mathematical model terms.

Table 13 shows the different levels of the actual and coded variables (factors). The coded levels (the last three columns) are used in the models described below.

TABLE 13

Experiments for $2^3$ full factorial design

| Run # | BPH-A (wt-%) | Time-B (s) | Coagent-C (wt-%) | A (wt-%) | B (s) | C (s) |
|---|---|---|---|---|---|---|
| 1 | 0.5 | 16 | 0 | −1 | −1 | −1 |
| 2 | 1 | 16 | 0 | 1 | −1 | −1 |
| 3 | 0.5 | 36 | 0 | −1 | 1 | −1 |
| 4 | 1 | 36 | 0 | 1 | 1 | −1 |
| 5 | 0.5 | 16 | 0.25 | −1 | −1 | 1 |
| 6 | 1 | 16 | 0.25 | 1 | −1 | 1 |
| 7 | 0.5 | 36 | 0.25 | −1 | 1 | 1 |
| 8 | 1 | 36 | 0.25 | 1 | 1 | 1 |
| 9 | 0.75 | 26 | 0.13 | 0 | 0 | 0 |
| 10 | 0.75 | 26 | 0.13 | 0 | 0 | 0 |
| 11 | 0.75 | 26 | 0 | 0 | 0 | −1 |
| 12 | 0.75 | 26 | 0.25 | 0 | 0 | 1 |
| 13 | 1 | 0 | 0 | — | — | — |
| Parent PP | — | — | — | — | — | — |

Preparation Method

In order to improve mixing of photoinitiator and PP in the twin screw extruder, a PP/BPH master batch was prepared prior to extrusion. PP with 7 wt-% BPH were melt-mixed in a batch mixer at 190° C. and 80 rpm for 8 minutes. The same processing conditions were used for preparing the TMPTA and polypropylene master batch (2 wt-% TMPTA). The mixtures were subsequently ground using a Wiley mill (Model 1102, Arthur H. Thomas Co.). After grinding, the master batches were diluted with PP to prepare the recipes of the runs in Table 13. The final mixing was carried out in a Leistritz LSM 30.34 co-rotating twin-screw extruder (L/D=28) with 8 heating zones (including the die). The temperature set points for these eight zones along with the screw configuration are shown in FIG. 13.

Figure 32:
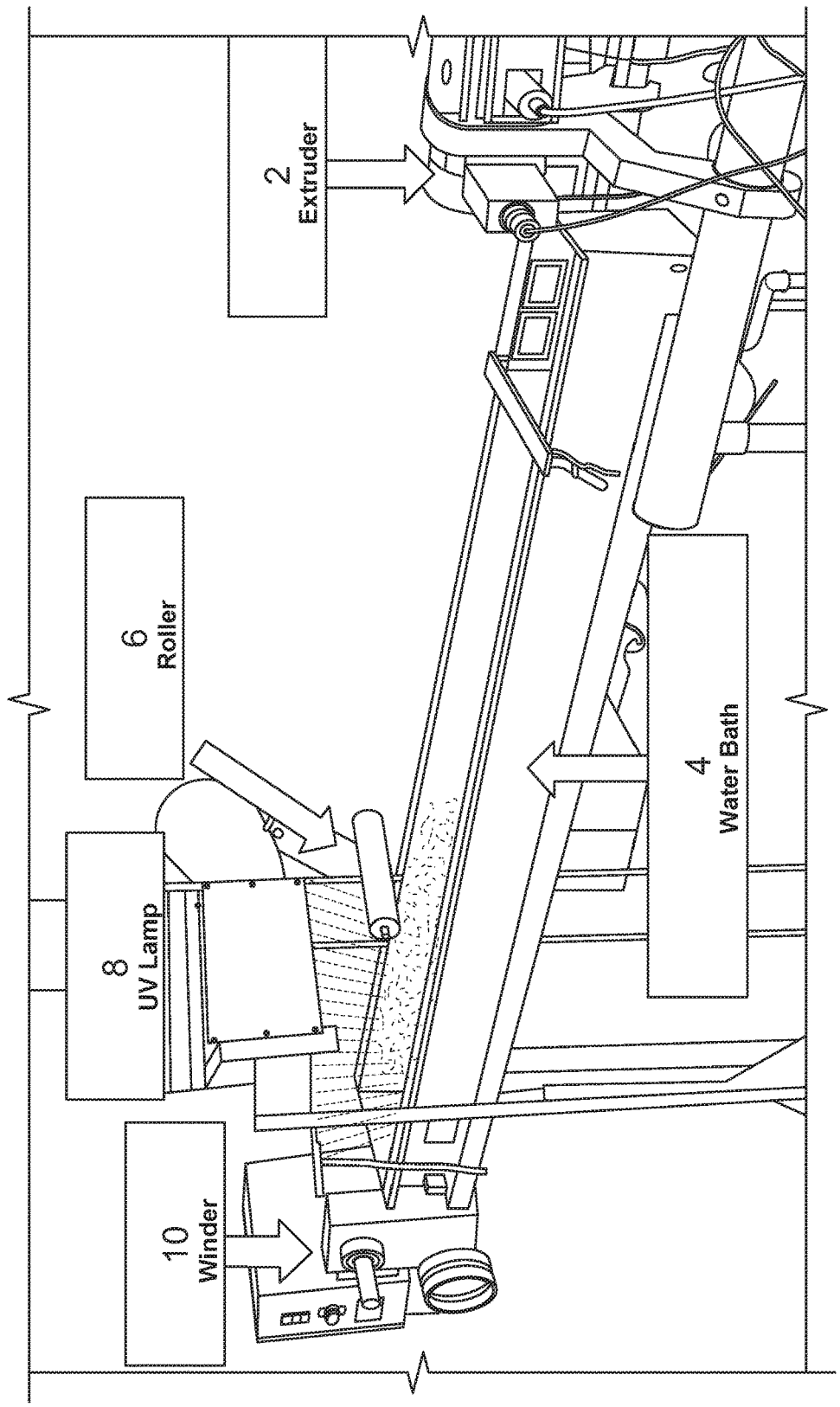
FIG. 32: System for continuous modification of polypropylene.
Figure 33:
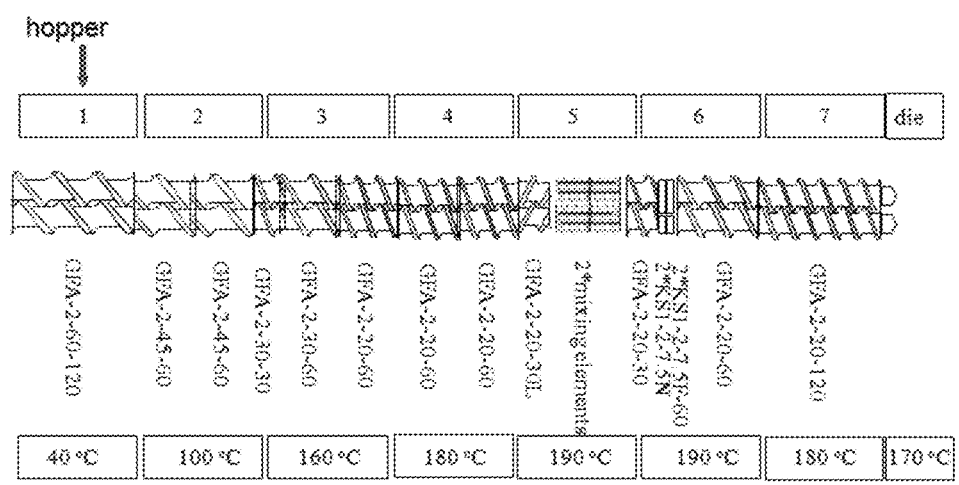
FIG. 33: Twin screw extruder screw combination and temperature of the zones.
Figure 34:
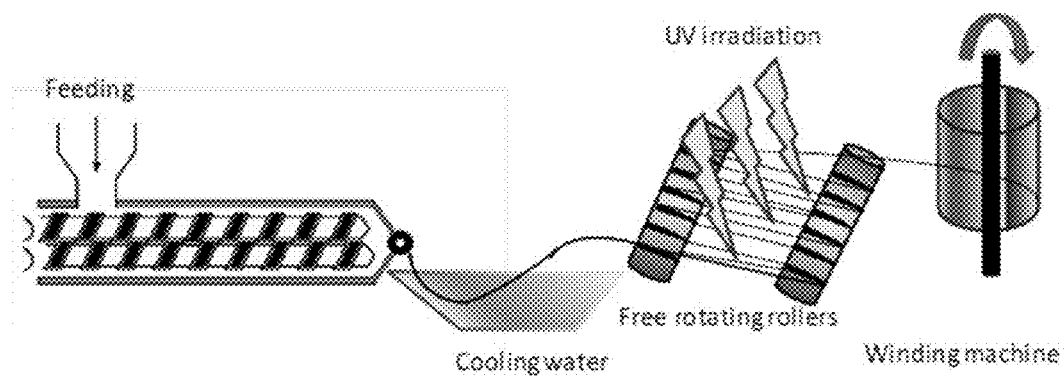
FIG. 34: The experimental setup for continuous modification of polypropylene via UV radiation.

The feeding rate was maintained around 20-25 g/min and the screw speed was 20 rpm. The die diameter was 1.5 mm and the melted strand was cooled down in a water bath (4) subsequent to its exit from the die of the Extruder 12. The solidified strand was stretched via two freely rotating rollers (6) (see the schematic of the operation in FIG. 32). Irradiation was carried out at this step via a UV lamp (8) (UV a Developer Kit from UV Process Supply Inc. (Versa Cure)). The mercury lamp power was 3.0 kW. The irradiated strand was collected using a winder (10) (35 rpm). The strands reach the diameter of approximately 0.3 mm after stretching between the rollers due to extensional forces applied by the winder. UV-modified PP was compression-moulded into discs with 25 mm diameter and 1 mm thickness at 190° C. under an applied force of 4,400 N for five minutes. The discs were used for further rheological characterization tests.

Parallel Plate Rheometry

For the analysis herein the same procedures explained in section 4.2.3.1 of Chapter 4 were followed. From these tests, storage modulus (G'), loss modulus (G"), complex modulus (G*), loss tangent (tan δ), and complex viscosity (η*) were obtained at different angular frequencies (ω). η*vs. ω graphs were used to find the shear thinning index (n), zero shear viscosity (η$_0$) and relaxation time (λ) of each sample by fitting the Cross model (Equation 3-11 in section 3.1 of Chapter 3) utilizing MATLAB (7.11.0 R2010b).

Rheological polydispersity indices were determined using the Equations described above. PI, ModSep and ER were calculated for all of the runs.

Gel Permeation Chromatography (GPC)

Steps were taken to eliminate the gel content prior to GPC. The GPC test was also conducted as described above.

Determination of Gel Content

The gel content of samples was found by solvent extraction. The method followed is described in ASTM D2765-11.

Rheological Properties

Zero shear viscosity (η$_0$), relaxation time (λ), shear thinning index (n), and rheological polydispersity indices (PI, ModSep and ER) of the runs were calculated. Table 14 summarizes these values for all experimental runs along with the parent PP.

Run 13 is PP mixed with 1 wt-% BPH, which has only been passed through the extruder with no radiation. Comparing the viscoelastic properties of this run with the parent PP (last row) shows that the processing step in the twin screw extruder followed by extension of the solid strand does not significantly affect the viscoelastic properties of the polymer.

TABLE 14

Viscoelastic properties (η$_0$, λ and n), rheological polydispersity indices (PI, ModSep and ER) and gel content of the experimental runs

| Run # | η$_0$ (kPa · s) | λ (s) | n | PI | ModSep | ER | Gel content (%) |
|---|---|---|---|---|---|---|---|
| 1 | 5.5 | 0.8 | 0.52 | 4.0 | 3.5 | 0.18 | 0 |
| 2 | 7.3 | 1.2 | 0.51 | 3.7 | 3.5 | 0.20 | 0 |
| 3 | 6.5 | 2.7 | 0.50 | 6.9 | 2.9 | 0.27 | 0 |
| 4 | 1.8*10$^2$ | 1.21*10$^4$ | 0.43 | 8.5 | 1.8 | 0.69 | 6.3 |
| 5 | 8.2 | 0.6 | 0.57 | 3.3 | 3.9 | 0.15 | 0 |
| 6 | 8.1*10 | 8.49*10$^2$ | 0.45 | 11.0 | 1.9 | 0.73 | 2.6 |
| 7 | 9.8*10$^2$ | 1.07*10$^5$ | 0.50 | 16.1 | 1.2 | 0.94 | 16.4 |
| 8 | 1.1*10$^3$ | 1.11*10$^5$ | 0.47 | 11.2 | 1.3 | 1.22 | 12 |
| 9 | 2.2*10 | 44.2 | 0.46 | 7.4 | 2.3 | 0.42 | 0 |
| 10 | 1.8*10 | 29.4 | 0.46 | 7.0 | 2.3 | 0.45 | 1.4 |
| 11 | 4.7 | 1.4 | 0.50 | 5.9 | 3.1 | 0.22 | 0 |
| 12 | 6.4 | 7.8 | 0.45 | 8.4 | 2.6 | 0.37 | 1.4 |
| 13 | 9.3 | 0.6 | 0.60 | 3.5 | 3.7 | 0.14 | 0 |
| Parent PP | 1.1*10 | 0.6 | 0.60 | 3.3 | 3.8 | 0.16 | 0 |

Data presented in Table 14 show that when the BPH concentration increases, η$_0$, λ and ER increase and n decreases (compare runs 1 vs 2, 3 vs 4, 5 vs 6 and 7 vs 8). These changes in θ$_0$, λ, n and ER reflect formation of LCBs. The reason is higher possibility of hydrogen abstraction from PP chains due to the presence of a larger amount of photoinitiator. Thus, more chain combination reactions will happen, which leads to a larger number of LCBs.

In addition, as the radiation time increases, an increase in $\eta_0$, $\lambda$, ER and a decrease in n happen, which again reflect formation of a larger number of LCBs (compare runs 1 vs 3, 2 vs 4, 5 vs 7 and 6 vs 8). When radiation time increases, chances for macroradical combination increase, which again leads to formation of more LCBs [70].

Addition of coagent stabilizes PP radical centers and prevents them from degradation. Thus, runs with coagent show larger $\eta_0$, $\lambda$, ER and more shear thinning behaviour (decrease in n) compared to the runs prepared with no coagent.

Unlike ER, changes in PI and ModSep do not directly indicate formation of branches and can be due to changes in the breadth of the MWD, which might have happened during UV modification. However, analysis of these indices is important in order to identify the effect of modification on the MWD of the polymer. In general, increase in BPH concentration, radiation time, or addition of coagent lead to broadening of the MWD, and consequently, an increase in PI and a decrease in ModSep will result. The main factors and factor interactions which affect PI and ModSep significantly will be discussed shortly in section 7.3.1.1, along with other response variables ($\eta_0$, $\lambda$, n and ER). It is worth emphasizing that since ER is only affected by the distribution of the high molecular weight chains, it can reflect formation of branches directly.

The above mentioned trends are in agreement with results for batch modification of PP. However, in previous offline/batch experiments (irradiation of sheets with 1 mm thickness), no significant change in the properties of the polymer samples was obtained after a few seconds (16-36 s) of radiation. It was found that at least 5 min of radiation time was needed to reach significant LCB levels in these runs. The reason for the significant increase in $\eta_0$, $\lambda$ and ER after low radiation times (see runs 4 and 6 of Table 14) is the low thickness of the radiated strands. It was found that as the sample thickness decreases, the effect of photomodification becomes more pronounced throughout the sample. The other possibility is that chain orientation, which happens during stretching of the PP strands, decreases β-scission reactions. β-scission reactions are encouraged by PP chain motions, while these motions are prevented when chains are stretched under extensional forces [10].

Figure 35:
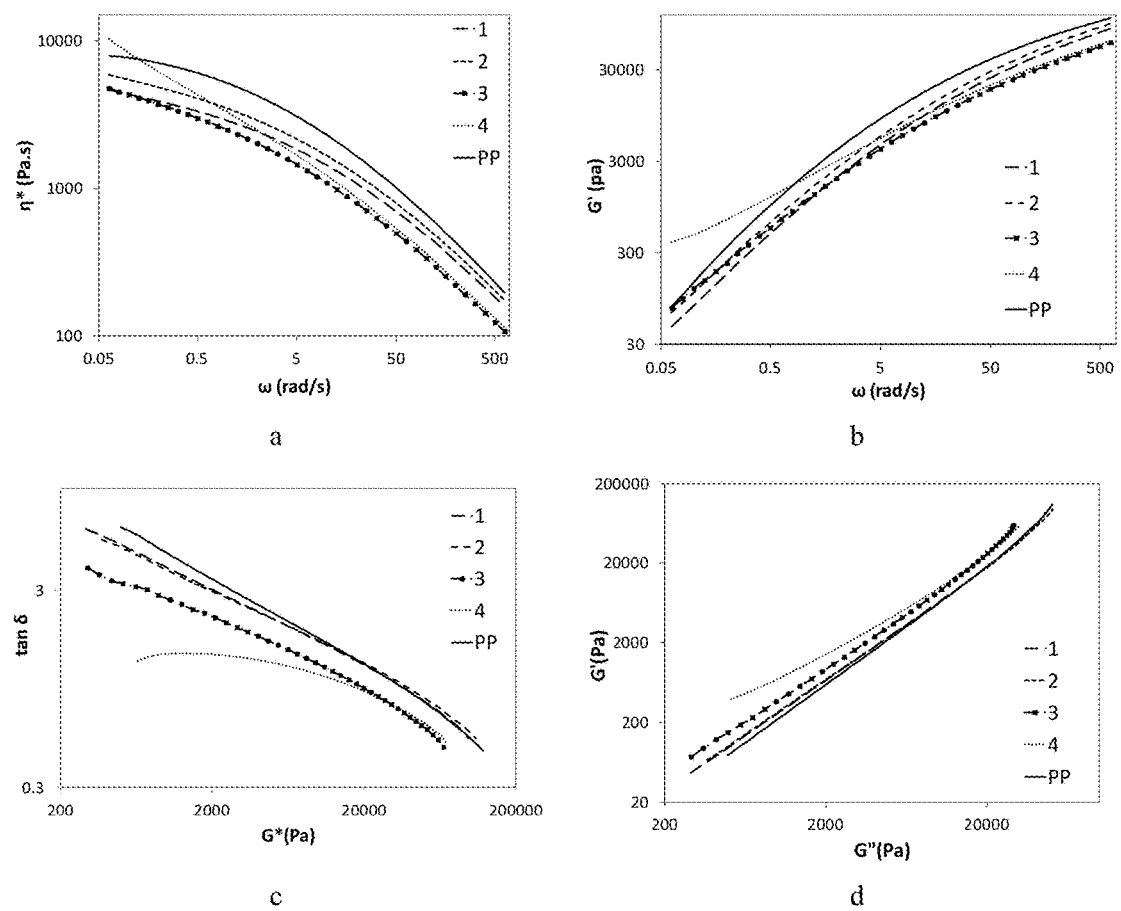
FIG. 35A: Graph showing η*-ω of the runs without coagent.
FIG. 35B: Graph showing G'-ω of the runs without coagent.
FIG. 35C: Graph showing tan δ-G* of the runs without coagent.
FIG. 35D: Graph showing Cole-Cole plots of the runs without coagent.
Figure 36:
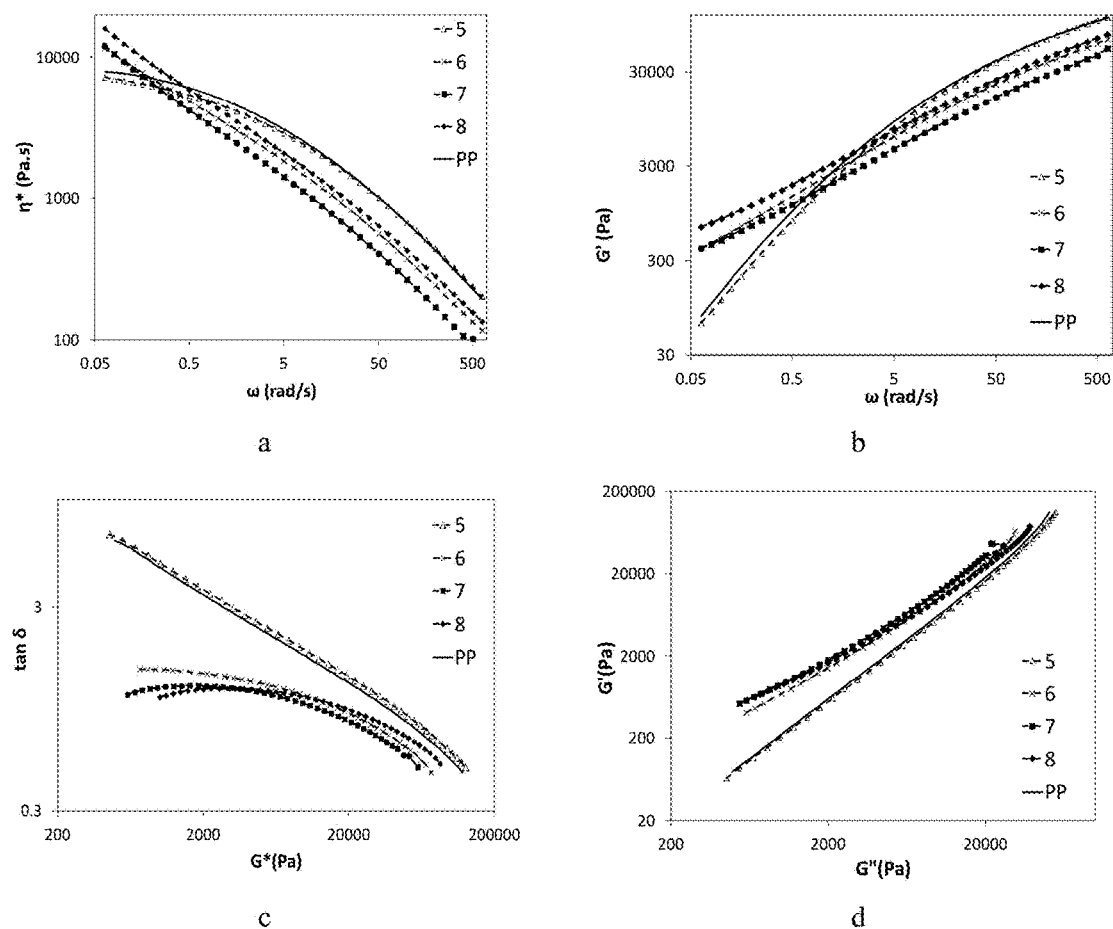
FIG. 36A: Graph showing η*-ω of the runs with coagent.
FIG. 36B: Graph showing G'-ω of the runs with coagent.
FIG. 36C: Graph showing tan δ-G* of the runs with coagent.
FIG. 36D: Graph showing Cole-Cole plots of the runs with coagent.

In order to study the viscoelastic properties in more detail, $\eta^*$-ω, G'-ω, tan δ-G* and Cole-Cole plots are shown in FIG. 35 and FIG. 36. FIG. 35 shows these graphs for runs 1 to 4 (runs without coagent), whereas FIG. 36 shows the corresponding graphs for runs 5, 6, 7 and 8 (runs with coagent).

In FIG. 35 a ($\eta^*$-ω), run 4 has significantly larger $\eta^*$ at low frequencies and exhibits more shear thinning behaviour than the parent PP and all other runs. This significant shear thinning behaviour of run 4 resulted in lower viscosity compared to the parent PP at high frequencies, which is an advantage due to easier processing of the modified PP. In FIG. 35 b (G'-ω), run 4 shows larger G' values at low frequencies. Larger storage modulus (G') of run 4 once again verifies formation of long chain branches in this run. Moreover, the slope of the G'-ω curve in run 4 is significantly lower than all other runs at low frequencies, which is another indication of formation of branches in this run (LCBPP has a lower G'-ω slope at low frequencies). Runs 2 and 3 also show a decrease in G'-ω slope, while their storage modulus (G') is not larger than the parent PP (like run 4). It is believed that although LCBs were formed in these runs (more shear thinning behaviour is also observed in runs 2 and 3, FIG. 35 a), the number of long chain branches was not large enough to compensate for the effect of formation of low MW chains.

These low MW chains are formed due to β-scission reactions, which happen in parallel to LCB reactions.

tan δ-G* and Cole-Cole plots (FIG. 35c and d) are indicators of the MWD characteristics of the runs. It is shown that all runs have broader distributions than the parent PP. This is in agreement with PI and ModSep values of runs 1 to 4, which are cited in Table 14 (larger PI and lower ModSep of runs 1 to 4 compared to the parent PP). Moreover, according to tan δ-G* and Cole-Cole plots, the distribution becomes broader in the runs radiated for longer time (runs 3 and 4). As radiation time increases, more macroradical combination reactions can happen and chains with different length will be formed, which causes broadening of the MWD.

FIG. 36 compares $\eta^*$-ω (a), G'-ω (b), tan δ-G* (c) and Cole-Cole (d) plots of the runs prepared with 0.25 wt-% of coagent (5 to 8). In FIG. 36a, all runs, except run 5 have larger $\eta^*$ at low frequencies compared to the parent PP, which indicates larger MW of the modified runs. Due to presence of branches in runs 6, 7 and 8, these runs not only show more shear thinning behavior, but also they have larger elastic modulus compared to the parent PP (FIG. 36b). Also, the slope of the G'-ω curve is significantly lower at low frequencies, which confirms formation of branches and crosslinks in these runs. In FIG. 36 c and d, all runs except run 5, which is expected to be degraded, significantly deviate from the parent PP. This shows that the MWD of these modified runs has been significantly changed in comparison to the parent PP.

Empirical Models and Trends

The data points presented in Table 14 were analyzed with Design Expert (statistical software). Empirical models were fit to each response. These models are cited in Table 15.

The data points presented in Table 14 were analyzed with Design Expert (statistical software). Empirical models were fit to each response. The significant variables were chosen based on the Shapiro-Wilk test. The significance of the final model and the significance of the lack of fit of the final model were considered, so the model with minimum lack of fit was chosen. The Shapiro-Wilk test examines the unselected main factors and interactions to determine if they follow normality. It is worth noting that the lack of fit was insignificant for all models shown in Table 15. Table C includes these models (models in Table 15) along with the corresponding $R^2$ and adjusted $R^2$ values for each model.

TABLE C

Empirical models for viscoelastic properties and gel content based on coded variables

| Empirical model | $R^2$ | Adj. $R^2$ |
|---|---|---|
| $1/\sqrt{\eta_0}$ = 8.15E−3 − 2.41E−3*A − 2.89E−3*B − 2.55E−3*C + 1.97E−3*ABC | 0.72 | 0.57 |
| $Log_{10}(\lambda)$ = 1.79 + 0.87*A + 1.49*B + 0.90*C − 0.83*ABC | 0.86 | 0.78 |
| n = 0.49 − 0.027*A − 0.018*B + 0.019*ABC | 0.74 | 0.64 |
| (ModSep)1.45 = 3.96 − 0.84* A − 1.51* B − 0.83* C + 0.87*ABC | 0.92 | 0.87 |
| $1/\sqrt{ER}$ = 1.6 − 0.29*A − 0.41* B − 0.26* C + 0.24*ABC | 0.92 | 0.88 |
| PI = 7.8 + 2.55*B + 2.07*C − 1.38*AB − 1.79* ABC | 0.95 | 0.92 |
| $Log_{10}$(Gel + 0.0017) = −1.07 + 0.83*A + 1.03*B + 1.04*C − 0.86*ABC | 0.85 | 0.77 |

TABLE 15

Empirical models for viscoelastic properties
and gel content based on coded variables

| Empirical model | Equation # |
|---|---|
| $1/\sqrt{\eta_0}$ = 8.15E-3 - 2.41E-3*A - 2.89E-3*B - 2.55E-3*C + 1.97E-3*ABC | Equation 7-1 |
| $\mathrm{Log}_{10}(\lambda)$ = 1.79 + 0.87*A + 1.49*B + 0.90*C - 0.83*ABC | Equation 7-2 |
| n = 0.49 - 0.027*A - 0.018* B + 0.019*ABC | Equation 7-3 |
| (ModSep)1.45 = 3.96 - 0.84* A - 1.51* B - 0.83* C + 0.87*ABC | Equation 7-4 |
| $1\sqrt{ER}$ = 1.6 - 0.29*A - 0.41* B - 0.26* C + 0.24*ABC | Equation 7-5 |
| PI = 7.8 + 2.55*B + 2.07*C - 1.38*AB - 1.79* ABC | Equation 7-6 |
| $\mathrm{Log}_{10}$(Gel + 0.0017) = -1.07 + 0.83*A + 1.03*B + 1.04*C - 0.86*ABC | Equation 7-7 |

In Table 15, variables A, B and C are BPH concentration, radiation time and coagent concentration (as per Table 15), respectively. AB and ABC denote two factor (BPH concentration-radiation time) and three factor interactions (BPH concentration-radiation time-coagent concentration), respectively. In the equations 15, factors and their interactions are shown in terms of coded variables (see Table 13 for the coded values of these variables). The equations of Table 15 confirm the trends discussed earlier during the analysis of Table 14. Zero shear viscosity ($\eta_0$) and relaxation time ($\lambda$) are significantly and positively affected by BPH concentration (A), radiation time (B) and coagent concentration (C). Also, shear thinning index (n) is negatively affected by BPH concentration and radiation time (more shear thinning behaviour due to formation of LCBs). In order to study these factors along with their interactions more closely, 3D interaction plots are shown in FIG. 37. In FIG. 37 the graphs on the right show interactions when coagent was used, whereas the ones on the left are without coagent.

A comparison of the graphs on the right with those on the left shows that the trends are the same for runs prepared with and without coagent. However, the maximum of $\eta_0$, $\lambda$ and the minimum of n are reached when TMPTA coagent was used in the runs. Also, an increase in $\eta 0$ and $\lambda$ and a decrease in n values are more significant at high BPH concentration compared to low BPH concentration ranges.

Equation 7-4, Equation 7-5 and Equation 7-6 reflect changes in the MWD, when BPH concentaration, radiation time and coagent concentration change. An increase in any of these variables leads to broader MWD with a tail in the high molecular weight ranges (larger ER and lower ModSep). Using the empirical models shown in Table 15, ABC interactions plots are constructed for the rheological polydispersity indices. FIG. 38a, b and c show ABC interactions for Modsep, ER and PI, respectively. It can be seen that as radiation time increases, ModSep decreases, while ER and PI increase. The reason is broadening of the MWD towards high MW ranges. This is due to formation of long chain branches, which causes formation of a tail in the MWD and broadens the MWD in general. Same as with the other viscoelastic properties, the changes in polydispersity indices are more significant at higher BPH concentrations.

Gel Content Measurements

The percentage of gel for in each run was determined, and the values are summarized in Table 14. Among runs prepared with no coagent only run 4, which has the highest BPH concentration and radiation time, has crosslinked and insoluble structures.

On the other hand, among runs prepared with coagent, only run 5, which is clearly degraded (see Table 14), has no gel in its structure. Increasing BPH concentration from run 5 to 6 leads to formation of about 2.5% gel in the modified PP. Formation of gel in the runs might be undesirable for certain applications. However, considering the significant improvement in rheological properties of run 6, 2.5% gel is still an acceptable margin. In contrast to runs 5 and 6, increasing BPH concentration at high radiation time (runs with coagent), causes formation of less gel in the samples (see runs 7 and 8). This trend has also been observed in Chapter 6 for batch photomodification at the presence of coagent. When BPH concentration increases, more radicals will be formed; consequently, the number of PP macroradicals that go through degradation β-scission) increases. Thus, the number of PP macroradicals which do not have TMPTA in their structure increases. The probability of reaction between PP macroradicals (which are protected by TM PTA) and products of β-scission (PP with a double bond at its chain end or secondary PP macroradicals), or tertiary PP macroradicals (PP macroradicals prior to β-scission), increases. These reactions encourage formation of long chain branches rather than /crosslinked networks. Hence, although η0 and ER of these runs have significantly increased, the gel content is relatively low. At low radiation time, the concentration of radicals is not large enough due to insufficient progress in the extent of reaction. Thus, as BPH concentration increases, gel content also increases.

Increasing radiation time (see runs 6 and 8, or run 2) causes formation of a significantly larger amount of gel in the runs. This is again in agreement with results from the batch modification. An increase in radiation time increases the probability of hydrogen abstraction from the chains that are already long chain branched. This leads to formation of connected network structures.

The changes observed in the rheological properties of the modified runs that have high gel content (see runs 7 and 8 in FIG. 36 and Table 14) are due to formation of both long chain branches and crosslinks. The presence of long chain branches after excluding the gel from the samples has been confirmed using both GPC and rheological tests on the sol fraction of run 8.

Figure 39A:
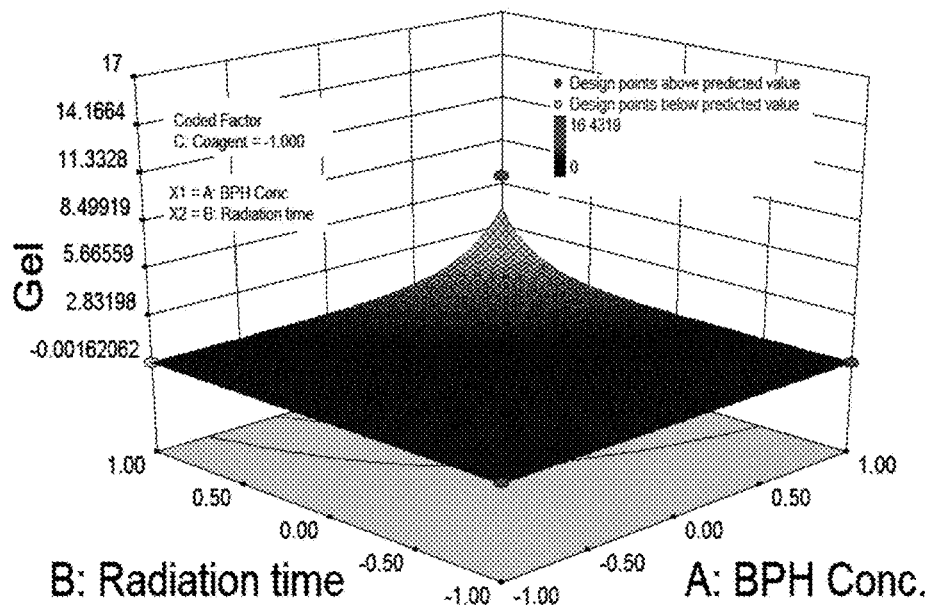
FIG. 39A: 3D interaction plot for gel content without coagent.
Figure 39B:
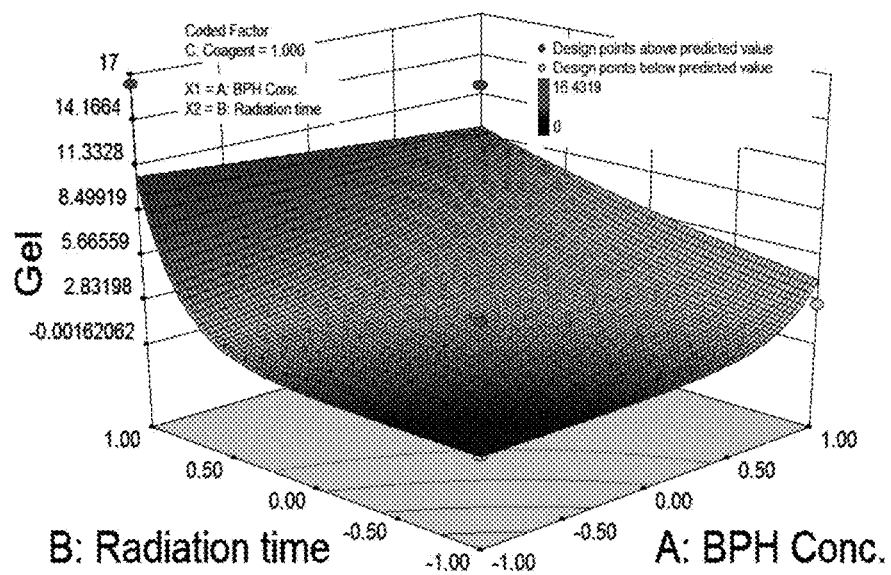
FIG. 39B: 3D interaction plot for gel content with coagent.

For the rheological indicators, an empirical model was used to show the significant variables and interactions affecting the gel content of the runs (Table 15). The model confirms that BPH concentration, radiation time and presence of coagent all have a significant and positive effect on the gel content of the runs. The 3-factor interaction (ABC) was also found to be significant. FIG. 39 shows representative factor interactions in two 3D surface plots. FIG. 39 a shows the AB interaction when coagent was not used, and FIG. 39b is for the case when coagent was used. Again, the maximum gel content was reached when coagent was used. The above mentioned trends with coagent can also be observed in FIG. 39b (at low radiation time, an increase in BPH concentration leads to a higher gel content, while at high radiation time a lower amount of gel results).

Conditions that Result in Long Chain Branched PP with Minimum Gel Content

In order to find the conditions that maximize LCB while having the lowest gel content during the continuous modification of PP, the same steps as in Chapter 6 were followed. The contour plots were constructed for $\eta_0$, $\lambda$, n, ER, and gel content. Certain specifications were set for each response in order to locate the (optimal) processing window. Table 16 shows such specifications that lead to optimal processing conditions.

TABLE 16

Response variables and their specs for locating the optimal processing condition region

| Response | Specifications |
| --- | --- |
| n | <0.48 |
| $\eta_0$ (Pa · s) | >10,000 |
| $\lambda$ (s) | >3 |
| ER | >0.4 |
| Gel content (%) | <5 |

Figure 40:
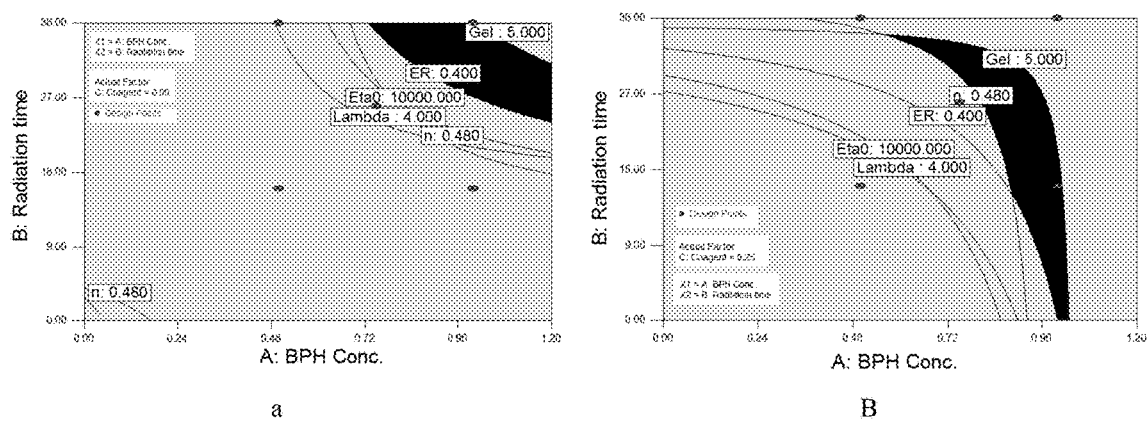
FIG. 40A: Graph showing conditions that yield high degree of LCB without significant gel content without TMPTA.
FIG. 40B: Graph showing conditions that yield high degree of LCB without significant gel content with TMPTA.

The contour plots corresponding to these processing specs are shown for runs without and with coagent (TMPTA) in FIG. 40a and b, respectively. The optimal processing window, which satisfies these limits for the response variables (specs of Table) is shaded in black.

GPC Measurements

Figure 41:
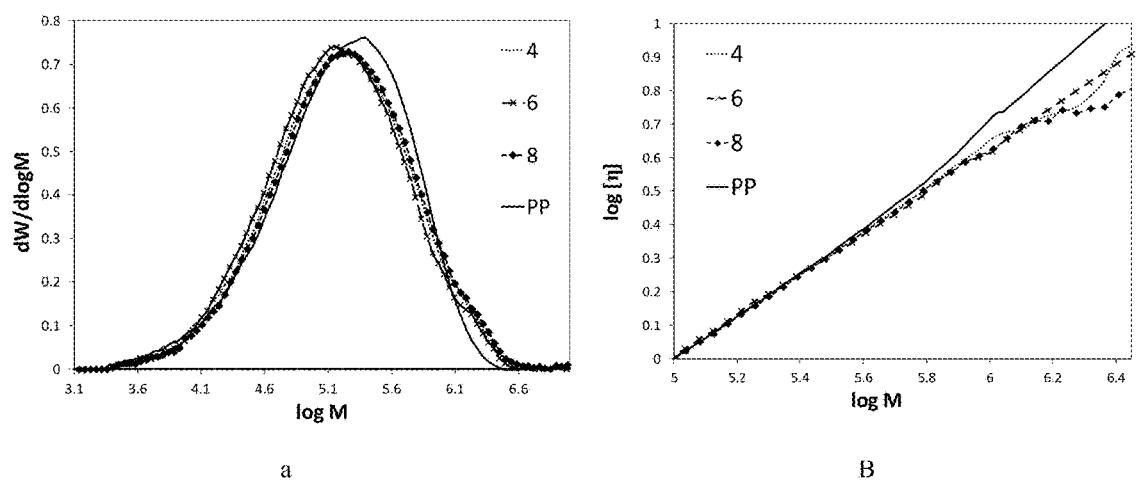
FIG. 41A: Graph showing MWDs vs. log M for runs 4, 6, 8 and the parent PP.
FIG. 41B: Graph showing log [η] vs. log M for runs 4, 6, 8 and the parent PP.

GPC measurements were selectively conducted on runs 4, 6, 8 and the parent PP. These runs were chosen, since they manifest clear evidence for LCB in their rheological measurements (see Table 14). Run 4 was the only run prepared without coagent that shows indications of formation of long chain branches. Runs 6 and 8 were both prepared using TMPTA and both show indications of formation of LCBs. The gel content of run 6 was exceptionally low, while its rheological properties confirmed formation of a large amount of LCBs. Run 8 was chosen since it had the largest $\eta 0$, $\lambda$ and ER, and the lowest n value among all runs. FIG. 41a and b show the MWD and log [$\eta$]-log M, respectively, for these selected runs.

The MWD of all these runs shows presence of a tail at the high MW ranges (FIG. 41a). For runs 6 and 8, this tail at high molecular weights has almost formed a shoulder, which confirms formation of larger molecules due to LCB.

FIG. 41b shows log [$\eta$] vs. log M. Deviations of the modified runs from the linear parent PP towards lower [$\eta$] values indicate formation of LCBs. All three modified runs deviate from the linear PP at molecular weights above 447 kg/mol ($10^{5.65}$ g/mol). Since all three modified runs deviate almost equally from the linear PP, the weight average number of long chain branches ($B_w$) in these polymers was found to be the same and around 0.26 branches per molecule calculated.

Using the MWD, number average molecular weight ($\overline{M}_n$), weight average molecular weight ($\overline{M}_w$), z average molecular weight ($\overline{M}_z$) and polydispersity index (PDI) values were calculated and the results are summarized in Table 17. As expected from FIG. 41a, all modified runs have greater $\overline{M}_w$ and significantly larger $\overline{M}_z$ than the parent PP. Also, an increase in the PDI of the samples shows that the MWD has become broader due to the presence of long chain branches. As expected, run 8 has the largest $\overline{M}_w$, $\overline{M}_z$ and the broadest MWD, which is in agreement with the rheological measurements (Table 14).

TABLE 17

Molecular weight averages and PDI of the selected radiated runs along with the parent PP

| Sample ID | BPH content (wt-%) | Radiation time (s) | Coagent content (wt-%) | $\overline{M}_n$ (kg/mol) | $\overline{M}_w$ (kg/mol) | $\overline{M}_z$ (kg/mol) | PDI |
| --- | --- | --- | --- | --- | --- | --- | --- |
| 4 | 1 | 36 | 0 | 70 | 288 | 551 | 4.1 |
| 6 | 1 | 16 | 0.25 | 69 | 279 | 641 | 4.0 |
| 8 | 1 | 36 | 0.25 | 73 | 339 | 1,229 | 4.7 |
| PP | 0 | 0 | 0 | 73 | 271 | 274 | 3.7 |

It has further been found that other polyolefins can be modified by UV irradiation in the presence of a photoinitiator to promote LCB.

Branching of Linear Polyethylene

Materials

The resin used in this study was a commercial HDPE from Imperial Oil Canada Limited (Mw=51,850, PDI=3.71, MFI=5 g/10 min). Benzophenone (BP), the photo-initiator in this study, was purchased from Fischer Scientific. A central composite response surface design (Table 18) was used based on BP concentration, throughput, and extruder screw speed. A Haake Rheocord 90 batch mixer was used to make a PE-BP master batch (10 wt-%). Proper amounts of PE pellets were added to the master batch to make the desired feed material for each extrusion run.

TABLE 18

Process factor levels used in the experimental design of the REX runs

| Variables | −α Level | −1 Level | +1 Level | +α Level |
| --- | --- | --- | --- | --- |
| BP (wt-%) | 0 | 0.1 | 0.5 | 0.64 |
| Flow Rate (g/min) | 16.4 | 30 | 70 | 83.6 |
| Screw Speed (rpm) | 32.7 | 60 | 140 | 167.2 |

Equipment

REX experiments were conducted in a Leistritz LSM 30.34 co-rotating twin-screw extruder (L/D=40/1) with ten heating zones. A UV developer kit from UV Process Supply Inc (Versa Cure, 3.0 kW) was used for irradiation purposes. UV irradiation took place in zone 8 of the extruder.

Results and Discussion

Figure 42:
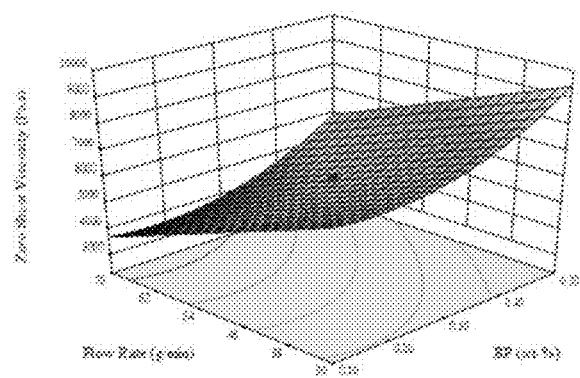
FIG. 42: Zero-shear viscosity response surface.
Figure 43:
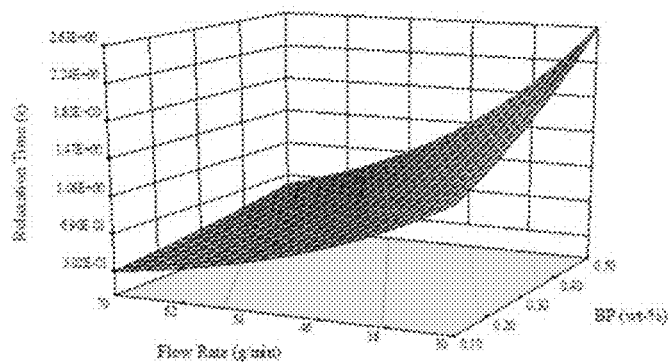
FIG. 43: Relaxation time response surface.

Oscillatory shear experiments were performed to evaluate the rheological properties of virgin and modified HDPE resins. Experiments were performed at 190° C. on a TA Instruments AR2000 rheometer with parallel plate geometry. The Cross model was fitted to the viscosity data to evaluate zero shear viscosity ($\eta o$), power law index (n), and characteristic relaxation time ($\lambda$). The response surface graph of zero shear viscosity at different processing conditions is shown in FIG. 42. A quadratic model was selected for the zero shear viscosity. BP, throughput (shown as flow rate), and the quadratic form of BP (BP2) were found to be the significant terms. Both BP and its quadratic form had a positive effect on $\eta o$, whereas throughput had a negative impact on it. In general, an increase in zero shear viscosity of the PE resins was observed, compared to the original linear PE. It is well established that LCB increases the characteristic relaxation time of the polymer. The relaxation time increased from a starting value of 0.05 s to 4 s. This increase verified the existence of LCB, since a higher extent of entanglements requires longer time to fully relax. The increase in $\eta$caused a broader transition region between the Newtonian plateau and the shear thinning region. The relaxation time response surface is shown in FIG. 43, and linear model was selected to fit the data. Similar to $\eta o$, BP content and the polymer flow rate (throughput) were the significant factors. Relaxation time increased with BP content, and decreased with increasing the flow rate (due to lower extent of irradiation due to a thicker PE layer in the irradiation zone).

Figure 44:
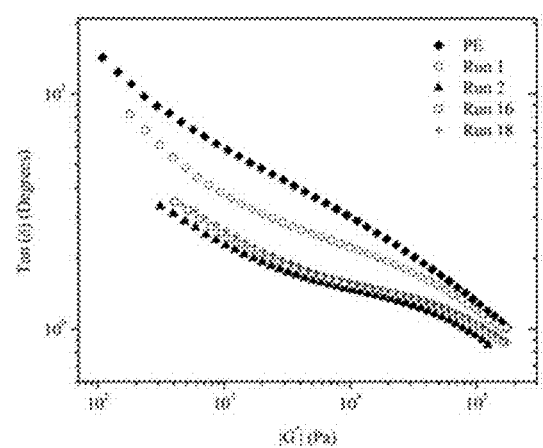
FIG. 44: van Gurp-Palmen plot of selected runs.
Figure 45:
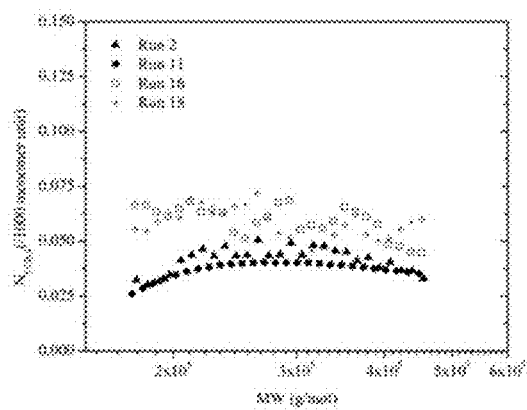
FIG. 45: Number of LCB of selected runs.
Figure 46:
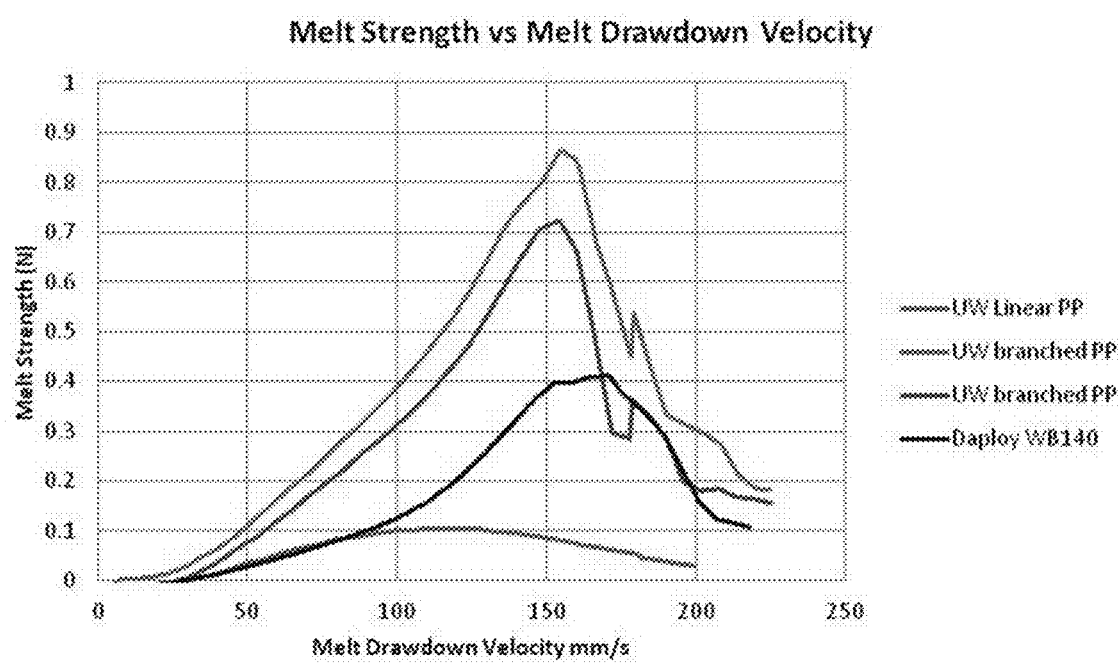
FIG. 46: Graph showing melt strength (N) v. melt draw-down velocity mm/s.

To further verify the formation of LCB, van Gurp-Palmen plots were constructed (shown in FIG. 44; runs 1,2,16,18 correspond to BP, flow rate, and screw speed variable levels of (−α,0,0), (−1,−1,+1), (+1,−1, +1) and (+α,0,0) respectively). These plots are independent of the molecular weight of the polymer [10] and any difference in the behavior (relative to the parent resin) is attributed to MWD and LCB. It is clear that the modified runs have lower loss angle values compared to the linear HDPE. Since all resins were found to similar MWDs the difference in the curves is hence attributed to LCB. An inflection point was further observed in this graph, which becomes more enhanced as the extent of LCB increases. It was further attempted to quantify the extent of long chain branching. The mechanism involved in this REX process includes free radical formation, followed by hydrogen abstraction and finally LCB formation. For this radiation-modified PE, a tetra-functional randomly branched LCB architecture is expected. Further calculations were carried out to obtain the average number of branches per 1,000 monomer units of PE, indicated by NLCB, according to the work of Scorah et al. [2]. FIG. 45 shows the distribution of the average number of branch points (NLCB) as a function of molecular weight for tetra-functional (H type) branches (NLCB4). Runs 2,11,16,18 correspond to BP, flow rate, and screw speed variable levels of (−1,−1,+1), (0,−α,0), (+1,−1,+1) and (+α,0,0) respectively. This graph was constructed for molecular weights between 150,000-500,000 g/mol, where branching was expected to occur to a larger extent.

The present disclosure has been described with reference to what are presently considered to be the examples. It is to be understood that the disclosure is not limited to the specific examples disclosed therein. The disclosure is intended to cover various modifications and equivalents included within the spirit and the scope of the appended claims.

All publications, patents and patent applications identified herein are herein incorporated by references in their entirety.

REFERENCES

1. Tzoganakis C, Vlachopoulos J, Hamielec A. Production of controlled-rheology polypropylene resins by peroxide promoted degradation during extrusion. Polymer Engineering & Science 1988; 28(3):170-180.
2. Mohring P C, Coville N J. Homogeneous Group 4 metallocene Ziegler-Natta catalysts: the influence of cyclopentadienyl-ring substituents. Journal of Organometallic Chemistry 1994; 479(1-2):1-29.
3. Scheutz B, Rainer K. Metocene-Metallocene Polypropylene used in the Pharmaceutical and Medical Sector. Business Briefing: Medical Device Manufacture and Technology 2005;39: 1-4.
4. Gotsis A, Zeevenhoven B, Hogt A. The effect of long chain branching on the processability of polypropylene in thermoforming. Polymer Engineering & Science 2004; 44(5):973-982.
5. Graebling D. Synthesis of branched polypropylene by a reactive extrusion process. Macromolecules 2002; 35(12):4602-4610.
6. Parent JS, Bodsworth A, Sengupta SS, Kontopoulou M, Chaudhary BI, Poche D, Cousteaux S. Structure-rheology relationships of long-chain branched polypropylene: Comparative analysis of acrylic and allylic coagent chemistry. Polymer 2009; 50(1):85-94.
7. Wong B, Baker W. Melt rheology of graft modified polypropylene. Polymer 1997; 38(11):2781-2789.
8. Krause B, Voigt D, Häußler L, Auhl D, Münstedt H. Characterization of electron beam irradiated polypropylene: Influence of irradiation temperature on molecular and rheological properties. J Appl Polym Sci 2006; 100(4): 2770-2780.
9. Han S M, Choi C H. Polypropylene resin compositions having high melt tension and method for preparing the same 2012; 20120149845A1, US patent.
10. Rätzsch M, Arnold M, Borsig E, Bucka H, Reichelt N. Radical reactions on polypropylene in the solid state. Progress in Polymer Science 2002; 27(7):1195-1282.
11. Langston J A, Colby R H, Chung T M, Shimizu F, Suzuki T, Aoki M. Synthesis and characterization of long chain branched isotactic polypropylene via metallocene catalyst and T-reagent. Macromolecules 2007; 40(8):2712-2720.
12. Tullo A H. Metallocene rise again. Chem Eng News, 2010; 88(42):10-16.
13. Yu Q, Zhu S. Peroxide crosslinking of isotactic and syndiotactic polypropylene. Polymer 1999; 40(11):2961-2968.
14. Su F, Huang H. Supercritical carbon dioxide-assisted reactive extrusion for preparation long-chain branching polypropylene and its rheology. The Journal of Supercritical Fluids 2010; 56(1):114-116.
15. Auhl D, Stange J, Münstedt H, Krause B, Voigt D, Lederer A, Lappan U, Lunkwitz K. Long-chain branched polypropylenes by electron beam irradiation and their rheological properties. Macromolecules 2004; 37(25): 9465-9472.
16. Krause B, Voigt D, Lederer A, Auhl D, Munstedt H. Determination of low amounts of long-chain branches in polypropylene using a combination of chromatographic and rheological methods. Journal of Chromatography A 2004; 1056(1-2):217-222.
17. Abbas Mousavi S, Dadbin S, Frounchi M, Venerus D C, Guadarrama Medina T. Comparison of rheological behavior of branched polypropylene prepared by chemical modification and electron beam irradiation under air and N2. Radiat Phys Chem 2010; 79(10):1088-1094.
18. Lugao A, Otaguro H, Parra D, Yoshiga A, Lima L, Artel B, Liberman S. Review on the production process and uses of controlled rheology polypropylene—Gamma radiation versus electron beam processing. Radiat Phys Chem 2007; 76(11-12):1688-1690.
19. Lugão A B, Hutzler B, Ojeda T, Tokumoto S, Siemens R, Makuuchi K, Villavicencio A-CH. Reaction mechanism and rheological properties of polypropylene irradiated under various atmospheres. Radiat Phys Chem 2000; 57(3-6):389-392.
20. He G, Tzoganakis C. A UV-initiated reactive extrusion process for production of controlled-rheology polypropylene. Polymer Engineering and Science 2011; 51(1): 151-157.
21. UV-Vis Luminescence Spectroscopy theoretical principal, Home page of: http://teaching.shu.ac.uk/hwb/chemistry/tutorials/molspec/lumin1.htm; webpage,[online], [10/11, 2011].
22. Rabek J F. Mechanisms of photophysical processes and photochemical reactions in polymers : theory and applications. Chichester [West Sussex] ; Toronto: Wiley, 1987.
23. Mita I, Hisano T, Horie K, Okamoto A. Photoinitiated thermal degradation of polymers. I. Elementary processes of degradation of polystyrene. Macromolecules 1988; 21(10):3003-3010.
24. Hingmann R, Marczinke B. Shear and elongation flow properties of polypropylene melts. J Rheol 1994; 38:573-587.
25. Vega J, Santamaria A, Munoz-Escalona A, Lafuente P. Small-amplitude oscillatory shear flow measurements as a tool to detect very low amounts of long chain branching in polyethylenes. Macromolecules 1998; 31(11):3639-3647.
26. Ferry J D. Viscoelastic properties of polymers; Toronto: Wiley, 1980.
27. Stange J, Uhl C, Münstedt H. Rheological behavior of blends from a linear and a long-chain branched polypropylene. J Rheol 2005; 49(5):1059-1079.
28. Sugimoto M, Suzuki Y, Hyun K, Ahn K H, Ushioda T, Nishioka A, Taniguchi T, Koyama K. Melt rheology of long-chain-branched polypropylenes. Rheologica acta 2006; 46(1):33-44.
29. Nam G, Yoo J, Lee J. Effect of long-chain branches of polypropylene on rheological properties and foam-extrusion performances. J Appl Polym Sci 2005; 96(5):1793-1800.
30. Tian J, Yu W, Zhou C. The preparation and rheology characterization of long chain branching polypropylene. Polymer 2006; 47(23):7962-7969.
31. Tzoganakis C. A rheological evaluation of linear and branched controlled-rheology polypropylenes. The Canadian Journal of Chemical Engineering 1994; 72(4):749-754.
32. Shroff R, Mavridis H. New measures of polydispersity from rheological data on polymer melts. J Appl Polym Sci 1995; 57(13):1605-1626.
33. Delgadillo-Velazquez O, Hatzikiriakos S, Sentmanat M. Thermorheological properties of LLDPE/LDPE blends. Rheologica Acta 2008; 47(1):19-31.
34. Meissner J, Hostettler J. A new elongational rheometer for polymer melts and other highly viscoelastic liquids. Rheologica Acta 1994; 33(1):1-21.
35. Wagner M H, Bastian H, Hachmann P, Meissner J, Kurzbeck S, Munstedt H, Langouche F. The strain-hardening behaviour of linear and long-chain-branched polyolefin melts in extensional flows. Rheologica acta 2000; 39(2):97-109.
36. Meissner J. Development of a universal extensional rheometer for the uniaxial extension of polymer melts. Transactions of The Society of Rheology (1957-1977) 1972; 16(3):405-420.
37. Meissner J, Raible T, Stephenson S. Rotary clamp in uniaxial and biaxial extensional rheometry of polymer melts. Journal of Rheology (1978-present) 1981; 25(1):1-28.
38. Munstedt H. New universal extensional rheometer for polymer melts. Measurements on a polystyrene sample. Journal of Rheology (1978-present) 1979; 23(4):421-436.
39. Sentmanat M L. Miniature universal testing platform: from extensional melt rheology to solid-state deformation behavior. Rheologica acta 2004; 43(6):657-669.
40. Sentmanat M, Wang B N, McKinley G H. Measuring the transient extensional rheology of polyethylene melts using the SER universal testing platform. Journal of Rheology (1978-present) 2005; 49(3):585-606.
41. Wood-Adams P M, Dealy J M, Willem deGroot A, Redwine O D. Effect of molecular structure on the linear viscoelastic behavior of polyethylene. Macromolecules 2000; 33(20):7489-7499.
42. Scorah M, Tzoganakis C, Dhib R, Penlidis A. Characterization by dilute solution and rheological methods of polystyrene and poly (methyl methacrylate) produced with a tetrafunctional peroxide initiator. J Appl Polym Sci 2007; 103(2):1340-1355.
43. Scorah M, Dhib R, Penlidis A. Branching Level Detection in Polymers. Encyclopedia of Polymer Processing (ECHP), S. Lee, Ed., Taylor and Francis, New York 2005; 251-265.
44. Zimm B H, Stockmayer W H. The dimensions of chain molecules containing branches and rings. J Chem Phys 1949; 17:1301-1314.
45. Weng W, Hu W, Dekmezian A H, Ruff C J. Long chain branched isotactic polypropylene. Macromolecules 2002; 35(10):3838-3843.
46. Langston J A, Colby R H, Shimizu F, Suzuki T, Aoki M, Chung T. One-pot Synthesis of Long Chain Branch PP (LCBPP) Using Ziegler-Natta Catalyst and Branching Reagents 2007; 260(1):34-41.
47. Zhou W, Zhu S. ESR study on peroxide modification of polypropylene. Ind Eng Chem Res 1997; 36(4):1130-1135.
48. Qu B, Xu Y, Shi W, Raanby B. Photoinitiated crosslinking of low-density polyethylene. 6. Spin-trapping ESR studies on radical intermediates. Macromolecules 1992; 25(20):5215-5219.
49. He G, Huang Y, Yang Q. The rheological property and foam morphology of linear polypropylene and long chain branching polypropylene. Journal of Wuhan University of Technology-Mater.Sci.Ed. 2013; 28(4):798-803.
50. Zamotaev P, Shibirin E, Nogellova Z. Photocrosslinking of polypropylene: the effect of different photo-initiators and coagents. Polym Degrad Stab 1995; 47(1):93-107.
51. Kukaleva N, Stoll K, Santi M. Modified olefin polymers 2011; 20110136931, US Patent Application.
52. Amintowlieh Y, Tzoganakis C, Penlidis A. Polypropylene with improved strain hardening characteristics 2014; 61/995,627 US provisional patent application.
53. Montgomery D C. Applied statistics and probability for engineers. New York: N.Y: Wiley, 2003.
54. Jain S, Goossens H, van Duin M, Lemstra P. Effect of in situ prepared silica nano-particles on non-isothermal crystallization of polypropylene. Polymer 2005; 46(20):8805-8818.
55. Kurzbeck S, Oster F, Münstedt H, Nguyen T, Gensler R. Rheological properties of two polypropylenes with different molecular structure. J Rheol 1999; 43(2):359-374.
56. Auhl D, Stadler F J, Münstedt H. Rheological properties of electron beam-irradiated polypropylenes with different molar masses. Rheologica Acta 2012:1-11.
57. Lugão A B, Cardoso E C L, Lima L F C P, Hustzler B, Tokumoto S. Characterization study of gamma-irradiated, high melt-strength polypropylene. Nuclear Instruments and Methods in Physics Research Section B: Beam Interactions with Materials and Atoms 2003; 208:252-255.
58. Amintowlieh Y, Tzoganakis C, Hatzikiriakos S G, Penlidis A. Effects of processing variables on Polypropylene degradation and long chain branching with UV irradiation, Polymer Degradation and Stability. 2014; 104:1-10.
59. Wu Q, Qu B. Photoinitiating characteristics of benzophenone derivatives as new initiators in the photocrosslinking of polyethylene. Polymer Engineering & Science 2001; 41(7):1220-1226.
60. Chen Y L, Ranby B. Photocrosslinking of polyethylene. II. Properties of photocrosslinked polyethylene. Journal of Polymer Science Part A: Polymer Chemistry 1989; 27(12):4077-4086.
61. Ranby B. Photoinitiated modifications of polymers: photocrosslinking, surface photografting and photolamination. Mat Res Innovat 1998; 2(2):64-71.

62. Honerkamp J, Weese J. A nonlinear regularization method for the calculation of relaxation spectra. Rheologica Acta 1993; 32(1):65-73.
63. Wood-Adams P M, Dealy J M. Using rheological data to determine the branching level in metallocene polyethylenes. Macromolecules 2000; 33(20):7481-7488.
64. Lau H, Bhattacharya S, Field G. Melt strength of polypropylene: Its relevance to thermoforming. Polymer Engineering & Science 1998; 38(11):1915-1923.
65. Gotsis A, Zeevenhoven B, Tsenoglou C. Effect of long branches on the rheology of polypropylene. J Rheol 2004; 48(4):895-914.
66. Yamaguchi M, Suzuki K. Enhanced strain hardening in elongational viscosity for HDPE/crosslinked HDPE blend. II. Processability of thermoforming. J Appl Polym Sci 2002; 86(1):79-83.
67. Bernnat, A. Polymer melt rheology and the rheotens test. PhD Thesis, University of Stuttgart, Germany, 2001.
68. Kim B, Kim K. Cross-Linking of polypropylene by peroxide and multifunctional monomer during reactive extrusion. Adv Polym Technol 2003; 12(3):263-269.
69. Borsig E, Van Duin M, Gotsis A, Picchioni F. Long chain branching on linear polypropylene by solid state reactions. European Polymer Journal 2008; 44(1):200-212.
70. Amintowlieh Y, Tzoganakis C, Penlidis A. The effect of depth and duration of UV radiation on polypropylene modification via photoinitiation. J Appl Polym Sci. 2014: 131, 41021-41032.
71. Rudin A. The elements of polymer science and engineering : an introductory text and reference for engineers and chemists. Academic Press, 1999.
72. Gabriel C, Münstedt H. Influence of long-chain branches in polyethylenes on linear viscoelastic flow properties in shear. Rheologica Acta 2002; 41(3):232-244.
73. Socrates G. Infrared and Raman characteristic group frequencies: tables and charts. Wiley, 2001.
74. Tzoganakis C. Reactive extrusion of polymers: A review. Adv Polym Technol 1989; 9(4):321-330.
75. Moad G. The synthesis of polyolefin graft copolymers by reactive extrusion. Progress in Polymer Science 1999; 24(1):81-142.
76. Bettini S, Agnelli J. Grafting of maleic anhydride onto polypropylene by reactive extrusion. J Appl Polym Sci 2002; 85(13):2706-2717.
77. Prut E V, Zelenetskii A N. Chemical modification and blending of polymers in an extruder reactor. Russian Chemical Reviews 2001; 70(1):65-79.
78. Azizi H, Ghasemi I. Reactive extrusion of polypropylene: production of controlled-rheology polypropylene (CRPP) by peroxide-promoted degradation. Polym Test 2004; 23(2):137-143.
79. Lagendijk R, Hogt A, Buijtenhuijs A, Gotsis A. Peroxydicarbonate modification of polypropylene and extensional flow properties. Polymer 2001; 42(25):10035-10043.
80. Wang X, Tzoganakis C, Rempel G L. Chemical modification of polypropylene with peroxide/pentaerythritol triacrylate by reactive extrusion. J Appl Polym Sci 1996; 61(8):1395-1404.
81. Sardashti P, Tzoganakis C, Polak M A, Penlidis A. Radiation Induced Long Chain Branching in High-Density Polyethylene through a Reactive Extrusion Process. Macromolecular Reaction Engineering 2014; 8(2):100-111.
82. Amintowlieh Y, Tzoganakis C, Penlidis A. Preparation and characterization of long chain branched polypropylene through UV irradiation and coagent. Under review: Polymer-Plastics Technology and Engineering 2014: manuscript length 45.
83. Kukaleva N, Stoll K, Santi M. Modified olefin polymers 2009; WO/2009/090126, World Intellectual Property Organization.
84. Shroff R, Mavridis H. Long-chain-branching index for essentially linear polyethylenes. Macromolecules 1999; 32(25):8454-8464.
85. Y. Amintowlieh, C. Tzoganakis, and A. Penlidis,"Continuous Modification of Polypropylene via Photoinitiation", under review, *Polymer Engineering and Science* (2015)
86. Rheological Modification of Polypropylene by incorporation of long chain branches using UV radiation by Yasaman Amintowlieh, a thesis presented to the University of Waterloo in fulfillment of the thesis requirement for the degree of Doctor of Philosophy in Chemical Engineering.

What is claimed is:

1. A method of increasing long chain branching in a polyolefin comprising the steps of:
   preparing a mixture consisting essentially of a polyolefin and a photoinitiator; and
   irradiating the mixture when the mixture is in a solid state with UV radiation to produce a polyolefin having increased long chain branching.
2. The method according to claim 1 wherein the polyolefin is polypropylene (PP).
3. The method according to claim 1 wherein the photoinitiator is benzophenone (BPH).
4. The method according to claim 1 wherein the photoinitiator is BPH and the amount of BPH is 0.3-1 wt % of BPH to PP.
5. The method according to claim 3 wherein the amount of BPH is about 0.2-1 wt %.
6. The method according to claim 5 wherein the amount of BPH is about 0.5 wt %.
7. The method according to claim 1 wherein during the step of irradiating, the UV radiation is provided by a lamp, and wherein the lamp intensity is about 47-79% and the lamp power is 3 kW.
8. The method according to claim 7 wherein the lamp intensity is about 47%.
9. The method according to claim 1 wherein the mixture is irradiated for a period of 360 sec to 15 min.
10. The method according to claim 8 wherein the mixture is irradiated for a period of 120-600 sec.
11. The method according to claim 1 wherein the irradiated mixture has a thickness of 1-3 mm.
12. The method according to claim 1 wherein the mixture is cooled during irradiation.
13. The method according to claim 1 wherein the mixture is cooled with cooling air pressure during irradiation.
14. The method according to claim 1 wherein the polypropylene and initiator are ground prior to irradiation.
15. The method according to claim 1 wherein the polypropylene and the initiator are compression-molded prior to irradiation.
16. The method of claim 1 wherein the method is carried out as a batch process.
17. The method of claim 1 wherein the method is carried out as a continuous process.
18. The method of claim 17 where the continuous process is an extrusion process.
19. The method of claim 18 wherein the mixture is irradiated after extrusion.

20. The method of claim 19 wherein the mixture is irradiated in the solid state.

21. A product produced by the method of claim 1.

22. A method of using the product of claim 21 comprising a step of thermoforming, blow molding, or foaming.

23. A method of increasing long chain branching in a polyolefin comprising the steps of:
- combining ingredients consisting essentially of a polyolefin and a photoinitiator to form a mixture; and
- irradiating the mixture with UV to produce a polyolefin having increased long chain branching.

24. A method of increasing long chain branching in a polyolefin comprising the steps of:
- combining ingredients consisting essentially of a polyolefin and a photoinitiator to form a mixture; and
- irradiating the mixture when in a solid state with UV to produce a polyolefin having increased long chain branching;
- wherein the polyolefin is polypropylene (PP), and the photoinitiator is selected from the group consisting of benzophenone (BPH), 4,4' bis-diethylamino-benzophenone (DEBPH), and combinations thereof, wherein the photoinitiator is present in an amount of from about 0.1 to 1 wt % of the photoinitiator to PP, wherein the UV is provided by a lamp having an intensity of from about 47 to 100% and a power of 3 kW, wherein the mixture is irradiated for a period of 16 sec to 15 min, and wherein the irradiated mixture has a thickness of from about 0.3 to 3 mm.

25. The method as recited in claim 24 wherein the photoinitiator is BPH, and the BPH is present in amount of from about 0.2 to 0.5 wt % of BPH to PP, and wherein the irradiated mixture has a thickness of about 1 mm.

26. The method as recited in claim 24 wherein the photoinitiator is BPH, and the BPH is present in amount of about 0.5 wt % of BPH to PP, wherein the lamp intensity is about 47%, wherein the mixture is irradiated for a period of 5 min to 15 min, and wherein the irradiated mixture has a thickness of from about 1 to 3 mm.

27. The method as recited in claim 24 wherein the photoinitiator is BPH, and the BPH is present in amount of from about 0.5 to 1 wt % of BPH to PP, wherein the lamp intensity is about 47%, wherein the mixture is irradiated for a period of 16 to 36 sec, and wherein the irradiated mixture has a thickness of from about 1 to 3 mm, and wherein the irradiated mixture has a thickness of from about 0.3 to 0.5 mm.

28. The method as recited in claim 24 wherein the photoinitiator is BPH, and the BPH is present in amount of from about 0.3 to 0.8 wt % of BPH to PP, wherein the lamp intensity is from about 47 to 74%, wherein the mixture is irradiated for a period of 30 to 600 sec, and wherein the irradiated mixture has a thickness of from about 0.5 to 3 mm.

29. The method as recited in claim 24 wherein the photoinitiator is DEBPH, and the DEBPH is present in amount of from about 0.1 to 0.3 wt % of DEBPH to PP, wherein the lamp intensity is about 100%, wherein the mixture is irradiated for a period of 160 to 480 sec, and wherein the irradiated mixture has a thickness of from about 1 to 3 mm, and wherein the irradiated mixture has a thickness of from about 0.5 to 3 mm.

* * * * *